United States Patent
Cha et al.

(10) Patent No.: US 8,863,177 B2
(45) Date of Patent: Oct. 14, 2014

(54) SYSTEM FOR CONTROLLING AUTOMATIC EXPOSURE OF BROADCAST ADVERTISEMENT DATA AND METHOD FOR SAME

(75) Inventors: Ji-Hyuk Cha, Seoul (KR); Pyong-Taek Kim, Seoul (KR); Nam-A Park, Uiwang-si (KR); Joo-Won Lee, Seoul (KR); Ki-Won Nam, Seoul (KR)

(73) Assignees: Ki-Won Nam, Seoul (KR); Pyong-Taek Kim, Seoul (KR)

(*) Notice: Subject to any disclaimer, the term of this patent is extended or adjusted under 35 U.S.C. 154(b) by 845 days.

(21) Appl. No.: 12/919,471

(22) PCT Filed: Feb. 25, 2009

(86) PCT No.: PCT/KR2009/000902
§ 371 (c)(1),
(2), (4) Date: Jul. 18, 2011

(87) PCT Pub. No.: WO2009/107979
PCT Pub. Date: Sep. 3, 2009

(65) Prior Publication Data
US 2011/0265117 A1    Oct. 27, 2011

(30) Foreign Application Priority Data
Feb. 25, 2008 (KR) .......... 10-2008-0016955
Mar. 19, 2008 (KR) .......... 10-2008-0025553

(51) Int. Cl.
| | | |
|---|---|---|
| H04N 7/10 | (2006.01) | |
| H04N 7/173 | (2011.01) | |
| H04N 21/81 | (2011.01) | |
| H04N 21/438 | (2011.01) | |
| H04H 60/63 | (2008.01) | |
| H04N 21/431 | (2011.01) | |
| H04H 60/32 | (2008.01) | |

(52) U.S. Cl.
CPC ............. *H04N 7/173* (2013.01); *H04N 21/812* (2013.01); *H04N 21/4383* (2013.01); *H04H 60/63* (2013.01); *H04N 21/4316* (2013.01); *H04H 60/32* (2013.01)
USPC .......................................................... 725/35

(58) Field of Classification Search
USPC .................................... 725/34–35, 40, 41–43
See application file for complete search history.

(56) References Cited

U.S. PATENT DOCUMENTS 6,698,020 B1 * 2/2004 Zigmond et al. ................ 725/34
6,813,501 B2 * 11/2004 Kinnunen et al. ......... 455/456.2
(Continued)

FOREIGN PATENT DOCUMENTS

| KR | 1020020068933 A | 8/2002 |
|---|---|---|
| KR | 1020030093372 A | 12/2003 |
| KR | 1020050067558 A | 7/2005 |

*Primary Examiner* — Benjamin R Bruckart
*Assistant Examiner* — Anthony Bantamoi
(74) *Attorney, Agent, or Firm* — Novick, Kim & Lee, PLLC; Jae Youn Kim

(57) ABSTRACT

A system for inserting advertisement data into broadcast data and method thereof are provided. The system and method can output advertisement data to a certain portion of a lower end of a screen image of the new channel for a certain time when a current channel is changed to a different broadcast channel according to a viewer's intention while the viewer is viewing a broadcast program, thus minimizing viewer's reluctance to the advertisement output, reducing the burden of an advertiser, and guaranteeing a visual continuity of a broadcast program desired to be searched. Using the present invention, when channels are switched for searching for broadcast programs or when power is turned on or off, advertisement data can be output to the same screen while outputting a pertinent broadcast program, thereby exposing the advertisement data without interrupting the broadcast program.

13 Claims, 31 Drawing Sheets

(56) References Cited

U.S. PATENT DOCUMENTS

| | | | |
|---|---|---|---|
| 8,281,334 B2 * | 10/2012 | Shan et al. | 725/34 |
| 2001/0034647 A1 * | 10/2001 | Marks et al. | 705/14 |
| 2002/0042914 A1 * | 4/2002 | Walker et al. | 725/36 |

* cited by examiner

US 8,863,177 B2

SYSTEM FOR CONTROLLING AUTOMATIC EXPOSURE OF BROADCAST ADVERTISEMENT DATA AND METHOD FOR SAME

TECHNICAL FIELD

The present invention relates to a system for inserting advertisement data into broadcast data and method thereof and, more particularly, to a system and method for controlling automatic exposure of broadcast advertisement data, which are capable of outputting advertisement data to a certain portion of a lower end of a screen image of the new channel for a certain time when a current channel is changed to a different broadcast channel according to a viewer's intention while the viewer is viewing a broadcast program, thus minimizing viewer's reluctance to the advertisement output, reducing the burden of an advertiser, and guaranteeing a visual continuity of a broadcast program desired to be searched.

BACKGROUND ART

As well-known in the art, a general advertisement (i.e., a broadcast commercial) inserted between broadcast programs secures a temporal space between a previously terminated broadcast program and a subsequent broadcast program, and thus, it has an advantage in that, while the advertisement is being aired, a viewer can make time to do a different job or be ready for a new broadcast program by eliminating a lingering imagery or feelings of the previous broadcast program.

However, in spite of the foregoing advantage, the method of inserting an advertisement between broadcast programs has shortcomings in that because the broadcast is not intended by the viewer, concentration to the advertisement is reduced, and when a great number of advertisement data is inserted between broadcast programs, the viewer is highly likely to get bored to switch the current channel.

Thus, the method of inserting advertisement between broadcast programs has problems that a great number of advertisement data cannot be inserted, so advertisers have no choice but to pay a huge amount of advertisement output cost to advertise their products.

In addition, at the viewers' side, because they have no benefit for viewing advertisements, although the amount or time of an advertisement inserted between broadcast programs is short, they are apt to switch the channel.

Meanwhile, cable TVs as well as foreign TVs adopt a method of outputting a single advertisement for a very short time in the middle of outputting a broadcast program, but, in this case, because the advertisement data interrupts continuity of viewer's interest or fun, or feelings in their viewing a broadcast program, viewers tend to be reluctant to the output advertisement data, rather than being anxious to concentrate to the broadcast.

Moreover, the existing broadcast advertisements are generally provided by using entertainers or famous people with a high degree of recognition, but their advertisement presentation costs are so high that small business companies cannot afford to advertise their products by employing such entertainers or famous people.

Also, in case of the conventional broadcasting advertisement exposure system, although a viewer does another work without viewing advertisements in a state that he or she simply sets an advertisement exposure mode, he or she is given the same prize winning opportunity (or chance) as that of a viewer who continuously views advertisements, causing a problem in that the concentration of advertisement viewing is not properly reflected.

In addition, in case of outputting broadcast data such as a soap opera, and the like, an advertisement output on a lower end portion of a corresponding screen image does not reflect the scene content of the broadcast data, and because the advertisement data is output irrespective of lines of a broadcast scenario, advertisement information not matching with the lines of the broadcast scenario may be exposed.

Namely, in a situation in which a very serious content of a soap opera is being aired, very comic advertisement data may be exposed at the lower end portion of the screen image.

Further, the related art broadcast advertisement exposure system does not provide any means for allowing viewers to store advertisement data separately. Thus, the viewers must make a note of a phone number or the like of a store included in advertisement content in order to place an order afterwards.

Meanwhile, the related art broadcast advertisement exposure system has a function that when an advertisement is output in broadcast program content, it is automatically recognized and a predetermined URL is automatically accessed to receive advertisement data from a pertinent server and output it, thereby providing opportunities for participating in various events. In this respect, however, the related art broadcast advertisement exposure system does not have a function of automatically switching to a predetermined advertisement channel, having a limited generality.

Moreover, the related art broadcast advertisement exposure system has a problem in that when the viewer visits a different home, and so on, the viewer cannot benefit in return for viewing an advertisement there, and also, because the viewer cannot transfer his benefit in return for viewing an advertisement or an opportunity for participating in a lottery to a different person, the different person cannot use the opportunity for participating in drawing for a lottery of the viewer who may be indifferent to the opportunity for participating in drawing for a lottery obtained in return for his viewing an advertisement.

DISCLOSURE

Technical Problem

It is, therefore, an object of the present invention to provide a system and method for controlling automatic exposure of broadcast advertisement data, which are capable of outputting advertisement data to a certain portion of a lower end of a screen image of the new channel for a certain time when a current channel is changed to a different broadcast channel according to a viewer's intention while the viewer is viewing a broadcast program, thus minimizing viewer's reluctance to the advertisement output, reducing the burden of an advertiser, and guaranteeing a visual continuity of a broadcast program desired to be searched.

Another object of the present invention is to provide a system and method for automatically exposing broadcast advertisement data, which are capable of outputting advertisement data to a certain portion of a lower end of a screen image of the new channel for a certain time when a current channel is changed to a different broadcast channel according to a viewer's desire while the viewer is viewing a broadcast program, and accumulating advertisement data output time of each viewer to automatically support a prize winning event and distributing prize money (or prize amount), thereby allowing the viewers to share the return for viewing an advertisement.

Still another object of the present invention is to provide a system and method for automatically exposing broadcast advertisement data, which are capable of outputting advertisement data to a certain portion of a lower end of a screen image of the new channel for a certain time when a current channel is changed to a different broadcast channel according to a viewer's desire while the viewer is viewing a broadcast program, and classifying a group of advertisement data previously set by a viewer according to the size thereof, thereby allowing prize money to intertwork with the group.

Still another object of the present invention is to provide a system and method for automatically exposing broadcast advertisement data, which are capable of outputting advertisement data at a lower end portion of an output screen image of a new channel for a certain time when a screen image is changed to the screen image of the new channel according to a viewer's intention while the viewer is viewing a broadcast program through a DMB phone or a navigation device.

Still another object of the present invention is to provide a system and method for automatically exposing broadcast advertisement data, which are capable of outputting advertisement data to a certain portion of a lower end of a screen image of the new channel for a certain time when a current channel is changed to a different broadcast channel according to a viewer's desire while the viewer is viewing a broadcast program, and automatically inserting an image or video data of a particular entertainer designated by an advertiser into advertisement data.

Still another object of the present invention is to provide a system and method for automatically exposing broadcast advertisement data, which are capable of providing a differentiated return for viewing an advertisement according to a time at which an acknowledgement signal for acknowledging viewing of an advertisement when advertisement data is exposed together with a broadcast program as the broadcast is output or when the advertisement data is solely exposed.

Still another object of the present invention is to provide a system and method for automatically exposing broadcast advertisement data, which are capable of extracting scene information or information regarding lines of a broadcast scenario included in broadcast data and providing control to extract and output advertisement data matching with the corresponding scene information or information regarding lines of the broadcast scenario, thereby eliminating viewers' reluctance to content of output advertisement.

Still another object of the present invention is to provide a system and method for automatically exposing broadcast advertisement data, which are capable of allowing a viewer to store advertisement data exposed on a screen image in a PVR in order to output the advertisement data to a screen afterwards.

Still another object of the present invention is to provide a system and method for automatically exposing broadcast advertisement data, in which when an advertisement is output according to content of a main broadcast program, it is automatically recognized and a current channel is automatically switched to a predetermined advertisement dedicated channel, and then, when an initiation signal of the main broadcast program is extracted, the previous channel is controlled to be returned to allow a viewer to have a return for viewing an advertisement.

Still another object of the present invention is to provide a system and method for automatically exposing broadcast advertisement data, which are capable of allowing a viewer to log in to an IPTV in a remote different home (place) he or she is visiting, so that the viewer may have a return for viewing an advertisement by using the ID of the corresponding viewer.

Still another object of the present invention is to provide a system and method for automatically exposing broadcast advertisement data, which are capable of allowing a viewer to transfer his or her opportunity (or chance) for participating in an event or a lottery with respect to his or her viewing of an advertisement to someone else, thereby increasing the probability of winning the lottery of the someone else.

Technical Solution

In accordance with one aspect of the present invention, there is provided a system for inserting advertisement data into broadcast data, the system including: broadcast output terminals 2a~2n for outputting broadcast data to a broadcast data output area 200 of a screen output area 100, and dividedly generating an advertisement data output area 300 at a lower end portion of the screen output area to output advertisement data for a certain time period when advertisement output conditions are met; a broadcast data transmission server 4 for transmitting broadcast data to the broadcast output terminals 2a~2n through a relay station or a relay satellite; advertiser terminals 10a~10n for transmitting advertisement data and advertisement information to the advertisement data transmission server 6; and an advertisement data transmission server 6 for receiving advertisement data from the advertiser terminals 10a~10n and storing the advertisement data, and transmitting the advertisement data to the broadcast output terminals 2a~2n.

In accordance with another aspect of the present invention, there is provided a method for inserting advertisement data into broadcast data, the method including: receiving, by an advertisement data transmission server 6, advertisement data from a plurality of advertiser terminals 10a~10n, and registering the advertisement data by the advertisers; transmitting, by the advertisement data transmission server 6, the advertisement data to a plurality of broadcast output terminals 2a~2n; storing, by the broadcast output terminals 2a~2n, the advertisement data transmitted from the advertisement data transmission server 6; outputting, by the broadcast output terminals 2a~2n, broadcast data of a terrestrial wave, a satellite broadcast, and a cable broadcast through a screen; determining, by the broadcast output terminals 2a~2n, whether or not advertisement output conditions are met; when the advertisement output conditions are met, extracting prestored advertisement data, reducing the broadcast data outputting the extracted advertisement to the screen; driving, by the broadcast output terminals 2a~2n, a timer 26a starting from a time point when the output of the advertisement data is initiated and determining whether or not a preset certain time has arrived; and when the preset time has arrived, removing, by the broadcast output terminals 2a~2n, the advertisement data output to the screen and returning to a screen where an original broadcast advertisement data is output.

Advantageous Effects

In the system and method for automatically exposing broadcast advertisement data according to exemplary embodiments of the present invention, when channels are switched for searching for programs or when power is turned on or off, advertisement data can be output to the same screen while outputting a pertinent broadcast program, thereby exposing the advertisement data without interrupting the broadcast program. In addition, an advertisement cost incurring from exposing the advertisement data is accumulated, a lottery is automatically executed at every certain time interval, and the viewer of the advertisement is allowed to have a return for viewing the advertisement, so the viewer is incited to spare more time for viewing the advertisement and the viewer's concentration on the advertisement can increase. Moreover, because the image of an entertainer is automatically inserted when local advertisement data is output, the advertisement can be made at a low-priced cost for portrait rights and the entertainer can produce supplementary advertisement profit without having to do an activity of CF photographing.

Further, the system and method for automatically exposing broadcast advertisement data according to exemplary embodiments of the present invention provide a differentiated return according to a total advertisement view time viewed by a viewer, thereby giving more motivation about the advertisement viewing. Also, advertisement data matching with scene information and lines of a broadcast scenario included in broadcast data are output, thereby eliminating viewer's reluctance. When an advertisement, not a main broadcast program, is output in a state that an advertisement dedicated channel is secured in advance, automatic switch to the preset advertisement dedicated channel is performed, thereby providing a return for viewing the advertisement to the viewer. In addition, by allowing a viewer to log in to an IPTV in a remote different home by using its own ID, the viewer may have a return for viewing an advertisement by using the ID of the corresponding viewer even when he or she is visiting in a different home. Moreover, his or her opportunity (or chance) for participating in an event or a lottery with respect to his or her viewing of an advertisement is transferred to someone else, thereby increasing the probability of winning and prize money.

DESCRIPTION OF DRAWINGS

The above and other objects and features of the present invention will become apparent from the following description of preferred embodiments, given in conjunction with the accompanying drawings, in which.

BEST MODE FOR THE INVENTION

Hereinafter, a first exemplary embodiment of the present invention will be described in detail with reference to the accompanying drawings.

Figure 1:
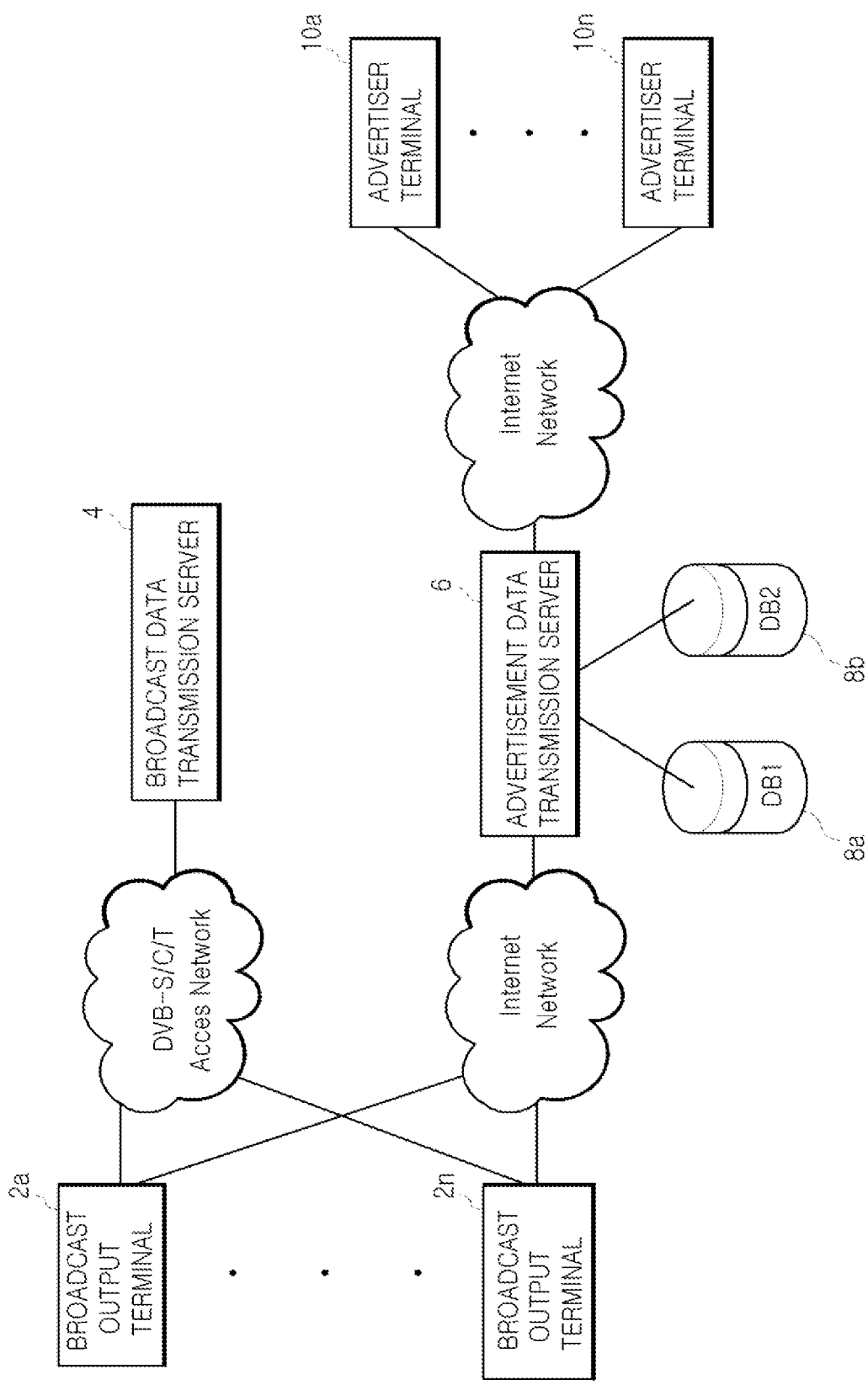
FIG. 1 is a schematic view showing the configuration of a system for controlling automatic exposure of broadcast advertisement data according to a first exemplary embodiment of the present invention.

FIG. 1 is a schematic view showing the configuration of a system for controlling automatic exposure of broadcast advertisement data according to a first exemplary embodiment of the present invention.

As shown in FIG. 1, the system for controlling automatic exposure of broadcast advertisement data according to the first embodiment is devised to output advertisement data at a lower end portion of an output screen image of a new channel for a certain time, when a screen image is changed to the screen image of the new channel according to a viewer's intention while the viewer is viewing a broadcast program, to thereby minimize the viewer's reluctance to the advertisement output, reduce the burden of an advertiser, and guarantee a visual continuity of a broadcast program desired to be searched.

Namely, when a viewer switches a channel to search for a broadcast program, the system for controlling automatic exposure of broadcast advertisement data according to the first embodiment provides control to divide the screen at a certain ratio, and output broadcast data of a switched channel at one portion and advertisement data at another portion only for a certain time period, so as to minimize viewer's reluctance to the advertisement output and reduce the economical burden of an advertiser.

In addition, the system for controlling automatic exposure of broadcast advertisement data according to the first embodiment can be applicable to a system which outputs advertisement data at a lower end portion of an output screen image of a new channel for a certain time when a screen image is changed to the screen image of the new channel according to a viewer's intention while the viewer is viewing a broadcast program through a DMB phone or a navigation device.

Thus, broadcast output terminals 2a~2n included in the system for controlling automatic exposure of broadcast advertisement data according to the first embodiment are able to output broadcast data, and may include various broadcast data output devices such as a PC, a DMB phone, a navigation device, and the like, as well as an IPTV that are capable of transmitting a terminal unique code or receiving and outputting local advertisement data or central advertisement data.

To this end, in this embodiment, for example, an IPTV, a DMB phone, and a navigation device are used as the broadcast output terminals for outputting broadcast data and advertisement data, and the IPTV will be first described hereinafter.

In general, in a DTV and a PVR constituting the IPTV, the PVR is embedded in a set-top box (STB). When the STB provides the PVR with a broadcast signal transmitted from a satellite, a cable, a terrestrial wave, and the like, the PVR records it. The DTV, which is directly connected to the STB, serves to receive a broadcast from a satellite, a cable, a terrestrial wave and display the received broadcast, or display contents stored in the PVR.

In this system, supplementary information regarding a broadcast service is received directly from a broadcast access network such as a satellite, a cable, a terrestrial wave. Such information may be utilized by an electronic program guide (EPG) and used for the purpose of providing information for guiding programs to a user. In case of a multimedia home platform (MHP), DVB-SI is used as the supplementary information, and an open cable application platform (OCAP) uses a PSIP.

The IPTV is configured such that a broadcast signal transmitted from a satellite, a cable, a terrestrial wave, and the like, is provided from the STB to the PVR, and the PVR records it, and configured such that a broadcast signal transmitted from a satellite, a cable, and a terrestrial wave, and the like, is received from the broadcast access network based on the Internet network.

Like a computer terminal, the IPTV includes a modem therein and is able to perform Internet surfing to a particular URL and data uploading and downloading.

Namely, the broadcast output terminals 2a~2n included in the system for controlling automatic exposure of broadcast advertisement data according to the first embodiment must be able to output broadcast data of a terrestrial wave and a satellite broadcast, and when certain conditions are met, the broadcast output terminals 2a~2n must be able to transmit a unique code stored therein to a particular server, and receive and store particular advertisement data. Also, when channel switching conditions are met, the broadcast output terminals 2a~2n must be able to automatically output the stored advertisement data.

Accordingly, the broadcast output terminals 2a~2n included in the system for controlling automatic exposure of broadcast advertisement data according to the first embodiment must be able to be connected to the Internet network and available for data communication basically in order to receive advertisement data.

In addition, the broadcast output terminals 2a~2n included in the system for controlling automatic exposure of broadcast advertisement data according to the first embodiment are set to divide their screen to output advertisement data along with broadcast data when advertisement data output conditions stored in those terminals are met. In this case, the advertisement output conditions refer to when a signal is input as the broadcast output terminals 2a~2n are turned on and off or as a viewer attempts to switch a channel through the broadcast output terminals 2a~2n. Namely, the broadcast output terminals 2a~2n are set to output prestored advertisement data to a portion of the screen when a signal for turning on or off the broadcast output terminals 2a~2n is applied or when a channel switch signal is applied.

Meanwhile, in case of a PC that performs bi-directional communication, an advertiser may provide a return for clicking an advertisement to a user, but TVs does not have such a function and an advertisement output between broadcast programs is based on one-directional output scheme.

In comparison, in the system for controlling automatic exposure of broadcast advertisement data according to the first embodiment, the broadcast output terminals 2a~2n perform bi-directional communication with a remote server. That is, the broadcast output terminals 2a~2n check an advertisement view time and the frequency of advertisement output and provide the same to the remote server, allowing a return for viewing an advertisement to be paid later. Thus, the broadcast output terminals 2a~2n have a device capable of performing such a function.

In addition, in the system for controlling automatic exposure of broadcast advertisement data according to the first embodiment, advertisement data output to the screen of the broadcast output terminals 2a~2n may be central advertisement data, or local advertisement data depending on local or non-local characteristics. Namely, in order for the remote server to transmit local advertisement data in consideration of regional characteristics to the broadcast output terminals 2a~2n, the remote server must manage area codes of the broadcast output terminals 2a~2n, and when a session is established between the broadcast output terminals 2a~2n and the remote server, the broadcast output terminals 2a~2n must transmit a terminal unique code to the corresponding remote server.

Namely, when the broadcast output terminals 2a~2n held by the user are located in Seocho-dong, Korea, a local advertisement of chicken specified stores in Seocho-dong is preferably output to those terminals.

Thus, the broadcast output terminals 2a~2n included in the system for controlling automatic exposure of broadcast advertisement data according to the first embodiment are preferably set to transmit their terminal unique code to the remote server when they establish a session with the remote server.

Meanwhile, the system for controlling automatic exposure of broadcast advertisement data according to the first embodiment includes an advertisement data transmission server 6 for receiving advertisement data from a plurality of advertiser terminals 10a~10n and storing them in advance, and transmitting the same to the broadcast output terminals 2a~2n. In order for the broadcast output terminals 2a~2n to output advertisement data as a local advertisement reflecting a local area of the broadcast output terminals 2a~2n, the advertisement data transmission server 6 stores location information of the respective broadcast output terminals 2a~2n as unique codes, and the corresponding unique codes are classified by areas.

Thus, when an advertiser designates advertisement data applied through the broadcast output terminals 2a~2n as a particular local advertisement, the advertisement data transmission server 6 transmits the corresponding advertisement data only to particular broadcast output terminals 2a~2n matching to the previously classified unique codes of particular areas.

Meanwhile, the advertisement data transmission server 6 provides a return, which is proportionate to an output time of an advertisement, to a viewer who has output the advertisement upon receiving advertisement time information output through the broadcast output terminals 2a~2n at certain time intervals from the broadcast output terminals 2a~2n or when power of the broadcast output terminals 2a~2n are turned off. Thus, the advertisement data transmission server 6 receives advertisement time information and a terminal unique number of each of the broadcast output terminals 2a~2n, and stores the same.

Figure 2:
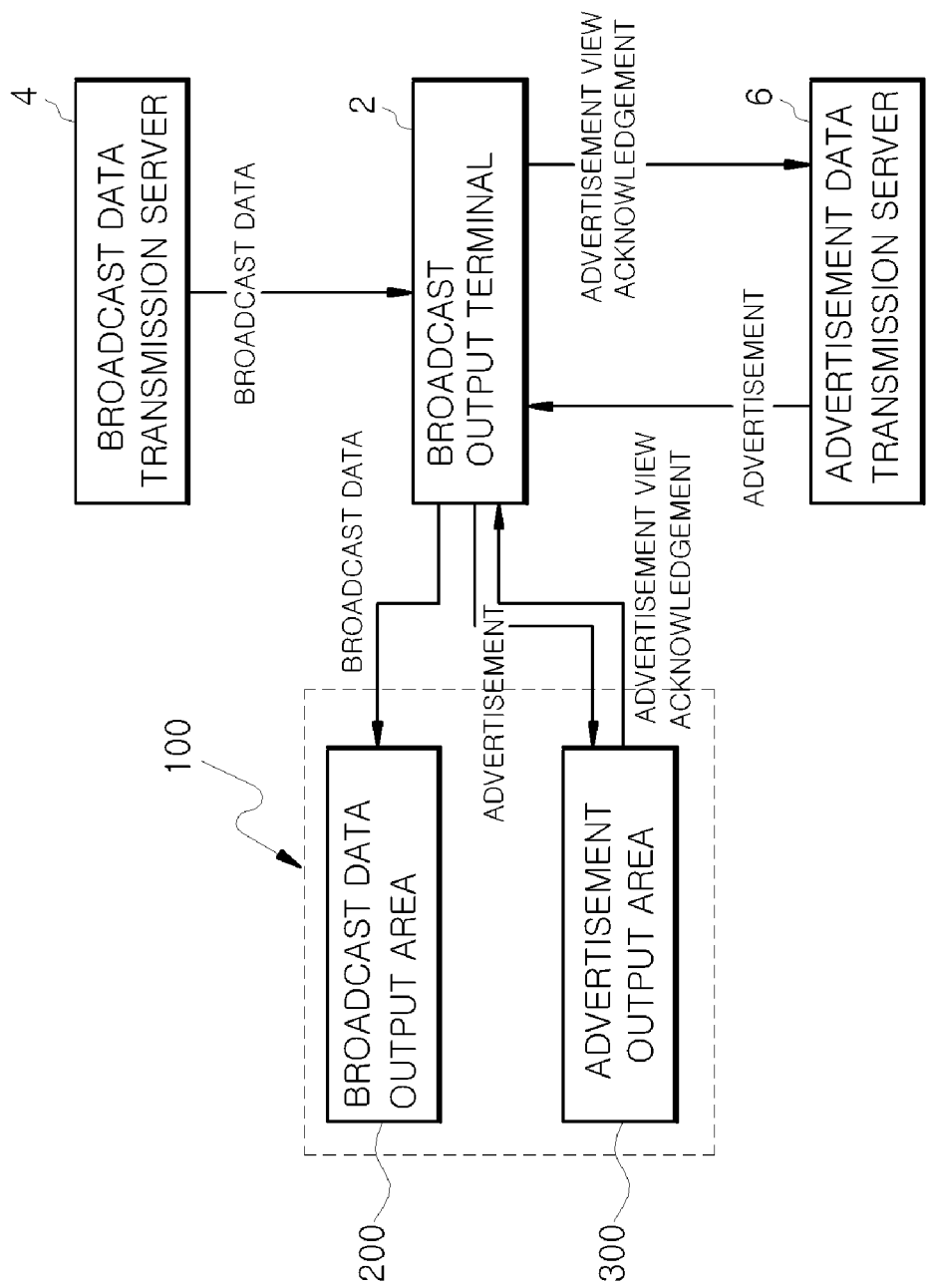
FIG. 2 is a block diagram illustrating a data flow of the system for controlling automatic exposure of broadcast advertisement data according to the first exemplary embodiment of the present invention.
Figure 3:
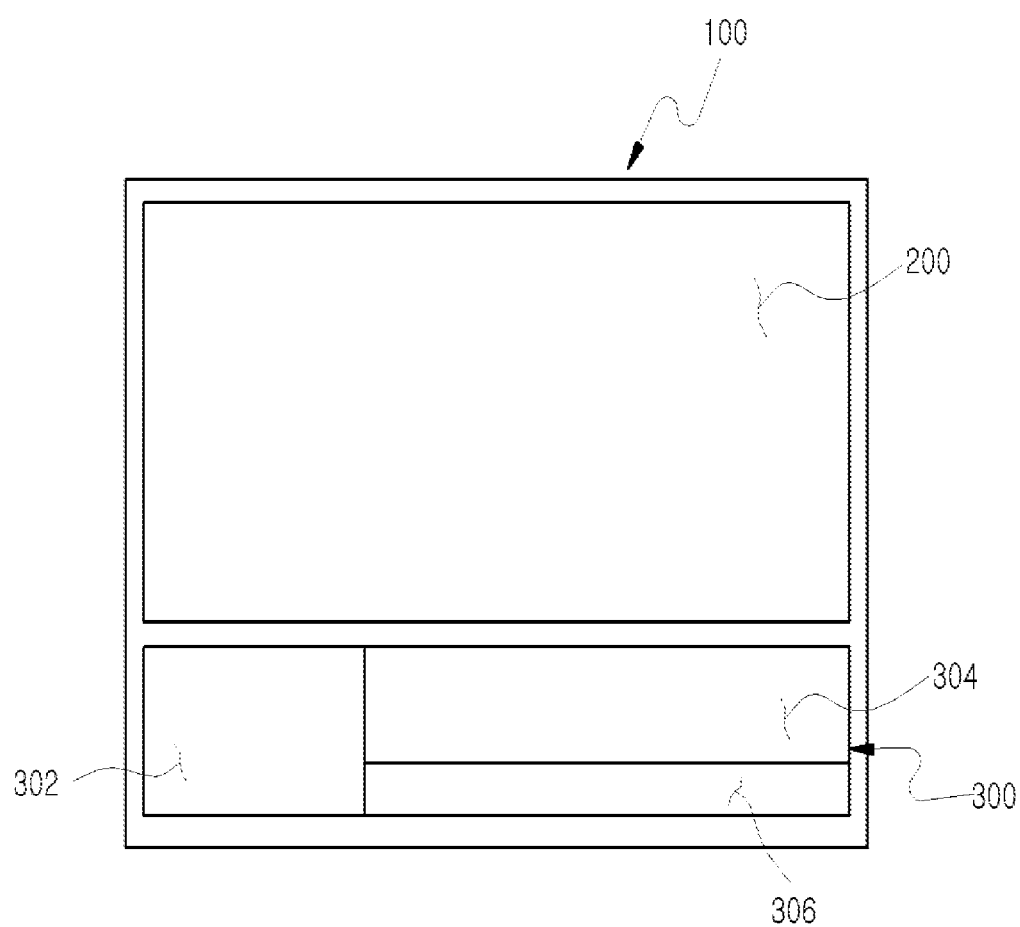
FIG. 3 is a view showing a screen output through a broadcast output terminal in the system for controlling automatic exposure of broadcast advertisement data according to the first exemplary embodiment of the present invention.

FIG. 2 is a block diagram illustrating a data flow of the system for controlling automatic exposure of broadcast advertisement data according to the first exemplary embodiment of the present invention, and FIG. 3 is a view showing a screen output through a broadcast output terminal in the system for controlling automatic exposure of broadcast advertisement data according to the first exemplary embodiment of the present invention.

With reference to FIGS. 2 and 3, in the system for controlling automatic exposure of broadcast advertisement data according to the first embodiment, a screen area 100 of the broadcast output terminals 2a~2n, such as an IPTV, a DMB phone, a navigation device, or the like, to output broadcast data is divided into an advertisement output area 300 for outputting advertisement area according to advertisement output conditions (channel switching, a power turn-on/turn-off) and a broadcast data output area 200 for outputting broadcast data.

In this case, the broadcast output terminals 2a~2n may receive advertisement data in real time from the advertisement data transmission server 6 that transmits the advertisement data, and output the received advertisement data to the screen area 100, or may receive the advertisement data from the advertisement data transmission server 6 and store the same in advance, and then extract the prestored advertisement data and output it to the screen at a time point at which advertisement data output conditions are met.

Meanwhile, as for the screen area 100 output through the broadcast output terminals 2a~2n, a screen radio value of the screen area 100 is set in the broadcast output terminals 2a~2n in advance such that the broadcast data output area 200 output through the screen area 100 is reduced at a certain ratio and the advertisement output area 300 is configured at an extra space generated according to the reduction of the broadcast data output area 200 at the time point when the advertisement output conditions are met. The screen radio value may be adjusted arbitrarily by a user.

Also, the advertisement data output area 300 output through the screen area 100 of the broadcast output terminals 2a~2n may be automatically eliminated when a certain time lapses.

Namely, in the system for controlling automatic exposure of broadcast advertisement data according to the first embodiment, in order to maximize an advertisement effect and minimizing the burden of an advertiser while minimizing the viewers' reluctance to advertisement data output to the screen, the broadcast output terminals 2a~2n temporarily output prestored advertisement data or advertisement data transmitted from the advertisement data transmission server 6 in real time to the screen only when the advertisement output conditions are met (e.g., when a channel is switched or power is turned on or off), and when a corresponding output time lapses, the broadcast output terminals 2a~2n automatically eliminate the advertisement data.

Thus, the advertisement data is temporarily output to the screen only when the viewer turns on or off power or when the viewer switches a channel to search for a different broadcast channel program.

In general, channel searching is performed to check other channel programs when the viewer is not much interested in a current channel program. Thus, the viewer would not feel uncomfortable in searching channels although the size of the broadcast data output area 200 is somewhat reduced in switching the channel, and because it is configured such that the viewer is provided with a return in proportion to the output time of advertisement data, the viewer may spontaneously set output of advertisement data.

Thus, the system for controlling automatic exposure of broadcast advertisement data according to the first embodiment will be described under the assumption that the viewer spontaneously sets an advertisement output through the broadcast output terminals 2a~2n.

Meanwhile, the advertisement output area 300 output through the broadcast output terminals 2a~2n may be subdivided into a product image or entertainer image output area 302, an advertisement area 304, and event information 306 of a pertinent company. As the event information 306, viewer compensation (or return) information (e.g., information regarding accumulated prize money) resulting from an advertisement output may be preferably output.

Figure 4:
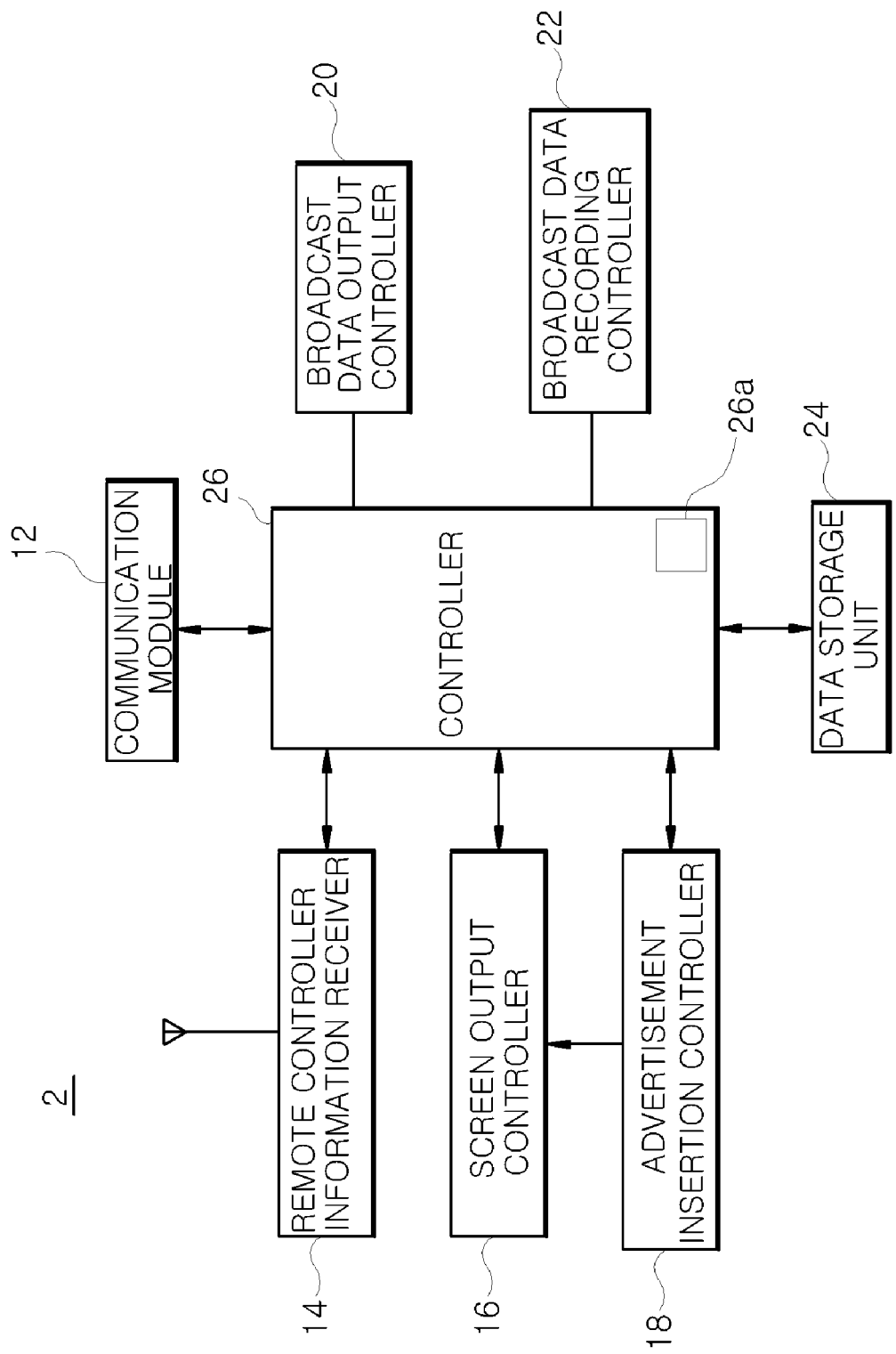
FIG. 4 is a block diagram showing the configuration of the broadcast output terminal provided in the system for controlling automatic exposure of broadcast advertisement data according to the first exemplary embodiment of the present invention.

FIG. 4 is a block diagram showing the configuration of the broadcast output terminal provided in the system for controlling automatic exposure of broadcast advertisement data according to the first exemplary embodiment of the present invention.

With reference to FIG. 4, the broadcast output terminals 2a~2n provided in the system for controlling automatic exposure of broadcast advertisement data according to the first embodiment each include a communication module, a remote controller information receiver, a screen output controller, an advertisement insertion controller, a broadcast data output controller, a broadcast data recording controller, a data storage unit, a controller, and a timer.

Reference numeral 12 denotes a communication module connected to a broadcast access network or the Internet network for performing a data transmission and reception with the broadcast data transmission server 4 and the advertisement data transmission server 6, and performing protocol matching and filtering.

Reference numeral 14 denotes a remote controller information receiver for receiving remote control signals with respect to an advertisement data output setting signal of a viewer, a screen ratio adjustment signal of advertisement data, a detailed information check signal of advertisement data, a channel switch signal, and a power ON/OFF signal.

Reference numeral 16 denotes a screen output controller for controlling outputting of broadcast data and advertisement data through the broadcast output terminals 2a~2n, and reference numeral 18 denotes an advertisement insertion controller for controlling inserting of advertisement data transmitted from the advertisement data transmission server 6 into a screen area and outputting the same by interworking with the screen output controller 16.

Reference numeral 20 denotes a known broadcast data output controller for controlling receiving of digital broadcast data from the broadcast data transmission server 4 and outputting the received digital broadcast data through the broadcast output terminals 2a~2n. The broadcast data output controller 20 refers to the configuration of hardware and software mounted in a general STB (not shown). In general, digital broadcast data is compressed into an MPEG version and decompressed by a decoder (not shown) included in the STB. The broadcast data output controller 20 is one of general elements of the IPTV, which performs a conventional broadcast output function through hardware and OS, so a detailed description thereof will be omitted.

Reference numeral 22 denotes a broadcast data recording controller for receiving the digital broadcast data from the broadcast data transmission server 4 and recording and storing it. The broadcast data recording controller 22 is a known element for controlling a PVR (not shown) included in the general IPTV, which is not requisite for the present invention.

Reference numeral 24 denotes a data storage unit for storing advertisement data transmitted from the advertisement data transmission server 6, storing terminal unique number information, and receiving and storing an advertisement data output setup signal of the viewer and a screen ratio adjustment signal of the advertisement data.

Reference numeral 26 denotes a controller for controlling outputting of advertisement data on the screen for a certain time period when an advertisement output condition signal is received from the remote controller information receiver 14, in a state that a setup signal with respect to an advertisement data screen output is received through the remote controller information reception unit 14 and the advertisement data is received from the advertisement data transmission server 6 and stored. Reference numeral 26a denotes a timer installed in the controller 26 for calculating an advertisement output time.

The controller 26 has a control routine set to generate a control signal to the screen output controller 16 upon receiving a signal for adjusting the ratio of the advertisement data output from the remote controller information receiver 14, is set to accumulatively calculate an advertisement output time by interworking with the timer 26a and transmit corresponding advertisement output time information to the advertisement data transmission server 6 at every certain time interval, and set to extract an internal unique code from the data storage unit and transmit the same in transmitting the corresponding advertisement output time information.

Preferably, the broadcast output terminals 2a~2n are set in advance such that advertisement data output to their screen are automatically assigned a sequential number when stored based on the storage order. Thus, the advertisement data are output to the screen in the sequential order when a channel is switched or when power is turned on or off.

Preferably, a key input unit (not shown) for setting outputting of the advertisement data by the viewer is further included in the broadcast output terminals 2a~2n, and also, a key input unit (not shown) for adjusting the size ratio of the advertisement output area 300 is included in the broadcast output terminals 2a~2n.

Figure 5:
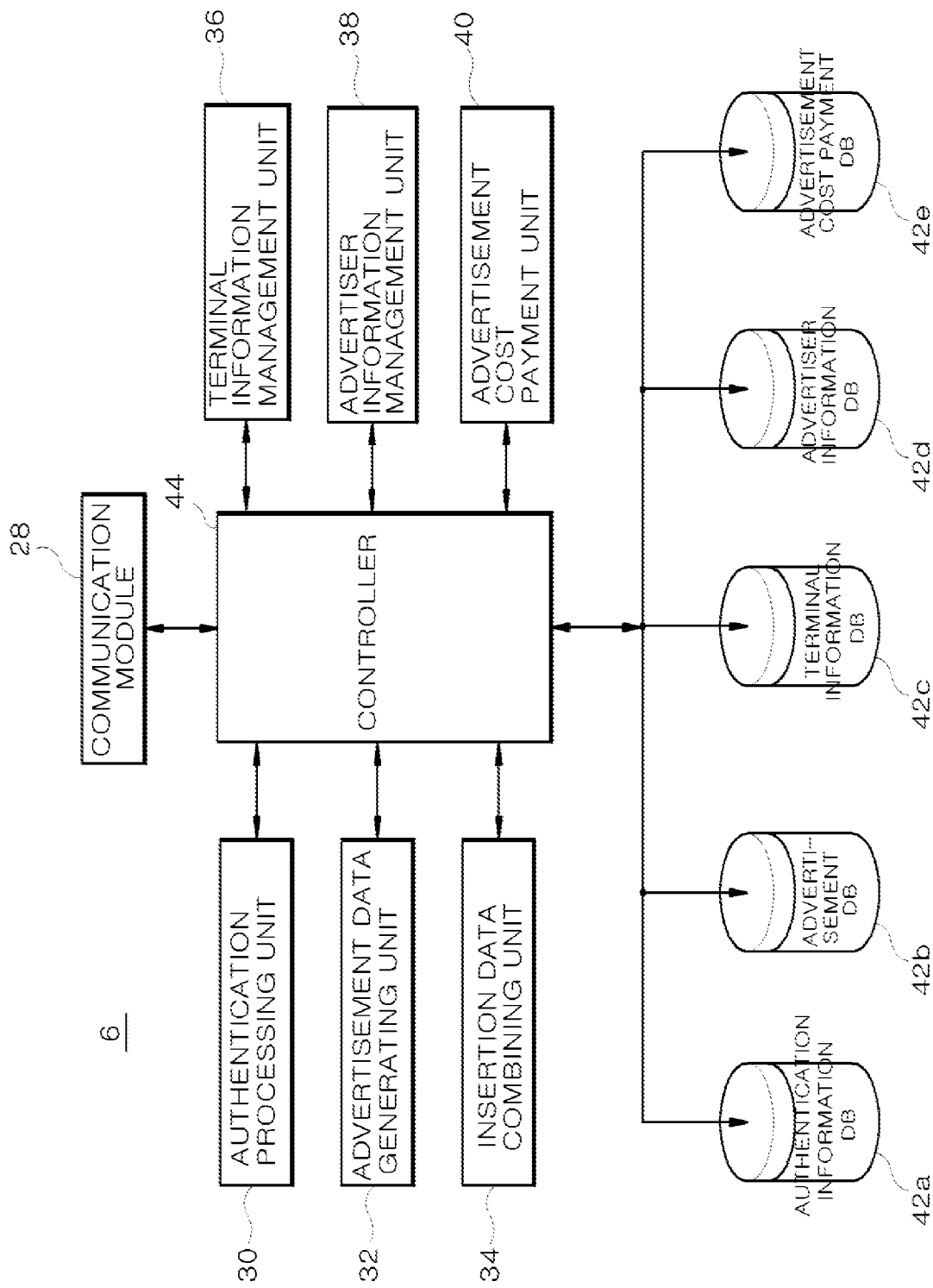
FIG. 5 is a block diagram showing the configuration of an advertisement data transmission server provided in the system for controlling automatic exposure of broadcast advertisement data according to the first exemplary embodiment of the present invention.

FIG. 5 is a block diagram showing the configuration of the advertisement data transmission server provided in the system for controlling automatic exposure of broadcast advertisement data according to the first exemplary embodiment of the present invention.

With reference to FIG. 5, the advertisement data transmission server 6 provided in the system for controlling automatic exposure of broadcast advertisement data according to the first embodiment includes a communication module, an authentication processing unit, an advertisement data generating unit, an insertion data combining unit, a terminal information management unit, an advertiser information management unit, an advertisement cost payment unit, an authentication information DB, an advertisement DB, a terminal information DB, an advertiser information DB, an advertisement cost payment DB, and a controller.

Reference numeral 28 denotes a communication module for performing data communication with the broadcast output terminals 2a~2n and the advertiser terminals 10a~10n to upload or download various data, and performing protocol matching or data filtering.

Reference numeral 30 denotes an authentication processing unit for performing authentication to determine whether or not a viewer or an advertiser who wants to perform data transmission through the broadcast output terminals 2a~2n and the advertiser terminals 10a~10n is true.

Reference numeral 32 denotes an advertisement data generating unit for receiving advertisement data from the advertiser terminals 10a~10n and storing the same, and generating advertisement data including company event information and image information and transmitting the generated advertisement data to the broadcast output terminals 2a~2n.

Reference numeral 34 denotes an insertion data combining unit for inserting the company event information and image information into the advertisement data by interworking with the advertisement data generating unit 32.

Reference numeral 36 denotes a terminal information management unit for managing terminal unique code information of the broadcast output terminals 2a~2n and the advertiser terminals 10a~10n to classify received data by unique codes. Reference numeral 38 denotes an advertiser information management unit for managing information regarding an advertisement cost previously transferred by an advertiser and personal information of the advertiser including area information.

Reference numeral 40 denotes an advertisement cost payment unit for paying an advertisement cost in proportion to an output time of advertisement data output through the broadcast output terminals 2a~2n.

Reference numeral 42a denotes an authentication DB for storing authentication information for determining whether or not a viewer and an advertiser are true, and reference numeral 42b denotes an advertisement DB for storing advertisement data transmitted from the advertiser terminals 10a~10n. Reference numeral 42c denotes a terminal information DB for storing terminal unique code information of the broadcast output terminals 2a~2n and the advertiser terminals 10a~10n and area information matching with the unique code information.

Reference numeral 42d denotes an advertiser information DB for storing information regarding an advertisement cost previously transferred by an advertiser and personal information of the advertiser including area information, and reference numeral 42e denotes an advertisement cost payment DB for storing advertisement output cost payment information of the advertiser.

Reference numeral 44 denotes a controller for receiving advertisement data from the advertiser terminals 10a~10n and storing the same, receiving an advertisement output request signal from the broadcast output terminals 2a~2n and corresponding terminal information and registering the same, generating advertisement data including company event information and image information, and transmitting the generated advertisement data to the broadcast output terminals 2a~2n at certain time intervals.

Meanwhile, the controller 44 provides control to receive area information of the broadcast output terminals 2a~2n, match the area information to the unique codes of the broadcast output terminals 2a~2n to classify them by areas to allow local advertisement data of each area desired by an advertiser to be transmitted to each of the broadcast output terminals 2a~2n.

The function and operation of the system for controlling automatic exposure of broadcast advertisement data according to the first exemplary embodiment of the present invention will now be described in detail with reference to the accompanying drawings.

Figure 6A:
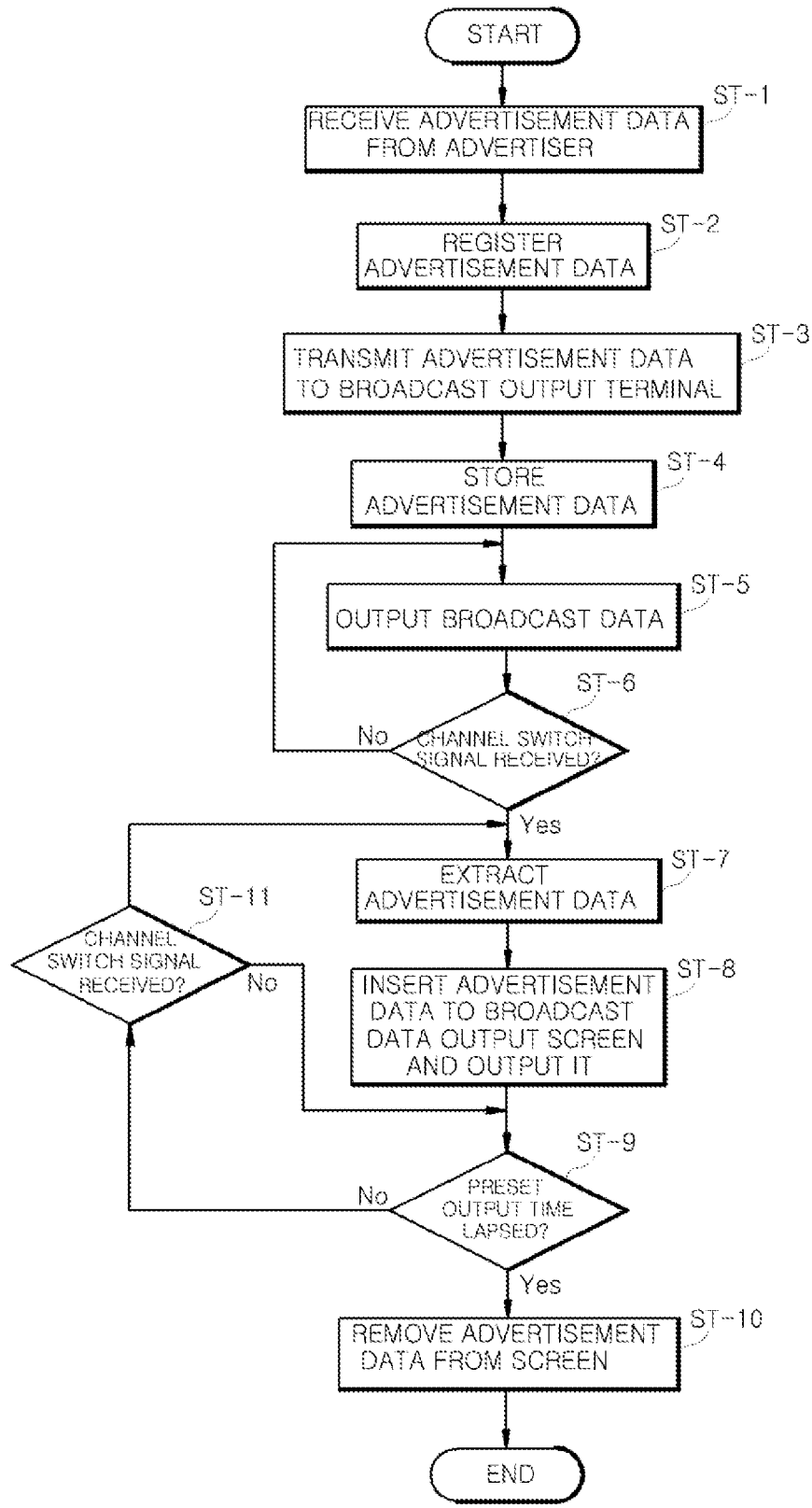
FIGS. 6a and 6b are flowcharts illustrating a signal flow of the system for controlling automatic exposure of broadcast advertisement data according to the first exemplary embodiment of the present invention.
Figure 6B:
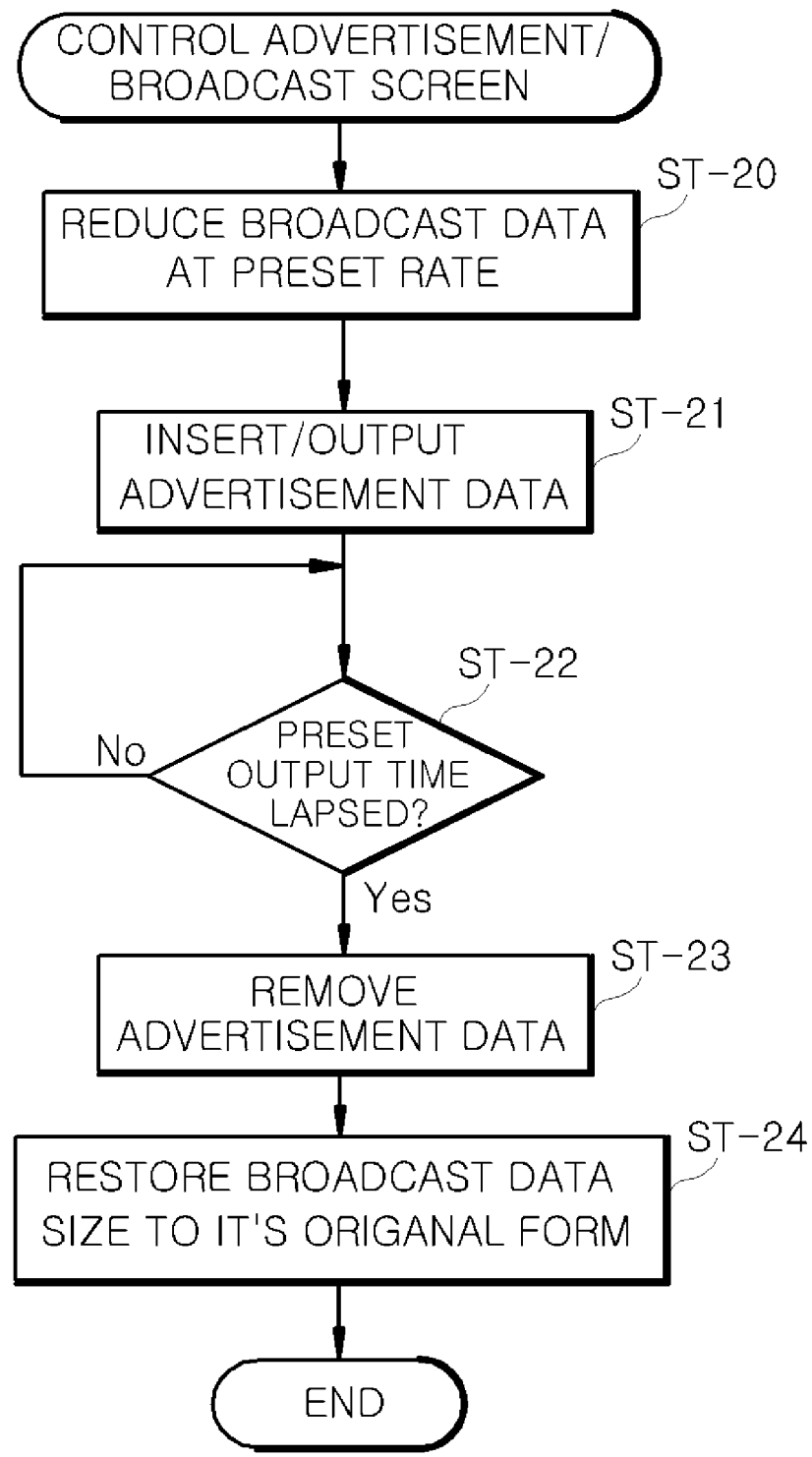

FIGS. 6a and 6b are flowcharts illustrating a signal flow of the system for controlling automatic exposure of broadcast advertisement data according to the first exemplary embodiment of the present invention.

First, as shown in FIG. 6a, the advertisement data transmission server 6 included in the system for controlling automatic exposure of broadcast advertisement data according to the first embodiment receives advertisement data from the plurality of advertiser terminals 10a~10n, registers the advertisement data by the advertisers, and generates advertisement data that can be transmitted by inserting company event information (ST-1, ST-2).

Next, the advertisement data transmission server 6 transmits the advertisement data to the plurality of broadcast output terminals 2a~2n connected over the wired/wireless Internet network (ST-3).

In this case, the advertisement data transmission server may transmit updated advertisement data to the broadcast output terminals 2a~2n at certain time intervals, or may transmit received advertisement data in real time.

Also, the advertisement data transmission server 6 may selectively transmit only advertisement data matching with area code information of the broadcast output terminals 2a~2n to the broadcast output terminals 2a~2n.

Then, the broadcast output terminals 2a~2n store the advertisement data transmitted from the advertisement data transmission server 6, and output broadcast data of a terrestrial wave, a satellite broadcast, and a cable broadcast through their screen (ST-4, ST-5).

In the meantime, the broadcast output terminals 2a~2n determine whether or not advertisement output conditions (e.g., when a channel switch signal is generated or when a power ON/OFF signal is generated) are met. When the advertisement output conditions are met, the broadcast output terminals 2a~2n extract prestored advertisement data, reduces the broadcast data output to the screen at a certain ratio, and outputs the extracted advertisement data to the remaining space (ST-6, ST-7, ST-8).

Preferably, the advertisement data output through the screen of the broadcast output terminals 2a~2n is automatically given a certain sequential number based on the storage order and set in the broadcast output terminals 2a~2n in advance such that the advertisement data is output to the screen in the corresponding order when a channel is switched or when power is turned on or off.

Meanwhile, the broadcast output terminals 2a~2n drive the timer 26a starting from the time point when the output of the advertisement data is initiated and determine whether or not a preset certain time (e.g., about 10 seconds) has lapsed (ST-9). When the preset time has lapsed, the broadcast output terminals 2a~2n recognize that a corresponding broadcast channel is desired to be viewed, and eliminate the advertisement data output to the screen (ST-10).

Also, the broadcast output terminals 2a~2n determine whether or not a channel switch signal to another channel is applied at a time point when the preset time has not lapsed (ST-11). When a channel switch signal is applied at a time point when the preset time has not lapsed, the process of the present invention returns to step ST-7 in which the advertisement data is output.

With reference to FIG. 6b, in a state that broadcast data of a particular channel is output to the screen, when the advertisement output conditions (e.g., when a channel switch signal is generated or when a power ON/OFF signal is generated) are met, the broadcast output terminals 2a~2n provided in the system for controlling automatic exposure of broadcast advertisement data according to the first embodiment output advertisement data, and in this case, the broadcast output terminals 2a~2n reduce pre-output broadcast data in a preset ratio (ST-20).

Namely, the user may set the output ratio of the advertisement data and the broadcast data in the broadcast output terminals 2a~2n in advance. For example, when the entire screen ratio is assumed to be 10, the output ratio may be set such that advertisement data versus broadcast data is 2:8. Also, it may be set to be 3:7, 4:6, 5:5, and the like.

Thus, the broadcast output terminals 2a~2n determine whether or not the advertisement data output conditions are met, and when the advertisement data output conditions are met, the broadcast output terminals 2a~2n reduces the broadcast data output to the screen at a certain ratio and inserts the advertisement data to a lower end portion of the screen. Then, the screen is configured as shown in FIG. 3 (ST-21).

Next, the broadcast output terminals 2a~2n drive the timer 26a starting from a point when the output of the advertisement data is initiated, and then determine whether or not the preset certain time (about 10 seconds) has lapsed (ST-22). When the preset time has lapsed, the broadcast output terminals 2a~2n recognize that the corresponding broadcast channel is desired to be viewed, eliminate the advertisement data output to the screen, and recovers the size of the broadcast data to the original state (ST-23, ST-24).

Now, a second exemplary embodiment of the present invention will be described in detail with reference to the accompanying drawings.

In a system for controlling automatic exposure of broadcast advertisement data according to the second exemplary embodiment of the present invention, when the screen image s changed to a different broadcast channel according to a viewer's intention while the viewer is viewing a broadcast program, advertisement data is output to a certain portion of the lower end of an output new channel screen for a certain time, and an advertisement data output time of each viewer is accumulated to automatically support a prize winning event and distribute prize money, whereby the return for viewing an advertisement is shared by viewers.

That is, the system for controlling automatic exposure of broadcast advertisement data according to the second embodiment allows a viewer to set to view advertisement data through the broadcast output terminals 2a~2n and pays the return for viewing the advertisement data. In other words, the system for controlling automatic exposure of broadcast advertisement data according to the second embodiment pays a return for viewing an advertisement in proportion to an advertisement view time.

In addition, the system for controlling automatic exposure of broadcast advertisement data according to the second embodiment adds up the costs intended to be paid by an advertiser to the viewers as a return for viewing an advertisement, draws for a lottery at every certain time interval, and pays the added cost to a viewer.

To this end, the system for controlling automatic exposure of broadcast advertisement data according to the second embodiment is provided with broadcast output terminals 2'a~2'n for receiving a terrestrial wave and satellite broadcast, cable broadcast channel signal and outputting broadcast data to the screen, receiving advertisement data from a remote server and storing the same, determining whether or not advertisement output conditions are met, and outputting corresponding advertisement data along with broadcast data to the screen when the advertisement output conditions are met, and transmitting a terminal unique number and advertisement view time information to the remote server.

Meanwhile, the system for controlling automatic exposure of broadcast advertisement data according to the second embodiment each further includes an advertisement data transmission server 6' for receiving advertisement data from a plurality of advertiser terminals 10a~10n and storing them in advance, and transmitting the same to the broadcast output terminals 2'a~2'n. In order for the broadcast output terminals 2'a~2'n to output advertisement data as a local advertisement reflecting a local area of the broadcast output terminals 2'a~2'n, the advertisement data transmission server 6' stores location information of the respective broadcast output terminals 2'a~2'n as unique codes, and the corresponding unique codes are classified by areas.

Meanwhile, the advertisement data transmission server 6' provides a return, which is proportionate to an output time of an advertisement, to a viewer who has output the advertisement upon receiving advertisement time information output through the broadcast output terminals 2'a~2'n at certain time intervals or in real time from the broadcast output terminals 2'a~2'n, or when power of the broadcast output terminals 2a~2n are turned off. Thus, the advertisement data transmission server 6' receives advertisement time information and a terminal unique number of each of the broadcast output terminals 2'a~2'n, and stores the same.

In addition, the advertisement data transmission server 6' can output advertisement data including event information such as various discount event, and the like by an advertiser to the broadcast output terminals 2'a~2'n.

Figure 7:
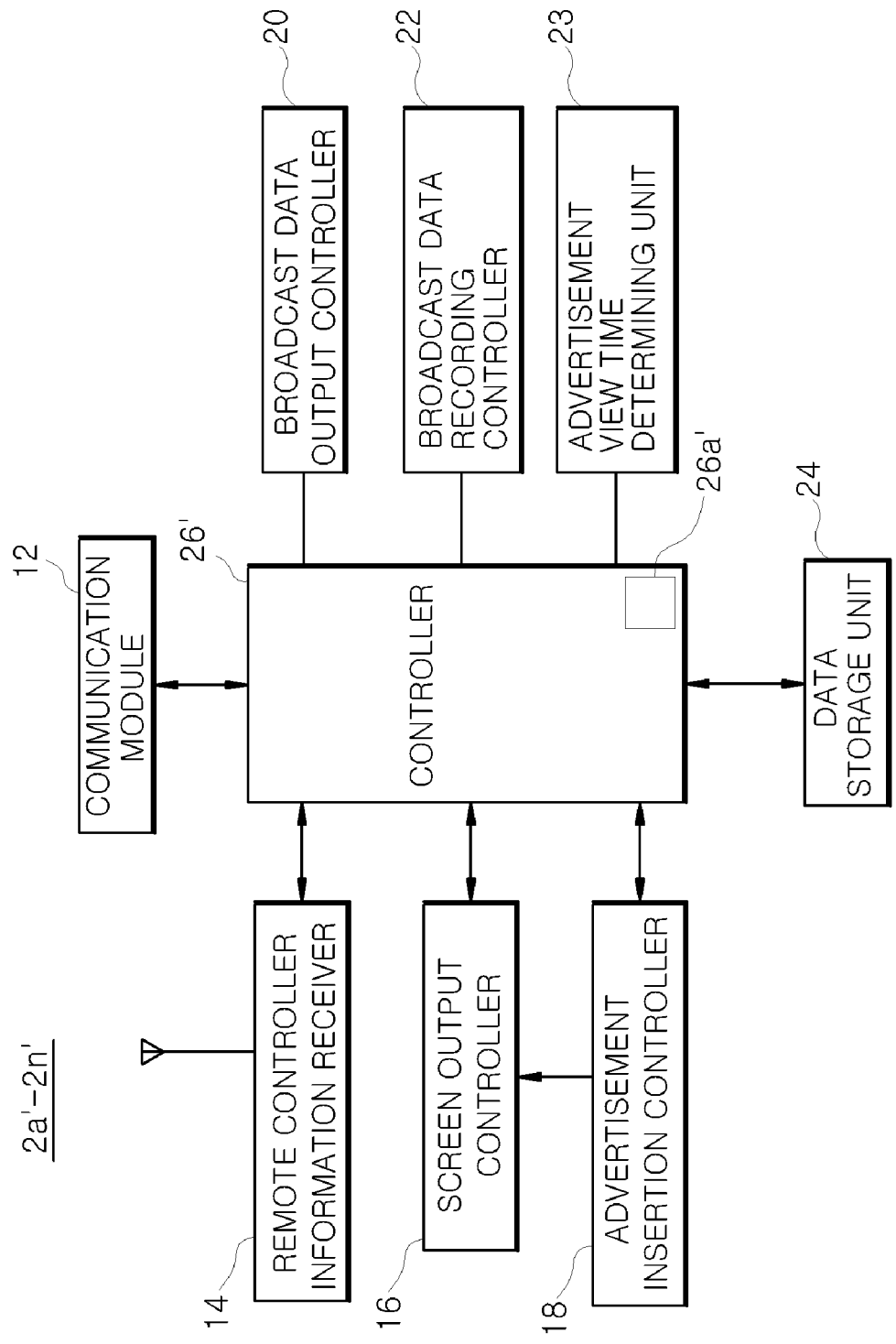
FIG. 7 is a block diagram showing the configuration of a broadcast output terminal provided in a system for controlling automatic exposure of broadcast advertisement data according to a second exemplary embodiment of the present invention.

FIG. 7 is a block diagram showing the configuration of the broadcast output terminal provided in the system for controlling automatic exposure of broadcast advertisement data according to the second exemplary embodiment of the present invention.

With reference to FIG. 7, the broadcast output terminals 2'a~2'n each include a communication module, a remote controller information receiver, a screen output controller, an advertisement insertion controller, a broadcast data output controller, a broadcast data recording controller, an advertisement view time determining unit, a data storage unit, a controller, and a timer.

Reference numeral 12 denotes a communication module connected to a broadcast access network or the Internet network for performing a data transmission and reception with the broadcast data transmission server 4 and the advertisement data transmission server 6', and performing protocol matching and filtering.

Reference numeral 14 denotes a remote controller information receiver for receiving remote control signals with respect to an advertisement data view setting signal of a viewer, a screen ratio adjustment signal of advertisement data, a detailed information check signal of advertisement data, a channel switch signal, and a power ON/OFF signal.

Reference numeral 16 denotes a screen output controller for controlling outputting of broadcast data and advertisement data through the broadcast output terminals 2'a~2'n, and reference numeral 18 denotes an advertisement insertion controller for controlling inserting of advertisement data transmitted from the advertisement data transmission server 6' into a screen area and outputting the same by interworking with the screen output controller 16.

Reference numeral 20 denotes a known broadcast data output controller for controlling receiving of digital broadcast data from the broadcast data transmission server 4 and outputting the received digital broadcast data through the broadcast output terminals 2'a~2'n. The broadcast data output controller 20 refers to the configuration of hardware and software mounted in a general STB (not shown). In general, digital broadcast data is compressed into an MPEG version and decompressed by a decoder (not shown) included in the STB. The broadcast data output controller 20 is one of general elements of the IPTV, which performs a conventional broadcast output function through hardware and OS, so a detailed description thereof will be omitted.

Reference numeral 22 denotes a broadcast data recording controller for receiving the digital broadcast data from the broadcast data transmission server 4 and recording and storing it. The broadcast data recording controller 22 is a known element for controlling a PVR (not shown) included in the general IPTV, which is not requisite for the present invention.

Reference numeral 23 denotes an advertisement view time determining unit for accumulatively calculating a view time of advertisement data exposed through the screen at certain time intervals, and reference numeral 24 denotes a data storage unit for storing the advertisement data transmitted from the advertisement data transmission server 6', storing terminal unique number information, and receiving an advertisement data output setting signal of the viewer and a screen ratio adjustment signal of the advertisement data and storing the set information associated with them.

Reference numeral 26' denotes a controller for controlling outputting of advertisement data to the screen for a certain time period and transmitting advertisement view time information accumulated at certain time intervals to the advertisement data transmission server 6' when an advertisement output condition signal is received from the remote controller information receiver 14, in a state that a setting signal with respect to an advertisement data screen output is received through the remote controller information reception unit 14 and the advertisement data is received from the advertisement data transmission server 6' and stored. Reference numeral 26'a denotes a timer installed in the controller 26' for calculating an advertisement output time.

Meanwhile, the controller 26' has a control routine which is set to generate a control signal to the screen output controller 16 to adjust the output size of advertisement data upon receiving a signal for adjusting the ratio of the advertisement data output from the remote controller information receiver 14, accumulatively calculate an advertisement output time by interworking with the timer 26a and transmit corresponding advertisement view time information to the advertisement data transmission server 6' at every certain time interval, and extract an internal unique code from the data storage unit 24 and transmit the same in transmitting the corresponding advertisement view time information.

Figure 8:
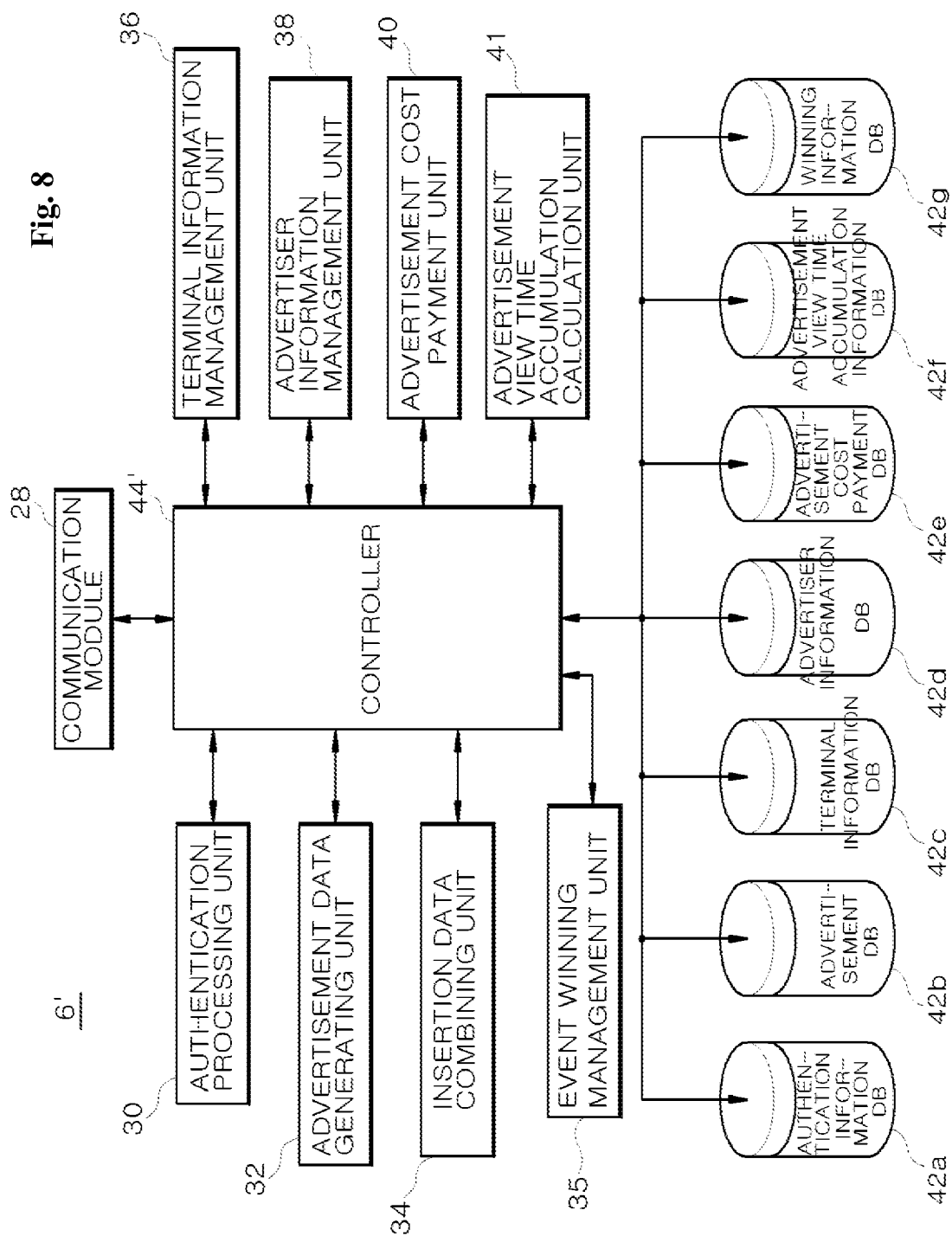
FIG. 8 is a block diagram showing the configuration of an advertisement data transmission server provided in the system for controlling automatic exposure of broadcast advertisement data according to the second exemplary embodiment of the present invention.

FIG. 8 is a block diagram showing the configuration of the advertisement data transmission server provided in the system for controlling automatic exposure of broadcast advertisement data according to the second exemplary embodiment of the present invention.

With reference to FIG. 8, the advertisement data transmission server 6' provided in the system for controlling automatic exposure of broadcast advertisement data according to the second embodiment includes a communication module, an authentication processing unit, an advertisement data generating unit, an insertion data combining unit, an event winning management unit, a terminal information management unit, an advertiser information management unit, an advertisement cost payment unit, an advertisement view time accumulation calculation unit, an authentication information DB, an advertisement DB, a terminal information DB, an advertiser information DB, an advertisement cost payment DB, an advertisement view time accumulation information DB, a winning information DB, and a controller.

Reference numeral 28 denotes a communication module for performing data communication with the broadcast output terminals 2'a~2'n and the advertiser terminals 10a~10n to upload or download various data, and performing protocol matching or data filtering.

Reference numeral 30 denotes an authentication processing unit for performing authentication to determine whether or not a viewer or an advertiser who wants to perform data transmission through the broadcast output terminals 2'a~2'n and the advertiser terminals 10a~10n is true.

Reference numeral 32 denotes an advertisement data generating unit for receiving advertisement data from the advertiser terminals 10a~10n and storing the same, and generating advertisement data including company event information and image information and transmitting the generated advertisement data to the broadcast output terminals 2a~2n.

Reference numeral 34 denotes an insertion data combining unit for inserting the company event information and image information into the advertisement data by interworking with the advertisement data generating unit 32, and reference numeral 35 denotes an event winning management unit for managing event wining to accumulate cost generated as a return for viewing an advertisement provided by viewer's viewing the advertisement and provide it to a viewer by drawing for a lottery or by various event games.

Reference numeral 36 denotes a terminal information management unit for managing terminal unique code information of the broadcast output terminals 2'a~2'n and the advertiser terminals 10a~10n to classify received data by unique codes. Reference numeral 38 denotes an advertiser information management unit for managing information regarding an advertisement cost transferred by an advertiser and personal information of the advertiser including area information.

Reference numeral 40 denotes an advertisement cost payment unit for paying an advertisement cost to be charged to an advertiser in proportion to an output time of advertisement data output through the broadcast output terminals 2'a~2'n. Reference numeral 41 denotes an advertisement view time accumulation calculation unit for accumulatively accumulating calculating advertisement view time information transmitted from the broadcast output terminals 2'a~2'n, and integrating it by the terminals to be set as a prize money.

Reference numeral 42a denotes an authentication information DB for storing authentication information for determining whether or not a viewer and an advertiser are true, and reference numeral 42b denotes an advertisement DB for storing advertisement data transmitted from the advertiser terminals 10a~10n. Reference numeral 42c denotes a terminal information DB for storing terminal unique code information of the broadcast output terminals 2'a~2'n and the advertiser terminals 10a~10n and area information matching with the unique code information.

Reference numeral 42d denotes an advertiser information DB for storing information regarding an advertisement cost previously transferred by an advertiser and personal information of the advertiser including area information, and reference numeral 42e denotes an advertisement cost payment DB for storing advertisement output cost payment information of the advertiser.

Reference numeral 42f denotes an advertisement view time accumulation information DB for accumulatively calculating advertisement view time information by terminals and storing integrated information by the terminals, and reference numeral 42g denotes a winning information DB for storing information about cost offered by an advertiser in proportion to the integrated advertisement view time and provided to a prize winner by a lottery or game.

Reference numeral 44' denotes a controller for receiving advertisement data from the advertiser terminals 10a~10n and storing the same, receiving an advertisement output request signal from the broadcast output terminals 2'a~2'n and corresponding terminal information and registering the same, generating advertisement data including company event information and image information, transmitting the generated advertisement data to the broadcast output terminals 2'a~2'n at certain time intervals, receiving and accumulatively calculating advertisement view time information transmitted from the broadcast output terminals 2'a~2'n, settling an advertisement cost with an advertiser in proportion to the accumulatively calculated advertisement view time information, and selecting a prize winner by lottery or game and paying the advertisement cost as a prize money.

The function and operation of the system for controlling automatic exposure of broadcast advertisement data configured as described above according to the second exemplary embodiment of the present invention will now be described in detail with reference to the accompanying drawings.

Figure 9:
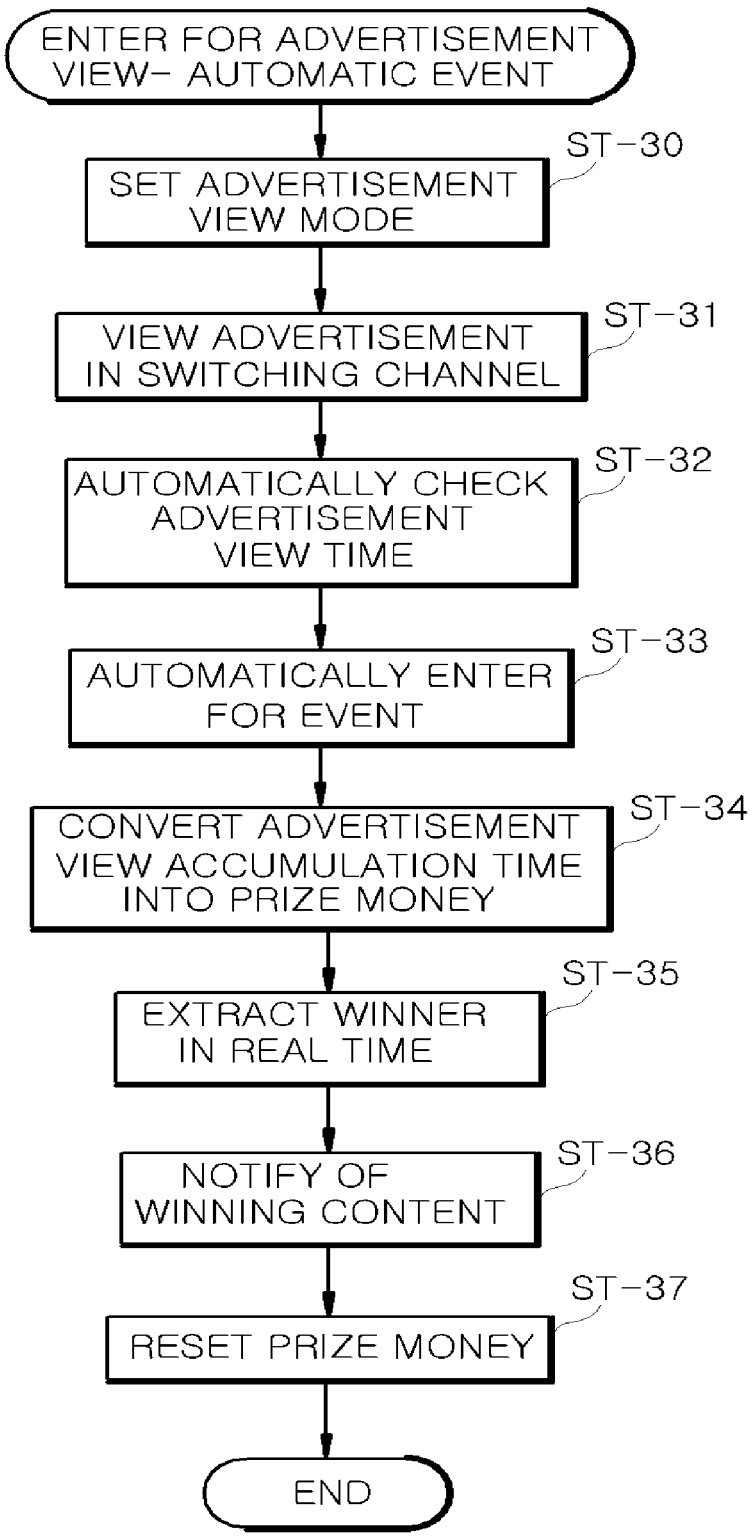
FIG. 9 is a flowchart illustrating a signal flow of the system for controlling automatic exposure of broadcast advertisement data according to the second exemplary embodiment of the present invention.

FIG. 9 is a flowchart illustrating a signal flow of the system for controlling automatic exposure of broadcast advertisement data according to the second exemplary embodiment of the present invention.

First, in the system for controlling automatic exposure of broadcast advertisement data according to the second embodiment, the broadcast output terminals 2'a~2'n receive an external key signal of a viewer and are set to an advertisement view mode (ST-30).

Then, the broadcast output terminals 2'a~2'n output advertisement data which has been previously received and stored along with broadcast data to the screen when a channel is switched. In this case, the present invention is not limited to the time when a channel is switched, and the advertisement data may be also output to the screen for a certain time when power is turned on or off (ST-31).

In this state, the broadcast output terminals 2'a~2'n automatically check an advertisement view time to accumulatively calculate it, and transmit advertisement view time information and terminal information to an advertisement data transmission server 6' in real time or at certain time intervals to automatically draw for a lottery or enter for a game event (ST-32, ST-33).

Then, the advertisement data transmission server 6' receives the advertisement view time information and terminal information from the broadcast output terminals 2'a~2'n and stores the same, calculates an advertisement cost according to the advertisement view time, settles it with an advertiser, and draws a viewer with respect to the accumulated advertisement cost at every certain time intervals (ST-34, ST-35).

Namely, the advertisement data transmission server 6' may arbitrarily extract a terminal unique number of the broadcast output terminals 2'a~2'n and process it as a prize winner. When a viewer is selected as a prize winner through such a lottery process, the advertisement data transmission server 6' notifies the corresponding broadcast output terminals 2'a~2'n of the winning content and outputs it to the screen (ST-36).

And then, the advertisement data transmission server 6' resets the prize money, which is the accumulated amount, of the advertisement cost (ST-37).

Now, a third exemplary embodiment of the present invention will be described in detail with reference to the accompanying drawings.

In a system for controlling automatic exposure of broadcast advertisement data according to the third exemplary embodiment of the present invention, when the screen image is changed to a different broadcast channel according to a viewer's intention while the viewer is viewing a broadcast program, advertisement data is output to a certain portion of the lower end of an output new channel screen for a certain time, and an advertisement group is classified according to the size of the advertisement data previously set by a viewer and enabled to interwork with prize money.

Namely, as in the first and second exemplary embodiments of the present invention, in the system for controlling automatic exposure of broadcast advertisement data according to the third exemplary embodiment of the present invention, previously stored advertisement data or advertisement data received in real time is output to a lower side of broadcast data output through the broadcast output terminals 2'a~2'n when certain conditions are met, and in this case, the viewer can adjust the size of the advertisement data. Thus, viewers who have adjusted advertisement data to have the same size are classified as a group, and a prize winner is selected by drawing each group separately. Then, according to the third exemplary embodiment of the present invention, preferably, the advertisement data transmission server 6 processes such that prize money of a viewer group having a larger setting size of advertisement data is greater than that of a viewer group having a smaller setting size of advertisement data.

Thus, the broadcast output terminals 2'a~2'n included in the system for controlling automatic exposure of broadcast advertisement data according to the third embodiment perform the same function and same configuration as those of the first and second embodiments, except that advertisement data size information is set to be automatically transmitted together when the controller transmits information to the advertisement data transmission server 6.

In addition, the advertisement data transmission server 6 included in the system for controlling automatic exposure of broadcast advertisement data according to the third embodiment receives advertisement data size information and view time information from the plurality of broadcast output terminals 2a~2n, classifies viewer groups according to the advertisement data sizes, divides different prize money for each of the classified viewer groups, and separately draws for a lottery by the viewer groups.

The function and operation of the system for controlling automatic exposure of broadcast advertisement data configured as described above according to the third exemplary embodiment of the present invention will now be described in detail with reference to the accompanying drawings.

Figure 10:
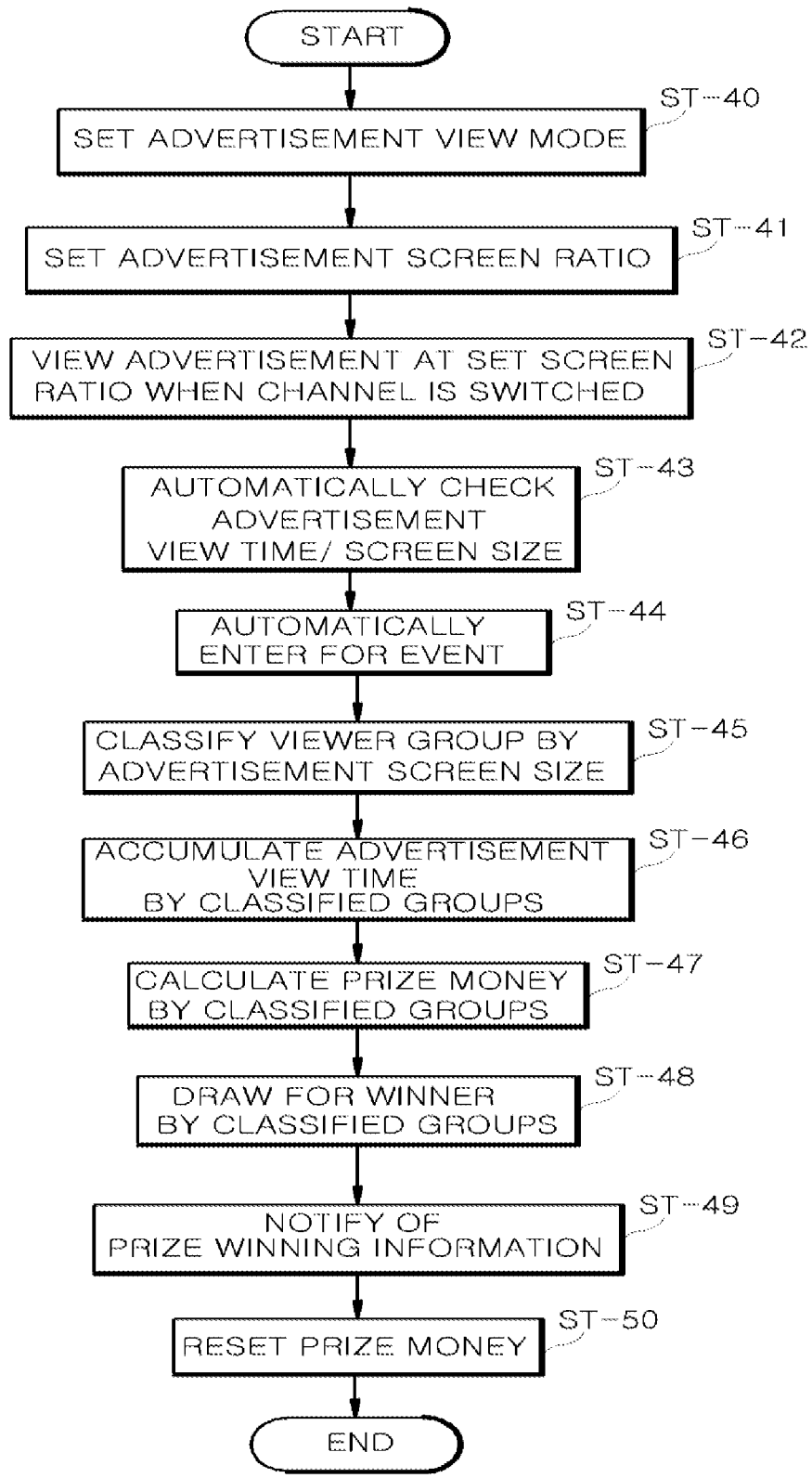
FIG. 10 is a flowchart illustrating a signal flow of a system for controlling automatic exposure of broadcast advertisement data according to a third exemplary embodiment of the present invention.

FIG. 10 is a flowchart illustrating a signal flow of the system for controlling automatic exposure of broadcast advertisement data according to a third exemplary embodiment of the present invention.

First, in the system for controlling automatic exposure of broadcast advertisement data according to the third embodiment, the broadcast output terminals 2a~2n receive an external key signal of a viewer and are set to an advertisement view mode (ST-40).

Upon receiving the external key signal from the viewer, the broadcast output terminals 2a~2n sets an advertisement data output screen ratio (ST-41).

Then, the broadcast output terminals 2a~2n output advertisement data which has been previously received and stored along with broadcast data to the screen when a channel is switched in the set screen ratio. In this case, the present invention is not limited to the time when a channel is switched, and the advertisement data may be output to the screen for a certain time when power is turned on or off (ST-42).

In this state, the broadcast output terminals 2*a*~2*n* automatically check an advertisement view time to accumulatively calculate it, and transmit advertisement view time information including size information of the advertisement data and terminal information to an advertisement data transmission server 6 in real time or at certain time intervals, and automatically draw for a lottery or enter for a game event (ST-43, ST-44).

Then, the advertisement data transmission server 6 receives the advertisement view time information, the advertisement data size information, and terminal information from the broadcast output terminals 2*a*~2*n* and stores the same, and classifies viewer groups according to the advertisement screen sizes (ST-45).

And then, the advertisement data transmission server 6 accumulatively calculates an advertisement cost according to an advertisement view time of each classified group, settles it with an advertiser, and draws a viewer with respect to the accumulated advertisement cost at every certain time interval (ST-46, ST-47, ST-48).

Namely, the advertisement data transmission server 6 may arbitrarily extract a terminal unique number of the broadcast output terminals 2*a*~2*n* and process it as a prize winner. When a viewer is selected as a prize winner through such a drawing process, the advertisement data transmission server 6 notifies the corresponding broadcast output terminals 2*a*~2*n* of the winning content and outputs it to the screen (ST-49).

And then, the advertisement data transmission server 6 resets the prize money, the accumulated amount, of the advertisement cost (ST-50).

Now, a fourth exemplary embodiment of the present invention will be described in detail with reference to the accompanying drawings.

Figure 11:
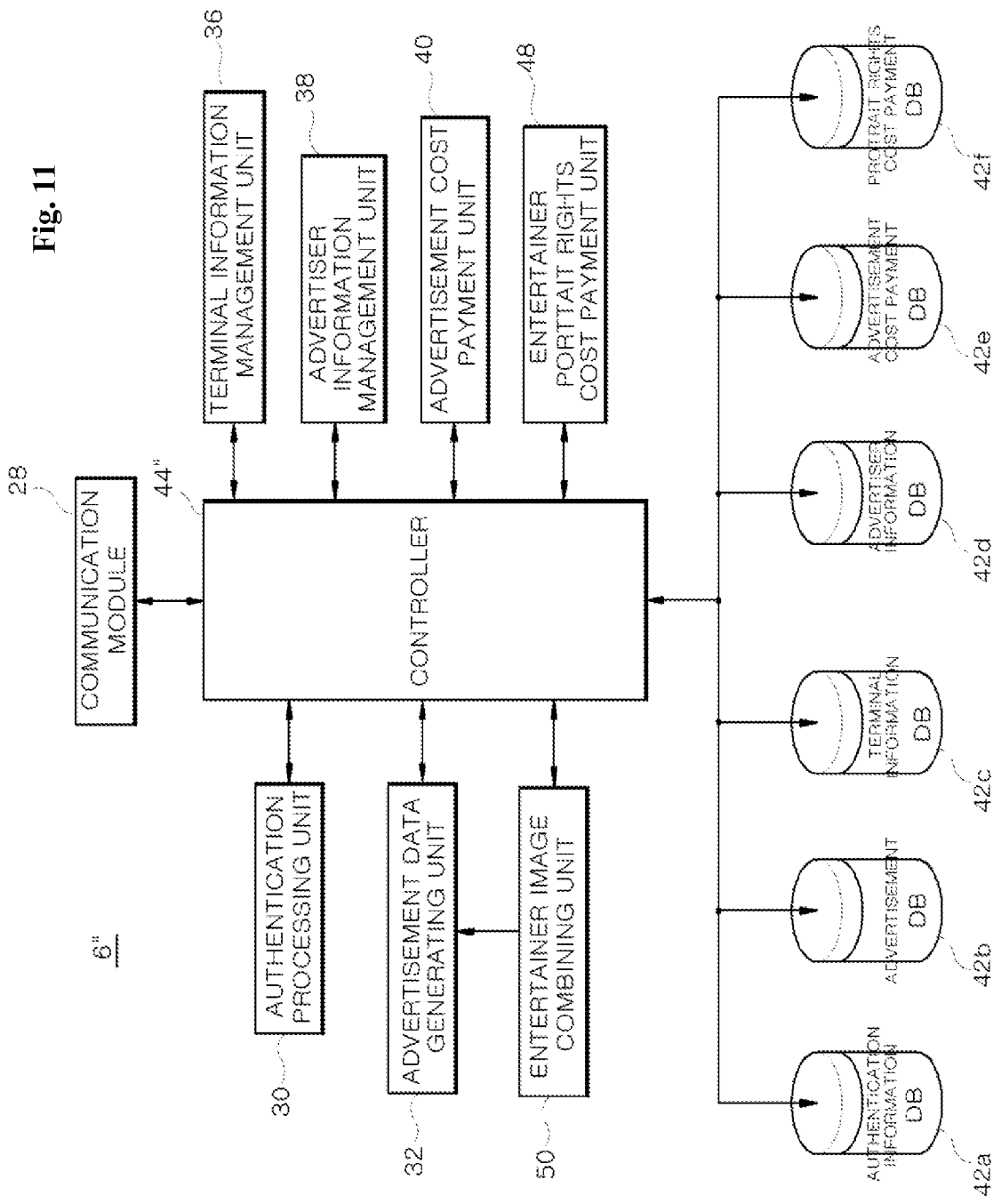
FIG. 11 is a block diagram showing the configuration of an advertisement data transmission server provided in a system for controlling automatic exposure of broadcast advertisement data according to a fourth exemplary embodiment of the present invention.

FIG. 11 is a block diagram showing the configuration of the advertisement data transmission server provided in a system for controlling automatic exposure of broadcast advertisement data according to a fourth exemplary embodiment of the present invention;

With reference to FIG. 11, in a system for controlling automatic exposure of broadcast advertisement data according to the fourth exemplary embodiment of the present invention, when the screen image is changed to a different broadcast channel according to a viewer's intention while the viewer is viewing a broadcast program, advertisement data is output to a certain portion of the lower end of an output new channel screen for a certain time, and in this case, an advertiser may designate a particular entertainer and an image or video data of the entertainer is automatically inserted into the advertisement data.

Namely, in the system for controlling automatic exposure of broadcast advertisement data according to the fourth embodiment, when the advertiser designates one of the entertainer images stored in an advertisement data transmission server 6", the designated entertainer image is automatically combined to generate advertisement data desired to be transmitted to the broadcast output terminals 2*a*~2*n*.

In this case, in designating an entertainer image, when a channel is switched through the broadcast output terminals 2*a*~2*n*, an image of one of entertainers appearing in a new channel program or one of entertainers appearing in a next program of the corresponding channel is automatically extracted to generate advertisement data to be output to the broadcast output terminals 2*a*~2*n*.

To this end, the code of the entertainer to be appeared must be included in the broadcast data, and preferably, the entertainer code is included in a previous broadcast program as well as in a currently output broadcast program.

In addition, the broadcast output terminals 2*a*~2*n* must automatically extract the entertainer code included in the broadcast program and transmit the same to the advertisement data transmission server 6". Upon receiving the entertainer code information, the advertisement data transmission server 6" extracts the entertainer image matching with the corresponding entertainer code and transmits the same to the broadcast output terminals 2*a*~2*n* so that the corresponding entertainer image can be output along with the prestored advertisement data to the screen.

Thus, the advertisement data transmission server 6" included in the system for controlling automatic exposure of broadcast advertisement data according to the fourth embodiment is configured to include a communication module, an authentication processing unit, an advertisement data generating unit, an entertainer image combining unit, a terminal information management unit, an advertiser information management unit, an advertisement cost payment unit, an entertainer portrait rights cost payment unit, an authentication information DB, an advertisement DB, a terminal information DB, an advertiser information DB, an advertisement cost payment DB, a portrait rights cost payment DB, and a controller.

Reference numeral 28 denotes a communication module for performing data communication with the broadcast output terminals 2*a*~2*n* and the advertiser terminals 10*a*~10*n* via a wired/wireless Internet network to upload or download various data, and performing protocol matching or data filtering.

Reference numeral 30 denotes an authentication processing unit for performing authentication to determine whether or not a viewer or an advertiser who wants to perform data transmission through the broadcast output terminals 2*a*~2*n* and the advertiser terminals 10*a*~10*n* is true.

Reference numeral 32 denotes an advertisement data generating unit for receiving advertisement data from the advertiser terminals 10*a*~10*n* and storing the same, and generating advertisement data including company event information and entertainer image information and transmitting the generated advertisement data to the broadcast output terminals 2*a*~2*n*.

Reference numeral 50 denotes an entertainer image combining unit for inserting entertainer image information into the advertisement data by interworking with the advertisement data generating unit 32.

Reference numeral 36 denotes a terminal information management unit for managing terminal unique code information of the broadcast output terminals 2*a*~2*n* and the advertiser terminals 10*a*~10*n* to classify received data by unique codes. Reference numeral 38 denotes an advertiser information management unit for managing information regarding an advertisement cost previously transferred by an advertiser and personal information of the advertiser including area information.

Reference numeral 40 denotes an advertisement cost payment unit for paying an advertisement cost in proportion to an output time of advertisement data output through the broadcast output terminals 2*a*~2*n*. Reference numeral 48 denotes an entertainer portrait rights cost payment unit for paying the cost of portrait rights according to the exposure of the entertainer image data included in the advertisement data output through the broadcast output terminals 2*a*~2*n*.

Reference numeral 42*a* denotes an authentication DB for storing authentication information for determining whether or not a viewer and an advertiser are true, and reference numeral 42*b* denotes an advertisement DB for storing advertisement data transmitted from the advertiser terminals 10*a*~10*n*. Reference numeral 42*c* denotes a terminal information DB for storing terminal unique code information of the broadcast output terminals 2*a*~2*n* and the advertiser terminals 10*a*~10*n* and area information matching with the unique code information.

Reference numeral 42*d* denotes an advertiser information DB for storing information regarding an advertisement cost previously transferred by an advertiser and personal information of the advertiser including area information, and reference numeral 42*e* denotes an advertisement cost payment DB for storing advertisement output cost payment information of the advertiser. Reference numeral 42*h* denotes a portrait rights cost payment DB for storing portrait rights cost payment information according to the exposure of the entertainer image data included in the advertisement data output through the broadcast output terminals 2*a*~2*n*.

Reference numeral 44 denotes a controller for receiving advertisement data and designated entertainer information from the advertiser terminals 10*a*~10*n* and storing the same, receiving an advertisement output request signal from the broadcast output terminals 2*a*~2*n* and corresponding terminal information and registering the same, generating advertisement data including company event information and entertainer image information, and transmitting the generated advertisement data to the broadcast output terminals 2*a*~2*n* at certain time intervals.

Meanwhile, when an entertainer code included in a broadcast program output as a channel of the broadcast output terminals 2*a*~2*n* is switched is extracted by the broadcast output terminals 2*a*~2*n* and then transmitted, the controller 44 provides control to extract entertainer image data matching with the corresponding entertainer code and include it in the advertisement data output to a lower end portion of the screen of the broadcast output terminals 2*a*~2*n*.

To this end, the advertisement data transmission server 6" has entertainer image data matching with the entertainer code previously stored therein.

Now, the function and operation of the system for controlling automatic exposure of broadcast advertisement data configured as described above according to the fourth exemplary embodiment of the present invention will now be described in detail with reference to the accompanying drawings.

Figure 12:
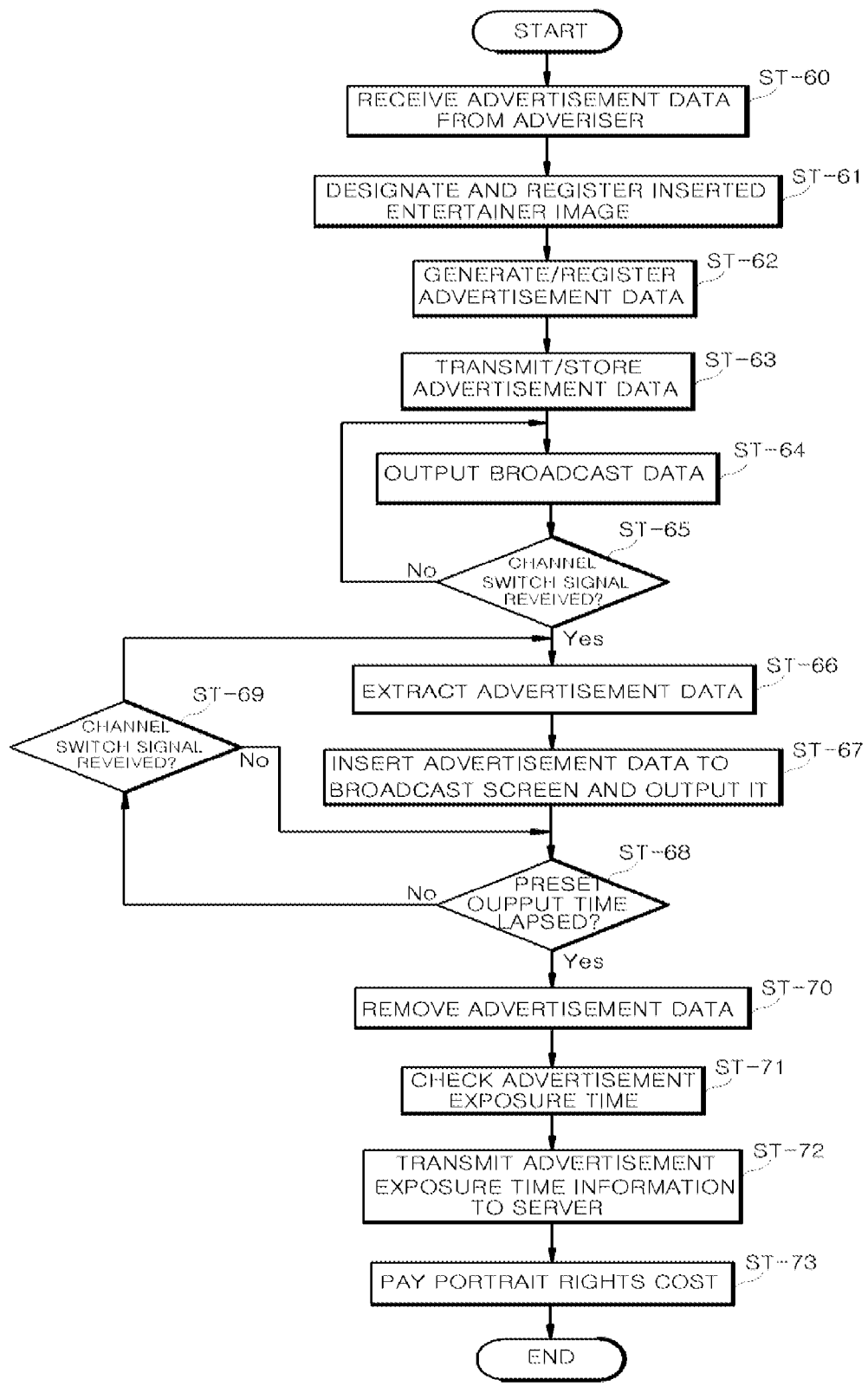
FIGS. 12 and 13 are flowcharts illustrating a signal flow of the system for controlling automatic exposure of broadcast advertisement data according to the fourth exemplary embodiment of the present invention.
Figure 13:
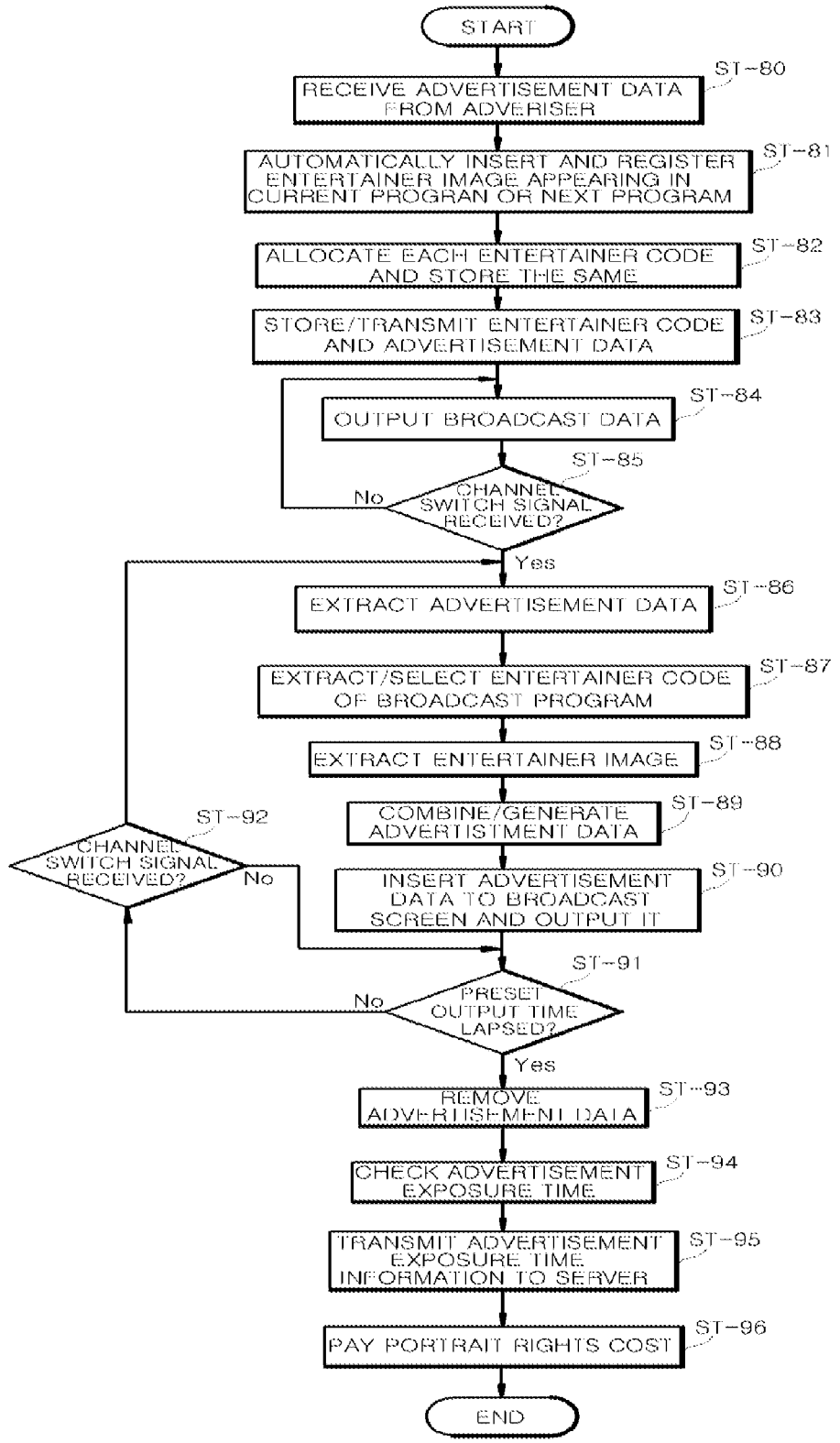

FIGS. 12 and 13 are flowcharts illustrating a signal flow of the system for controlling automatic exposure of broadcast advertisement data according to the fourth exemplary embodiment of the present invention.

First, with reference to FIG. 12, the advertisement data transmission server 6" included in the system for controlling automatic exposure of broadcast advertisement data according to the fourth embodiment receives advertisement data from the plurality of advertiser terminals 10*a*~10*n*, registers the advertisement data by the advertisers, and receives entertainer image designation information and registers the same (ST-60, ST-61).

Then, the advertisement data transmission server 6" combines image data of a corresponding entertainer designated by the advertiser with corresponding advertisement data to generate advertisement data, and registers the same (ST-62).

Next, the advertisement data transmission server 6" transmits the advertisement data to the plurality of broadcast output terminals 2*a*~2*n* connected via the wired/wireless Internet network, and the broadcast output terminals 2*a*~2*n* store the received corresponding advertisement data (ST-63).

In this case, the advertisement data transmission server 6" may selectively transmit only advertisement data matching with area code information of the broadcast output terminals 2*a*~2*n* to the broadcast output terminals 2*a*~2*n*.

Then, the broadcast output terminals 2*a*~2*n* store the advertisement data received from the advertisement data transmission server 6", and output broadcast data of a terrestrial wave, a satellite broadcast, and a cable broadcast through their screen (ST-64).

In the meantime, the broadcast output terminals 2*a*~2*n* determine whether or not advertisement output conditions (e.g., when a channel switch signal is generated or when a power ON/OFF signal is generated) are met. When the advertisement output conditions are met, the broadcast output terminals 2*a*~2*n* extract prestored advertisement data, reduce the broadcast data output to the screen at a certain ratio, and output the extracted advertisement data to the remaining space (ST-65, ST-66, ST-67).

Meanwhile, the broadcast output terminals 2*a*~2*n* drive the timer 26*a* starting from the time point when the output of the advertisement data is initiated and determine whether or not a preset certain time (about 10 seconds) has lapsed (ST-68). When the preset time has lapsed, the broadcast output terminals 2*a*~2*n* recognize that a corresponding broadcast channel is desired to be viewed, and eliminate the advertisement data output to the screen (ST-70).

Also, the broadcast output terminals 2*a*~2*n* determine whether or not a channel switch signal is applied at a time point when the preset time has not lapsed (ST-69). When a channel switch signal is applied at a time point when the pre-set time has not lapsed, the process returns to step ST-66 in which the advertisement data is output.

Next, in a state that the advertisement data is eliminated, the broadcast output terminals 2*a*~2*n* check an advertisement exposure time in real time or at certain time intervals and transmit the advertisement exposure time to the advertisement data transmission server 6". Then, the advertisement data transmission server 6" settles the portrait rights cost of the corresponding entertainer based on the corresponding advertisement exposure time information (ST-71, ST-72, ST-73).

Meanwhile, with reference to FIG. 13, the advertisement data transmission server 6" included in the system for controlling automatic exposure of broadcast advertisement data according to the fourth embodiment receives advertisement data from the plurality of advertiser terminals 10*a*~10*n*, and registers the advertisement data by the advertisers (ST-80).

And then, the advertisement data transmission server 6" registers a plurality of domestic entertainer image information (ST-81).

Next, the broadcast data transmission server 4 assigns an entertainer code of each broadcast program, inserts the entertainer code appearing in broadcast data of each broadcast program, and registers the same.

In this case, the entertainer code may be inserted into a previously output broadcast program, as well as into a currently output broadcast program. In this case, when a broadcast output to the broadcast output area (200 in FIG. 3) is an advertisement broadcast, an entertainer image output to the advertisement output area (300 in FIG. 3) under it will be an entertainer image appearing a broadcast program after the advertisement broadcast.

Next, the broadcast data transmission server 4 transmits the broadcast program information and the entertainer code information included in the corresponding broadcast program to the advertisement data transmission server 6" at certain time intervals, so that the advertisement data transmission server 6" stores the corresponding information (ST-82).

In this state, the advertisement data transmission server 6" transmits the advertisement data to the plurality of broadcast output terminals 2a~2n connected via the wired/wireless Internet network, and the broadcast output terminals 2a~2n store the received corresponding advertisement data (ST-83).

Then, the broadcast output terminals 2a~2n store the advertisement data received from the advertisement data transmission server 6", and output broadcast data of a terrestrial wave, a satellite broadcast, and a cable broadcast through their screen (ST-84).

During this process, the broadcast output terminals 2a~2n determine whether or not advertisement output conditions (e.g., when a channel switch signal is generated or when a power ON/OFF signal is generated) are met. When the advertisement output conditions are met, the broadcast output terminals 2a~2n extract the advertisement data previously stored therein, extract the entertainer code information included in the corresponding broadcast data, is connected to the advertisement data transmission server 6" via the wired/wireless Internet network, receives a corresponding entertainer image matching with a corresponding code number, and insert the received entertainer image to advertisement data. And then, the broadcast output terminals 2a~2n reduce the broadcast data output to the screen at a certain ratio and output the extracted advertisement data to the remaining space (ST-85, ST-86, ST-87, ST-88, ST-89, ST-90).

Meanwhile, the broadcast output terminals 2a~2n drive the timer 26a starting from the time point when the output of the advertisement data is initiated and determine whether or not a preset certain time (i.e., about 10 seconds) has lapsed (ST-91). When the preset time has lapsed, the broadcast output terminals 2a~2n recognize that a corresponding broadcast channel is desired to be viewed, and eliminate the advertisement data output to the screen (ST-93).

Also, the broadcast output terminals 2a~2n determine whether or not a channel switch signal is applied at a time point when the pre-set time has not lapsed (ST-92). When a channel switch signal is applied at a time point when the pre-set time has not lapsed, the process returns to step ST-86 in which the advertisement data is output.

Meanwhile, in a state that the advertisement is eliminated, the broadcast output terminals 2a~2n check an advertisement exposure time in real time or at certain time intervals and transmit the advertisement exposure time to the advertisement data transmission server 6". Then, the advertisement data transmission server 6" settles the portrait rights cost of the corresponding entertainer based on the corresponding advertisement exposure time information (ST-94, ST-95, ST-96).

Although not shown, in the system for controlling automatic exposure of broadcast advertisement data according to the embodiment of the present invention, the broadcast output terminals 2a~2n may receive an entertainer code and an entertainer image corresponding to the code from the advertisement data transmission server 6" and store them in advance, and in this state, the entertainer code may be automatically extracted from a broadcast program and the entertainer image matching with the code may be extracted from a memory (not shown) and inserted into advertisement data so as to be exposed.

In detail, the advertisement data transmission server 6" receives advertisement data from the plurality of advertiser terminals 10a~10n and registers the advertisement data by the advertisers, and receives an automatic entertainer image insertion mode signal corresponding to a broadcast program and registers the same.

And then, the advertisement data transmission server 6" registers a plurality of domestic entertainer image information by matching with them to entertainer codes. And, the advertisement data transmission server 6" transmits the plurality of domestic entertainer image information and entertainer code information of each image to the broadcast output terminals 2a~2n.

Then, the broadcast output terminals 2a~2n store the corresponding data.

In addition, the broadcast data transmission server 4 inserts an entertainer code appearing in each broadcast program and registers it, and the advertisement data transmission server 6" transmits advertisement data to the plurality of broadcast output terminals 2a~2n connected via the wired/wireless Internet network.

Then, the broadcast output terminals 2a~2n store the advertisement data, and output broadcast data of a terrestrial wave, a satellite broadcast, and a cable broadcast. Namely, the broadcast output terminals 2a~2n receive a broadcast program output signal of the user and output broadcast program of the corresponding channel to the screen.

And then, the broadcast output terminals 2a~2n extract the entertainer code included in the broadcast data in real time and determine whether or not advertisement output conditions are met. The advertisement output conditions refer to when a channel switch signal is generated or when power is turned on or off.

When the advertisement output conditions are met, the broadcast output terminals 2a~2n extract image information matching with an entertainer code included in a broadcast program of a corresponding time point or a next broadcast program, insert the extracted image information into advertisement data, and output the advertisement data along with the broadcast data to the screen.

Namely, when the currently output broadcast program is weather information or radiowave advertisement data and the next broadcast program is a miniseries, the broadcast output terminals 2a~2n may extract the code of the main character of the miniseries which is the next broadcast program, and expose the image of the corresponding main character on the advertisement output area 300.

In this state, the broadcast output terminals 2a~2n determine whether or not a preset advertisement output time has arrived. When the preset advertisement output time has arrived, the broadcast output terminals 2a~2n eliminate the advertisement data.

Further, the broadcast output terminals 2a~2n transmit the exposed entertainer image information to the advertisement data transmission server 6", so that the advertisement data transmission server 6" settles the portrait rights cost of the corresponding entertainer based on the corresponding advertisement exposure time information.

In settling the portrait rights cost of the corresponding entertainer, preferably, the portrait rights cost is increased in proportion to the exposure frequency of the entertainer image or an exposure time.

Now, a fifth exemplary embodiment of the present invention will be described in detail with reference to the accompanying drawings.

Figure 14:
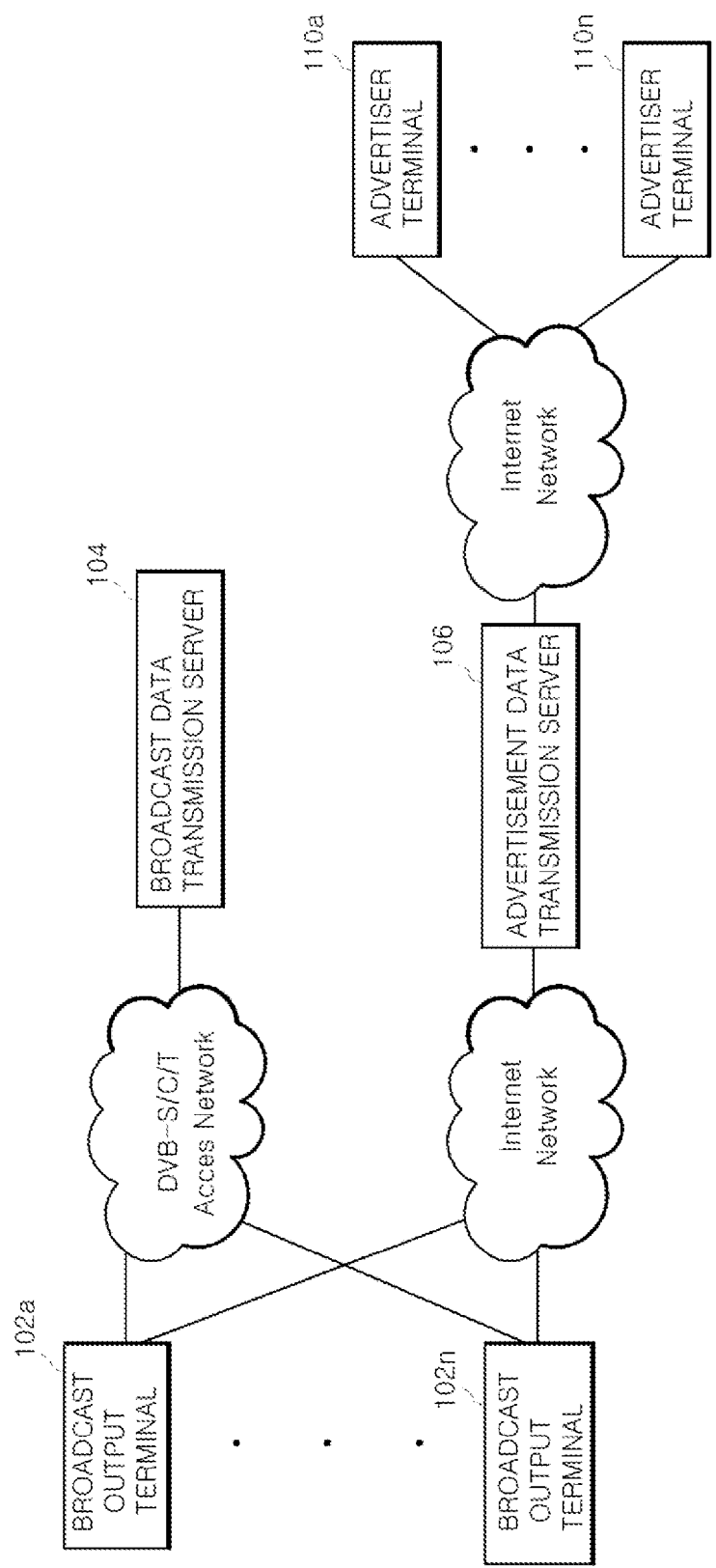
FIG. 14 is a schematic view showing the configuration of a system for controlling automatic exposure of broadcast advertisement data according to a fifth exemplary embodiment of the present invention.

FIG. 14 is a schematic view showing the configuration of a system for controlling automatic exposure of broadcast advertisement data according to a fifth exemplary embodiment of the present invention.

With reference to FIG. 14, in the system for controlling automatic exposure of broadcast advertisement data according to the fifth embodiment using an IPTV, when advertisement data is exposed together with broadcast data when the broadcast is output or when advertisement data is solely exposed, a differentiated return for viewing an advertisement is provided according to a time zone during which an acknowledgement signal for acknowledging viewing of an advertisement is generated.

Namely, in the system for controlling automatic exposure of broadcast advertisement data according to the fifth embodiment, when advertisement data is exposed to a broadcast screen, a viewer is allowed to input an acknowledgement signal informing a server whether he or she is viewing the advertisement data and the viewer is paid a return for viewing the advertisement, and a viewer who has viewed an advertisement for a longer time is provided with a chance to win a larger amount of prize money according to a time zone during which the acknowledgement signal is generated.

To this end, in the system for controlling automatic exposure of broadcast advertisement data according to the fifth embodiment, when an advertisement view time is received by a server, the server classifies a viewer group according to an advertisement view time slot and provides differentiated prize money to each viewer group. Namely, the advertisement cost paid by an advertiser must be paid in proportion to a viewing time of advertisement data. Thus, prize money may be separately calculated in proportion to a viewing time and differentiated prize money may be provided to each group.

The broadcast output terminals 102a~102n included in the system for controlling automatic exposure of broadcast advertisement data according to the fifth embodiment are able to output broadcast data, and may include various broadcast data output devices such as a PC, a DMB phone, a navigation device, and the like, as well as an IPTV that are capable of transmitting a terminal unique code or receiving and outputting local advertisement or central advertisement data.

To this end, in the present invention, for example, an IPTV, a DMB phone, and a navigation device are used as the broadcast output terminals 102a~102n for outputting broadcast data and advertisement data, and all these devices are commonly capable of outputting Internet and broadcast data, and in view of this, the IPTV will be typically described hereinafter.

In general, in a DTV and a PVR constituting the IPTV, the PVR is embedded in a STB. When the STB provides the PVR with a broadcast signal transmitted from a satellite, a cable, a terrestrial wave, and the like, the PVR records it. The DTV, which is directly connected to the STB, serves to receive a broadcast from a satellite, a cable, a terrestrial wave and display the received broadcast, or display contents stored in the PVR.

In this system, supplementary information regarding a broadcast service is received directly from a broadcast access network of a satellite, a cable, a terrestrial wave, and the like. Such information may be utilized by an EPG and used for the purpose of providing information for guiding programs to a user. In case of a multimedia home platform (MHP), DVB-SI is used as the supplementary information, and an open cable application platform (OCAP) uses a PSIP.

The IPTV is configured such that a broadcast signal transmitted from a satellite, a cable, a terrestrial wave, and the like, is provided from the STB to the PVR, and the PVR records it, and configured such that a broadcast signal transmitted from a satellite, a cable, and a terrestrial wave, and the like, is received from the broadcast access network based on the Internet network.

Like a computer terminal, the IPTV includes a modem therein and is able to perform Internet surfing to a particular URL and data uploading and downloading.

Namely, the broadcast output terminals 102a~102n included in the system for controlling automatic exposure of broadcast advertisement data according to the fifth embodiment must be able to output broadcast data of a terrestrial wave and a satellite broadcast, and when certain conditions are met, the broadcast output terminals 102a~102n must be able to transmit a unique code (IP) stored therein to a particular server, receive and store particular advertisement data, and automatically output the stored advertisement data.

Accordingly, the broadcast output terminals 102a~102n included in the system for controlling automatic exposure of broadcast advertisement data according to the fifth embodiment must be able to be connected to the Internet network and available for data communication basically in order to receive advertisement data.

In addition, the broadcast output terminals 102a~102n included in the system for controlling automatic exposure of broadcast advertisement data according to the fifth embodiment are set to divide their screen, through which advertisement data stored therein along with broadcast data are output.

Meanwhile, generally, in case of a PC that performs bi-directional communication, an advertiser may provide a return for clicking an advertisement to a user, but TVs do not have such a function and an advertisement output between broadcast programs is based on one-directional output scheme.

In comparison, in the system for controlling automatic exposure of broadcast advertisement data according to the fifth embodiment, the broadcast output terminals 102a~102n perform bi-directional communication with a remote server. That is, the broadcast output terminals 102a~102n check an advertisement view time and the frequency of advertisement output and provide the check result to the remote server, allowing a return for viewing an advertisement to be paid later. Thus, the broadcast output terminals 102a~102n incorporate a device capable of performing such a function therein.

In addition, in the system for controlling automatic exposure of broadcast advertisement data according to the fifth embodiment, advertisement data output to the screen of the broadcast output terminals 102a~102n may be central advertisement data or local advertisement data depending on local or non-local characteristics. Namely, in order for the remote server to transmit local advertisement data in consideration of regional characteristics to the broadcast output terminals 102a~102n, the remote server must manage area codes of the broadcast output terminals 102a~102n, and when a session is established between the broadcast output terminals 102a~102n and the remote server, the broadcast output terminals 102a~102n must transmit a terminal unique code to the corresponding remote server.

Namely, when the broadcast output terminals 102a~102n held by the user is located in Seocho-dong, Korea, a local advertisement of chicken specified stores in Seocho-dong is preferably output to those terminals.

Thus, the broadcast output terminals 102a~102n included in the system for controlling automatic exposure of broadcast advertisement data according to the fifth embodiment are preferably set to transmit their terminal unique codes to the remote server when they establish a session with the remote server. So, the remote server can determine an area in which a corresponding terminal is located, based on the unique codes of the broadcast output terminals 102a~102n.

Further, the broadcast output terminals 102a~102n included in the system for controlling automatic exposure of broadcast advertisement data according to the fifth embodiment determine a time point when advertisement data is output to the screen, receive an advertisement acknowledgment signal of a viewer from a remote controller and calculate an advertisement view time of the corresponding viewer, and transmit a terminal unique number and advertisement view time information to the advertisement data transmission server 106.

Meanwhile, the system for controlling automatic exposure of broadcast advertisement data according to the fifth embodiment includes the advertisement data transmission server 106 for receiving advertisement data from a plurality of advertiser terminals 110a~110n and storing them in advance, and transmitting the same to the broadcast output terminals 102a~102n. In order for the broadcast output terminals 102a~102n to output advertisement data as a local advertisement reflecting the areas where the broadcast output terminals 102a~102n are located, the advertisement data transmission server 106 stores location information of the respective broadcast output terminals 102a~102n and unique codes of the respective broadcast output terminals 102a~102n matching with the location information, the unique codes being classified by areas.

Thus, when an advertiser designates advertisement data applied through the broadcast output terminals 102a~102n as a particular local advertisement to output it to the screen, the advertisement data transmission server 106 transmits the corresponding advertisement data only to particular broadcast output terminals 102a~102n matching with the previously classified unique codes of particular areas.

Meanwhile, the advertisement data transmission server 106 transmits particular advertisement data to the broadcast output terminals 102a~102n and stores the same, and when the broadcast output terminals 102a~102n output it to the screen, the advertisement data transmission server 106 allows them to output the previously stored advertisement data to a lower end portion of the screen. When a view acknowledgment signal that the advertisement data was viewed and view time information are received from the broadcast output terminals 102a~102n, the advertisement data transmission server 106 controls to classify viewer groups by view time slots, provide a differentiated prize money to each viewer group, and draw for a prize winner of each viewer group by certain time and pay a prize money to the prize winner.

Thus, the advertisement data transmission server 106 receives the advertisement view acknowledgment signal for each of the broadcast output terminals 102a~102n, and also receives the advertisement view time information and terminal unique number and stores them.

Figure 15:
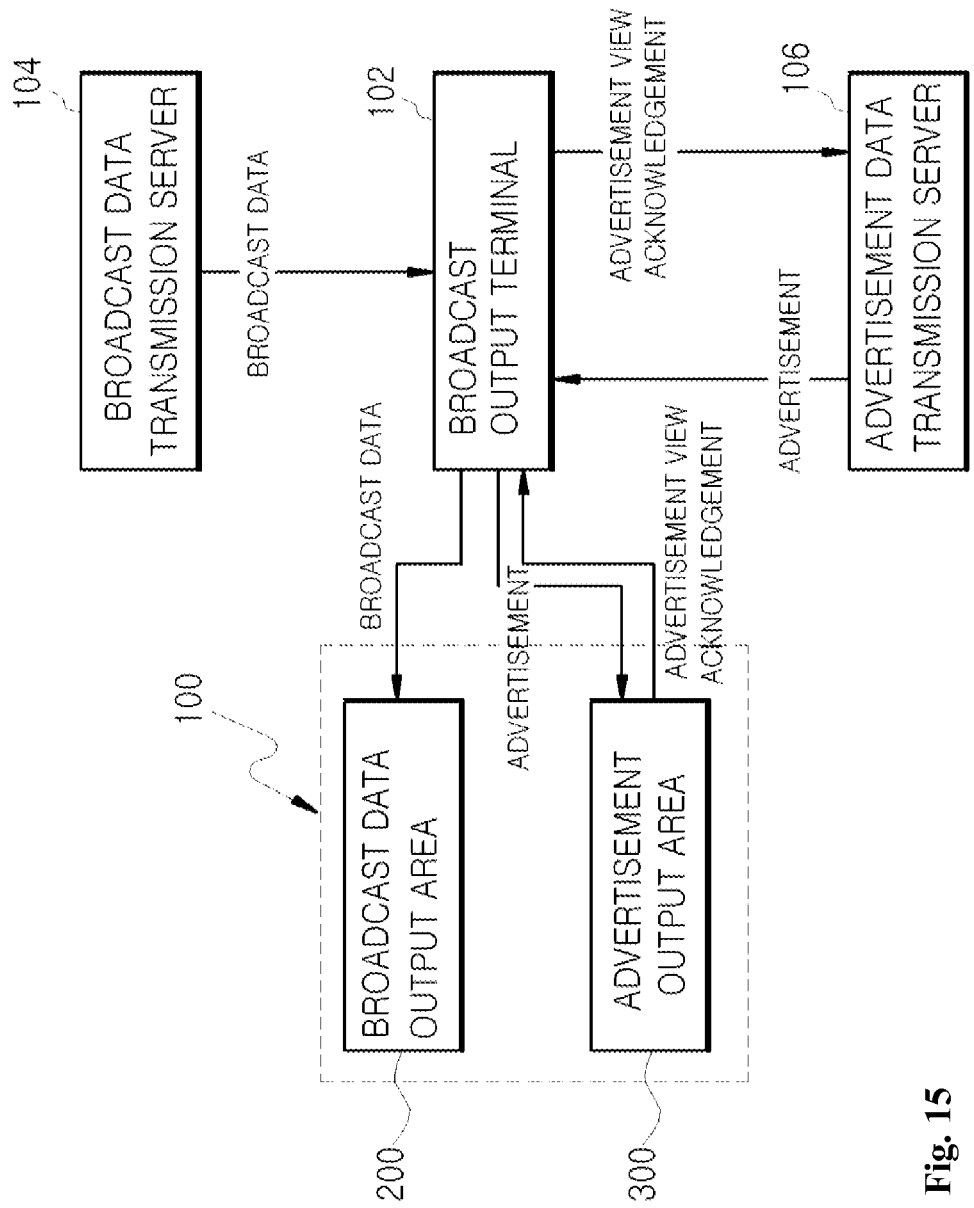
FIG. 15 is a flowchart illustrating a data flow of the system for controlling automatic exposure of broadcast advertisement data according to the fifth exemplary embodiment of the present invention.
Figure 16:
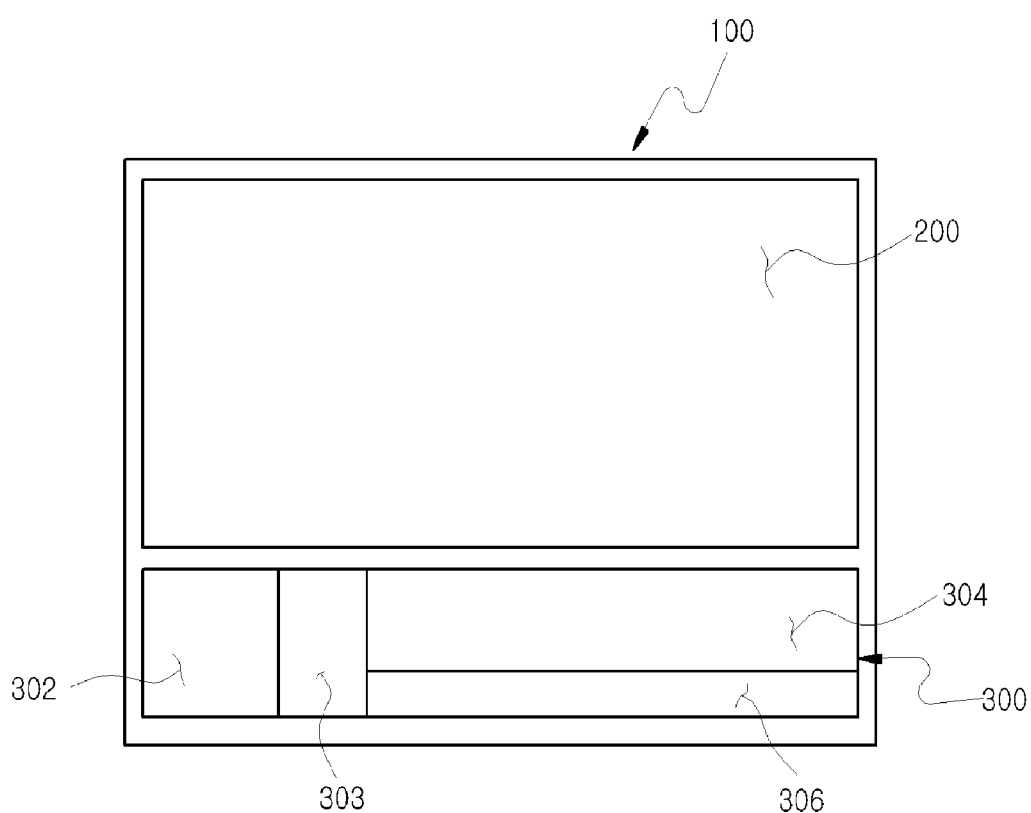
FIG. 16 is a view showing a screen image output through a broadcast output terminal included in the system for controlling automatic exposure of broadcast advertisement data according to the fifth exemplary embodiment of the present invention.

FIG. 15 is a block diagram illustrating a data flow of the system for controlling automatic exposure of broadcast advertisement data according to the fifth exemplary embodiment of the present invention, and FIG. 16 is a view showing a screen output through the broadcast output terminals included in the system for controlling automatic exposure of broadcast advertisement data according to the fifth exemplary embodiment of the present invention.

With reference to FIGS. 15 and 16, in the system for controlling automatic exposure of broadcast advertisement data according to the fifth embodiment, a screen area 100 of the broadcast output terminals 102a~102n, such as an IPTV, a DMB phone, a navigation device, and the like, to output broadcast data is divided into an advertisement output area 300 for outputting advertisement area and a broadcast data output area 200 for outputting broadcast data.

In this case, the broadcast output terminals 102a~102n may receive advertisement data in real time from the advertisement data transmission server 106 that transmits the advertisement data, and output the received advertisement data to the screen area 100, or may receive the advertisement data from the advertisement data transmission server 106 and store the same in advance, and then extract the prestored advertisement data and output it to the screen.

Meanwhile, as for the screen area 100 output through the broadcast output terminals 102a~102n, a screen radio value of the screen area 100 is set in the broadcast output terminals 102a~102n in advance or may be adjusted arbitrarily by a user such that the broadcast data output area 200 output through the screen area 100 is reduced at a certain ratio and the advertisement output area 300 is configured at an extra space generated by the reduction of the broadcast data output area 200.

The system for controlling automatic exposure of broadcast advertisement data according to the fifth exemplary embodiment of the present invention is configured as an IPTV, a DMB phone, a navigation device, and the like, in which advertisement data is not output at the same time when broadcast data is output through the broadcast output terminals 102a~102n, but output only when a viewer separately sets an advertisement data output mode through the broadcast output terminals 102a~102n. To this end, the embodiment of the present invention is configured such that a return is provided in proportion to an output time of advertisement data, so the viewer can spontaneously set an advertisement data output mode.

Meanwhile, the advertise output area 300 output through the broadcast output terminals 102a~102n may be further divided into a product image or entertainer image output area 302, an advertisement area 304, and pertinent company event information 306. Preferably, as the event information 306, viewer compensation information (e.g., accumulated prize money information) resulting from an advertisement output may be output.

In addition, the advertisement output area 300 output through the broadcast output terminals 102a~102n includes an output residual time information indication column 303 for indicating an output residual time of each advertisement data output to the advertisement area 304, whereby the viewer must generate an advertisement view acknowledgement signal with a remote controller before corresponding advertisement data is changed to different advertisement data while checking the corresponding advertisement output residual time output through the output residual time information indication column 303.

Namely, the advertisement output residual time is reversely counted from 10, 9, 8, 7, 6, 5, 4, 3, 2, 1, 0, and in order to benefit from viewing of an advertisement, the viewer needs to monitor the advertisement output residual time with more concentration at every advertisement data output to the screen. Thus, viewers' concentration on the advertisement data output to the screen can be increased.

In addition, an entry chance for wining more prize money is provided to a viewer who has generated an acknowledgement signal when the reversely counted advertisement output residual time is 2 than a viewer who has generated an acknowledgement signal when the reversely counted advertisement output residual time is 10, thereby making viewers concentrate on the corresponding advertisement data for a longer time.

When the viewer generates an advertisement view acknowledgement signal, the broadcast output terminals 102a~102n calculate an advertisement view time according to the signal and transmits the calculated value to the advertisement data transmission server 106, so that an automatic entry request for prize money can be made to the advertisement data transmission server 106.

Thus, the automatic entry request for prize money is made for each advertisement data, and the viewer must generate an advertisement view acknowledgement signal for each advertisement data to have a return for viewing a corresponding advertisement. Namely, the viewer can enter certain prize money.

Figure 17:
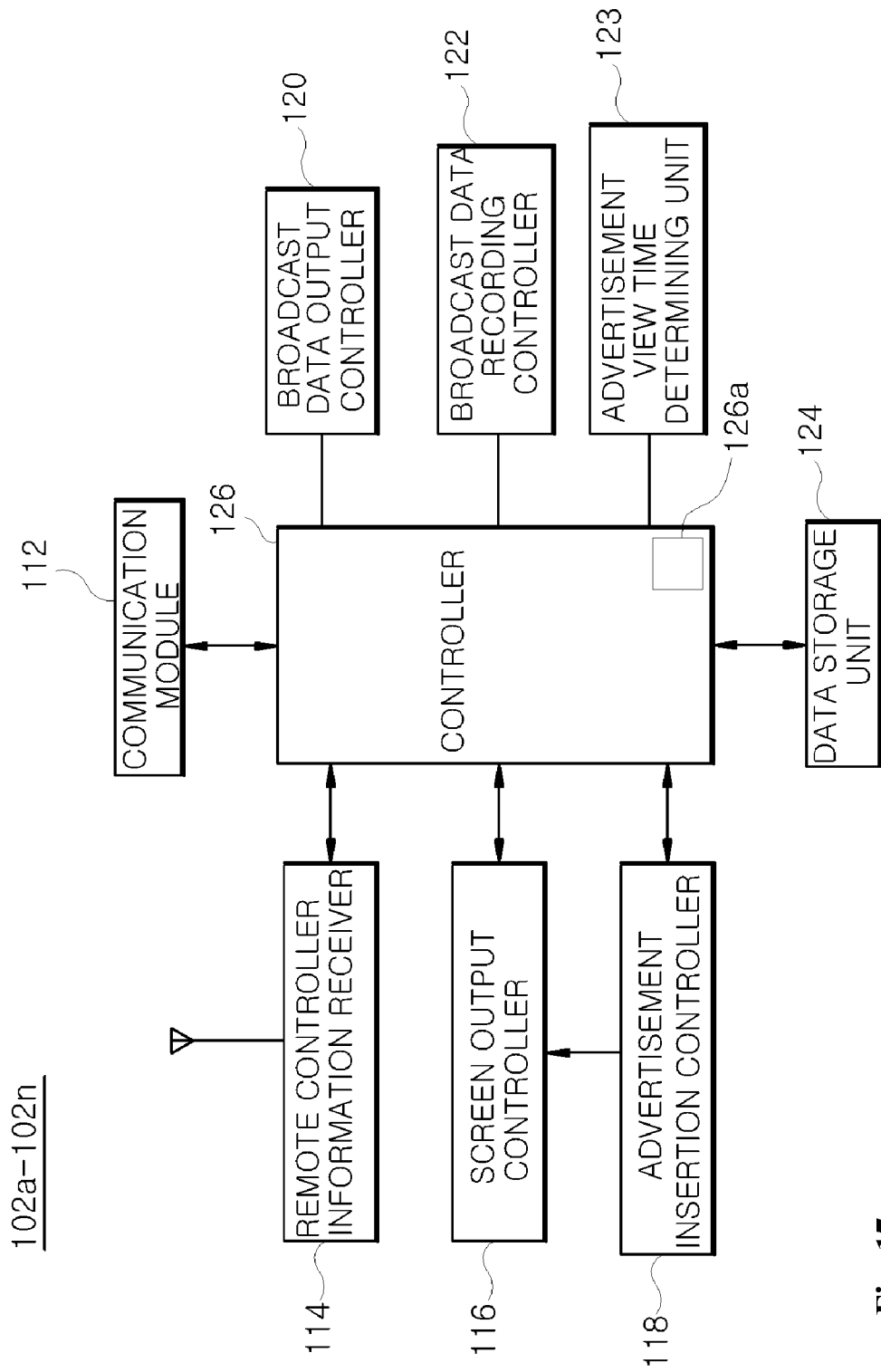
FIG. 17 is a block diagram showing the configuration of the broadcast output terminal provided in the system for controlling automatic exposure of broadcast advertisement data according to the fifth exemplary embodiment of the present invention.

FIG. 17 is a block diagram showing the configuration of the broadcast output terminal provided in the system for controlling automatic exposure of broadcast advertisement data according to the fifth exemplary embodiment of the present invention.

With reference to FIG. 17, the broadcast output terminals 102a~102n each include a communication module, a remote controller information receiver, a screen output controller, an advertisement insertion controller, a broadcast data output controller, a broadcast data recording controller, an advertisement view time determining unit, a data storage unit, a controller, and a timer.

Reference numeral 112 denotes a communication module connected to a broadcast access network or the Internet network for performing a data transmission and reception with the broadcast data transmission server 104 and the advertisement data transmission server 106, and performing protocol matching and filtering.

Reference numeral 114 denotes a remote controller information receiver for receiving remote control signals with respect to an advertisement data output mode setting signal of a viewer, a screen ratio adjustment signal of advertisement data, a detailed information check signal of advertisement data, and a view acknowledgment signal of the corresponding advertisement data.

Reference numeral 116 denotes a screen output controller for controlling outputting of broadcast data and advertisement data through the broadcast output terminals 102a~102n, and adjusting a screen ratio of the broadcast data and advertisement data, and reference numeral 118 denotes an advertisement insertion controller for controlling inserting of advertisement data transmitted from the advertisement data transmission server 106 into a screen area and outputting the same by interworking with the screen output controller 116.

Reference numeral 120 denotes a known broadcast data output controller for controlling receiving of digital broadcast data from the broadcast data transmission server 104 and outputting the received digital broadcast data through the broadcast output terminals 102a~102n. The broadcast data output controller 120 refers to the configuration of hardware and software mounted in a general STB (not shown). In general, digital broadcast data is compressed into an MPEG version and decompressed by a decoder (not shown) included in the STB. The broadcast data output controller 120 is one of general elements of the IPTV, which performs a conventional broadcast output function through hardware and OS, so a detailed description thereof will be omitted.

Reference numeral 122 denotes a broadcast data recording controller for receiving the digital broadcast data from the broadcast data transmission server 104 and recording and storing it. The broadcast data recording controller 122 is a known element for controlling a PVR (not shown) included in the general IPTV, which is not requisite for the present invention.

Reference numeral 123 denotes an advertisement view time determining unit for recognizing an output initiation time of advertisement data output to the screen through the screen output controller 16, and this state, calculating an advertisement view time viewed by a corresponding viewer according to an advertisement data view acknowledgment signal received from the remote controller information receiver 114.

Reference numeral 124 denotes a data storage unit for storing advertisement data transmitted from the advertisement data transmission server 106, storing terminal unique number information, receiving an advertisement data output mode setup signal of the viewer and a screen ratio adjustment signal of the advertisement data and storing the set information associated with them, and storing the advertisement view time data by advertisement data.

Reference numeral 126 denotes a controller for controlling outputting of advertisement data to the screen, determining an output time point of the advertisement data and driving a timer 126a installed therein, recognizing a view time of an advertisement viewed by a corresponding viewer at every advertisement data when a view acknowledgment signal is received, and transmitting an automatic entry signal to the advertisement data transmission server 106, in a state that a mode selection signal with respect to an advertisement data screen output is received through the remote controller information receiver 14 and the advertisement data is received from the advertisement data transmission server 106 and stored.

Meanwhile, the controller 126 has a control routine set to generate a control signal to the screen output controller 116 to adjust an output size of the advertisement data when a signal for adjusting the ratio of advertisement data output from the remote controller information receiver 114 is applied thereto, accumulatively calculate an advertisement view time of a viewer by interworking with the timer 126a, transmit the corresponding advertisement view time information to the advertisement data transmission server 106 at every certain time interval, and extract an internal code from the data storage unit 124 when the advertisement view time information is transmitted and transmit the same.

Also, the controller 126 controls to determine an advertisement output start time and display an advertisement data output residual time in the advertisement data by interworking with the timer 126a.

In addition, preferably, the broadcast output terminals 102a~102n are set in advance to automatically assign a certain sequential number to advertisement data to be output to the screen through the broadcast output terminals 102a~102n based on a storage order upon storage thereof, and output it to the screen when a channel is switched in the given order or when power is turned on/off.

Preferably, the broadcast output terminals 102a~102n further include a key input unit (not shown) for setting an advertisement data output by a viewer, and also adjusting the size ratio of the advertisement output area 300.

More preferably, the controller 126 may transmit view time information of an advertisement viewed by a viewer to the advertisement data transmission server 106 for each advertisement data, and also transmit accumulated advertisement view time information to the advertisement data transmission server 106 at every certain time interval.

Figure 18:
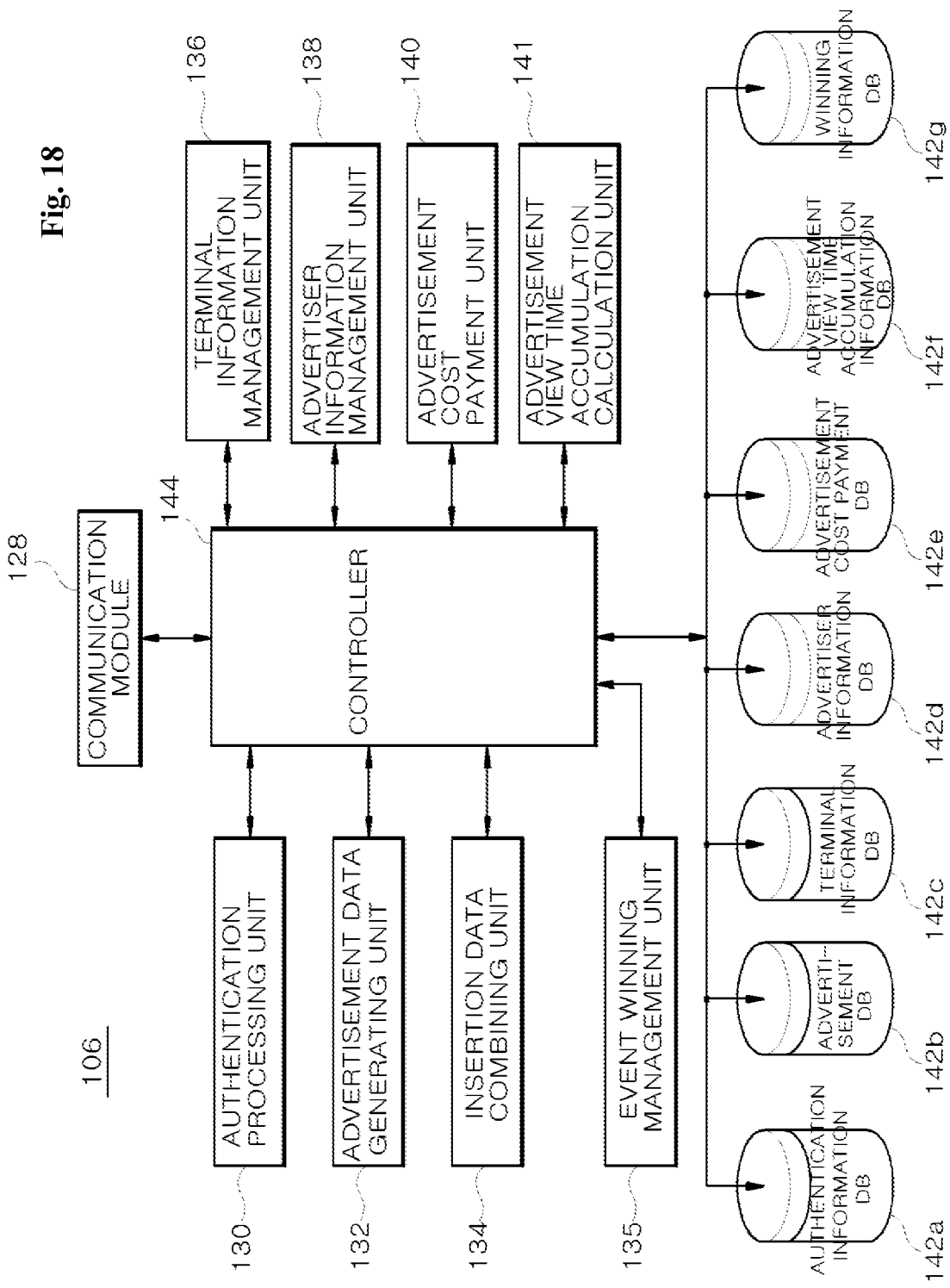
FIG. 18 is a block diagram showing the configuration of an advertisement data transmission server provided in the system for controlling automatic exposure of broadcast advertisement data according to the fifth exemplary embodiment of the present invention.

FIG. 18 is a block diagram showing the configuration of the advertisement data transmission server provided in the system for controlling automatic exposure of broadcast advertisement data according to the fifth exemplary embodiment of the present invention.

With reference to FIG. 18, the advertisement data transmission server 106 provided in the system for controlling automatic exposure of broadcast advertisement data according to the fifth embodiment includes a communication module, an authentication processing unit, an advertisement data generating unit, an insertion data combining unit, a terminal information management unit, an advertiser information management unit, an advertisement cost payment unit, an authentication information DB, an advertisement DB, a terminal information DB, an advertiser information DB, an advertisement cost payment DB, and a controller.

Reference numeral 128 denotes a communication module for performing data communication with the broadcast output terminals 102a~102n and the advertiser terminals 110a~110n to upload or download various data, and performing protocol matching or data filtering.

Reference numeral 130 denotes an authentication processing unit for performing authentication to determine whether or not a viewer and an advertiser who wants to perform data transmission through the broadcast output terminals 102a~102n and the advertiser terminals 110a~110n are true.

Reference numeral 132 denotes an advertisement data generating unit for receiving advertisement data from the advertiser terminals 110a~110n and storing the same, and generating advertisement data including company event information and image information and transmitting the generated advertisement data to the broadcast output terminals 102a~102n.

Reference numeral 34 denotes an insertion data combining unit for inserting the company event information and image information into the advertisement data by interworking with the advertisement data generating unit 132.

Reference numeral 135 denotes an event winning management unit for receiving an automatic entry signal generated as a return for viewing an advertisement from the broadcast output terminals 102a~102n to perform a winning management with respect to various events provided by an advertiser.

Reference numeral 136 denotes a terminal information management unit for managing terminal unique code information of the broadcast output terminals 102a~102n and the advertiser terminals 110a~110n to classify received data by unique codes. Reference numeral 138 denotes an advertiser information management unit for managing information regarding an advertisement cost previously transferred by an advertiser and personal information of the advertiser including area information.

Reference numeral 140 denotes an advertisement cost payment unit for paying an advertisement cost in proportion to an output time of advertisement data output through the broadcast output terminals 102a~102n.

Reference numeral 141 denotes an advertisement view time accumulation calculation unit for receiving view time information with respect to advertisement data of each viewer from the broadcast output terminals 102a~102n to accumulatively calculate it by the broadcast output terminals 102a~102n.

Reference numeral 142a denotes an authentication information DB for storing authentication information used for determining whether or not a viewer and an advertiser are true, and reference numeral 142b denotes an advertisement DB for storing advertisement data transmitted from the advertiser terminals 10a~10n. Reference numeral 142c denotes a terminal information DB for storing terminal unique code information of the broadcast output terminals 102a~102n and the advertiser terminals 110a~110n and area information matching with the unique code information.

Reference numeral 142d denotes an advertiser information DB for storing information regarding an advertisement cost previously transferred by an advertiser and personal information of the advertiser including area information, and reference numeral 142e denotes an advertisement cost payment DB for storing advertisement output cost payment information of the advertiser.

Reference numeral 142f denotes an advertisement view time accumulation information DB for receiving view time information of advertisement data of each viewer from the broadcast output terminals 102a~102n to accumulatively calculate it by the broadcast output terminals 102a~102n, and reference numeral 142g denotes a winning information DB for storing winning information about various events and prize money given as a return for viewing an advertisement.

Reference numeral 144 denotes a controller for receiving advertisement data from the advertiser terminals 110a~110n and storing the same, receiving an advertisement output request signal from the broadcast output terminals 102a~102n and corresponding terminal information and registering the same, generating advertisement data including company event information and image information, transmitting the generated advertisement data to the broadcast output terminals 102a~102n at certain time intervals, receiving advertisement view time information from the broadcast output terminals 102a~102n and accumulatively calculating it to classify the same into a plurality of applicant groups by view time, paying an advertisement cost with an advertiser in proportion to the advertisement view time, selecting a prize winner by a lottery or game by applicant groups to pay the advertisement cost as a prize money.

Meanwhile, the controller 144 provides control to receive area information of the broadcast output terminals 102a~102n, match the area information to the unique codes of the broadcast output terminals 102a~102n to classify them by areas to allow local advertisement data of each area desired by an advertiser to be transmitted to each of the broadcast output terminals 102a~102n.

The function and operation of the system for controlling automatic exposure of broadcast advertisement data according to the fifth exemplary embodiment of the present invention will now be described in detail with reference to the accompanying drawings.

Figure 19:
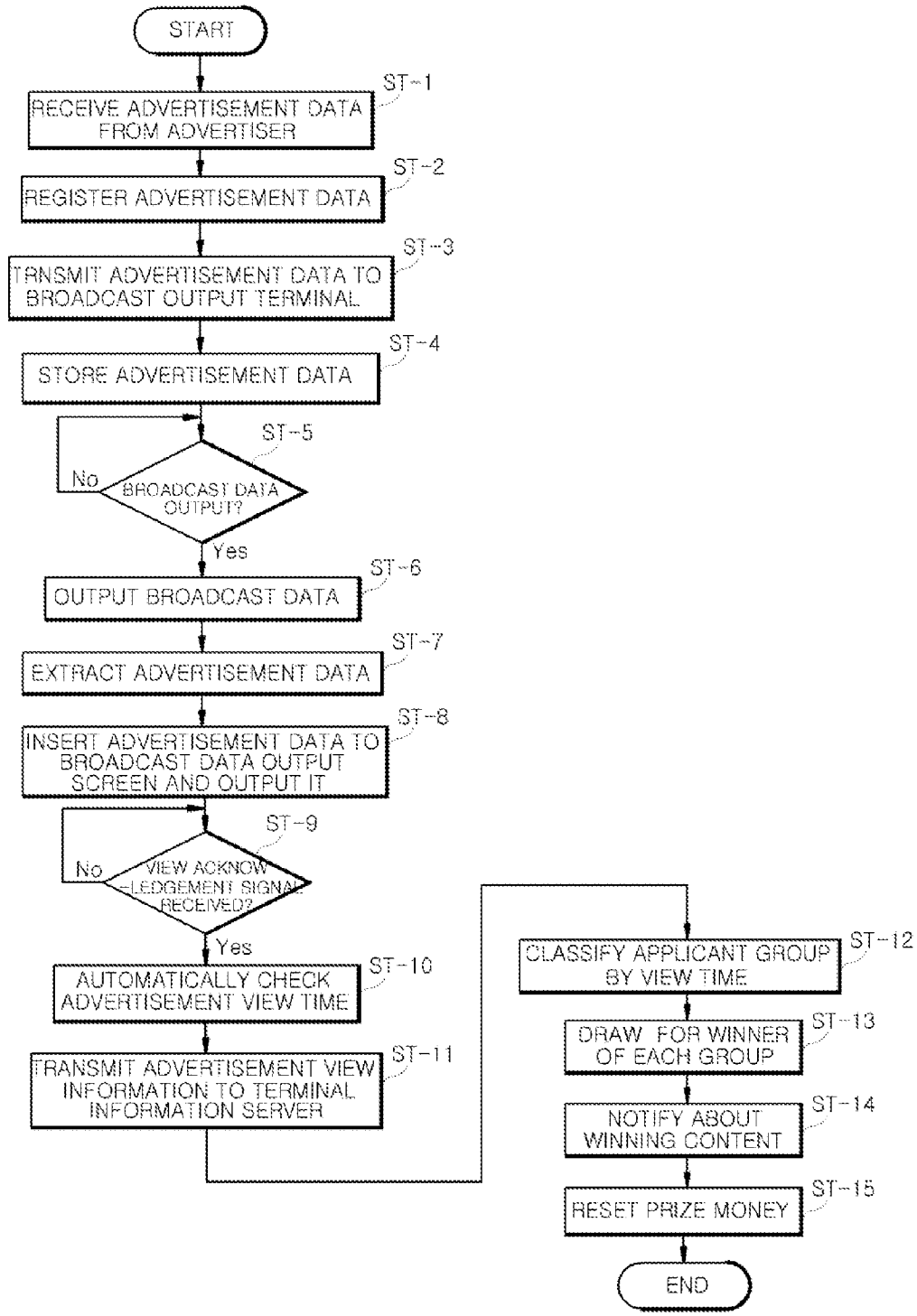
FIG. 19 is a flowchart illustrating a signal flow of the system for controlling automatic exposure of broadcast advertisement data according to the fifth exemplary embodiment of the present invention.

FIG. 19 is a flowchart illustrating a signal flow of the system for controlling automatic exposure of broadcast advertisement data according to the fifth exemplary embodiment of the present invention.

First, the advertisement data transmission server 106 included in the system for controlling automatic exposure of broadcast advertisement data according to the fifth embodiment receives advertisement data from the plurality of advertiser terminals 110a~110n, registers the advertisement data by the advertisers, and generates advertisement data obtained by inserting company event information or drawing information thereinto (ST-1, ST-2).

Next, the advertisement data transmission server 106 transmits the advertisement data to the plurality of broadcast output terminals 102a~102n connected over the wired/wireless Internet network (ST-3).

In this case, the advertisement data transmission server 106 may transmit updated advertisement data to the broadcast output terminals 102a~102n at certain time intervals so as to be stored therein, or may transmit the corresponding advertisement data to the broadcast output terminals 102a~102n at the time when it is received in real time from an advertiser.

Also, the advertisement data transmission server 106 may selectively transmit only advertisement data matching with area code information of the broadcast output terminals 102a~102n to the broadcast output terminals 102a~102n (ST-4).

Then, the broadcast output terminals 102a~102n are in a turned-on state and determine whether or not a signal for outputting broadcast data to the screen is applied. That is, the IPTV may output the broadcast data to the screen, or may output Internet information of a particular URL to the screen. Thus, the broadcast output terminals 102a~102n determine whether or not a broadcast data output signal is applied (ST-5).

When the broadcast data output signal has been applied, the broadcast output terminals 102a~102n output broadcast data of a terrestrial wave, a satellite broadcast, and a cable broadcast to the screen (ST-60).

And then, the broadcast output terminals 102a~102n extract advertisement data prestored therein and output the extract advertisement data to a certain portion of a lower end of the broadcast data output to the screen (ST-7, ST-8).

Preferably, the advertisement data output through the screen of the broadcast output terminals 102a~102n is automatically given a certain sequential number based on the storage order and set in the broadcast output terminals 2a~2n in advance such that the advertisement data is output to the screen in the corresponding order.

Meanwhile, the broadcast output terminals 102a~102n drive the timer 26a starting from the time point when the output of the advertisement data is initiated and determine whether or not an advertisement view acknowledgment signal generated by a viewer is received, in a state that the advertisement output time is calculated (ST-9).

Preferably, the broadcast output terminals 102a~102n output an output residual time of corresponding advertisement to the screen for each advertisement data so that the viewer can check it. Thus, the viewer must generate an advertisement view acknowledgment signal before the output residual time becomes zero for each advertisement data.

When the advertisement view acknowledgment signal generated by the viewer is received, the broadcast output terminals 102a~102n automatically check a time taken from the output time point of the advertisement data to a time point when the advertisement view acknowledgment signal is generated and transmit the corresponding advertisement view time information along with the terminal unique code to the advertisement data transmission server 106 (ST-10, ST-11).

Then, the advertisement data transmission server 106 receives the advertisement view time information and the terminal unique code, and classifies applicant groups by advertisement view time zones (ST-12).

Also, when a draw time arrives, the advertisement data transmission server 106 draws for a prize winner by applicant groups, and when the prize winner is determined, the advertisement data transmission server 106 notifies the broadcast output terminals 102a~102n of the winning content. Further, the advertisement data transmission server 106 resets the prize money of each applicant group (ST-13, ST-14, ST-15).

Accordingly, the system for controlling automatic exposure of broadcast advertisement data according to the fifth exemplary embodiment of the present invention can reasonably pay an advertisement cost with an advertiser in proportion to an advertisement view time of a viewer, and therefore, can apply an advertisement cost convinced by the advertiser and pay the advertisement cost as a return for viewing an advertisement to the viewer, thereby giving a motivation about the advertisement viewing. Also, it can improve a view concentration of advertisement by providing a differentiated prize money by advertisement view time zones.

Now, a sixth exemplary embodiment of the present invention will now be described in detail with reference to the accompanying drawings.

Figure 20:
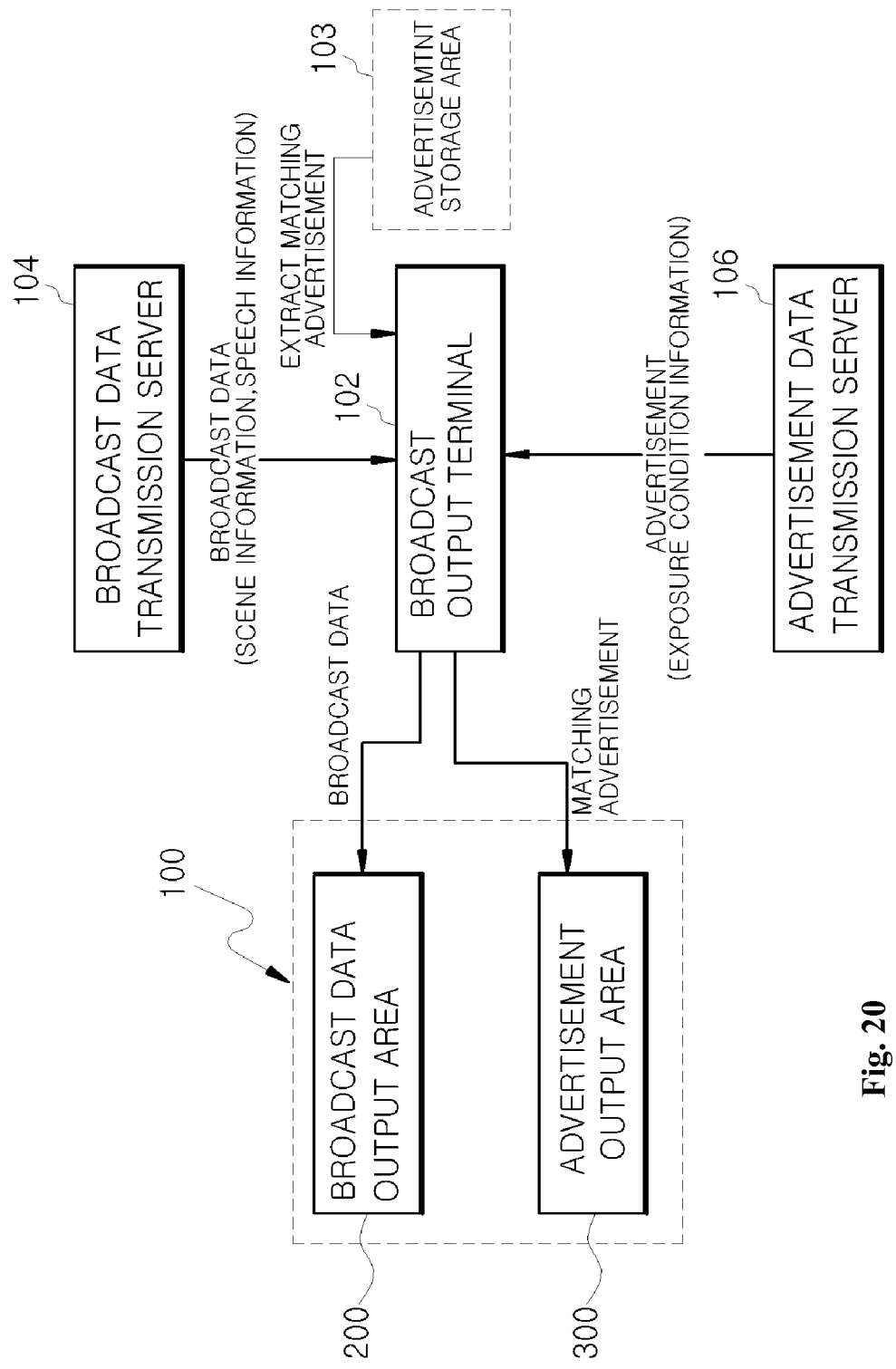
FIG. 20 is a flowchart illustrating a data flow of a system for controlling automatic exposure of broadcast advertisement data according to a sixth exemplary embodiment of the present invention.

FIG. 20 is a flowchart illustrating a data flow of a system for controlling automatic exposure of broadcast advertisement data according to a sixth exemplary embodiment of the present invention.

With reference to FIG. 20, the system for controlling automatic exposure of broadcast advertisement data according to the sixth embodiment is devised such that scene information and lines of a broadcast scenario included in broadcast data are extracted and advertisement data matching with the corresponding scene or lines of the broadcast scenario is controlled to be extracted and output to the screen, thereby eliminating viewer's reluctance to advertisement output content.

Namely, the system for controlling automatic exposure of broadcast advertisement data according to the sixth embodiment controls such that, when broadcast data is output to the screen, advertisement data matching with content of the broadcast data is automatically output, to minimize side effects caused by discrepancy between the broadcast data output to the broadcast data output area 200 and the advertisement data output to the advertisement output area 300.

To this end, the screen area 100 of the broadcast output terminals 102a~102n, which is configured in the system for controlling automatic exposure of broadcast advertisement data according to the sixth embodiment, and outputs broadcast data, is divided into the broadcast data output area 200 for outputting broadcast data and the advertisement output area 300 for outputting advertisement data matching with content of the broadcast data.

In this case, the broadcast output terminals 102a~102n may receive advertisement data in real time from the advertisement data transmission server 106 that transmits advertisement data, and output the same to the screen area 100, or may previously receive advertisement data from the advertisement data transmission server 106 and store it, and then extract the prestored advertisement data and output it to the screen. In particular, in the system for controlling automatic exposure of broadcast advertisement data according to the sixth embodiment, when a plurality of advertisement data are stored in the broadcast output terminals 102a~102n, broadcast content information (e.g., a content code) desired by an advertiser is stored together, so that when broadcast data is output, advertisement data matching with content of the broadcast data can be selectively extracted to be output to the screen.

Namely, when an advertiser of a chocolate company wants to output chocolate advertisement data together at a time point when broadcast data of sweet lovers is output, he or she may select a broadcast content code of a lovers screen in uploading advertisement data to the advertisement data transmission server 106. Then, the advertisement data is stored together with the broadcast content code of the lovers screen in the broadcast output terminals 102a~102n. Thereafter, when a screen output of broadcast data including each content code is detected, the corresponding chocolate advertisement data is controlled to be extracted and output to the screen.

In this case, the unique code information indicating content of broadcast data may roughly divided into scene code information indicating content of a broadcast scene and code information of lines of a broadcast scenario classified based on content of lines of a broadcast scenario of performers (e.g., actors, actresses, etc.).

To this end, broadcast data produced by the broadcast data transmission server 104 includes code information (e.g., a lover appearance scene: CD-0001, a fight scene: CD-0002, love expression lines: CD-0100, angry lines: CD-0101, cynical lines: CD-0102 . . . , etc.) indicating content of each broadcast data.

In addition, the code information indicating content of each broadcast data is stored in the advertisement data transmission server 106 to be read by an advertiser, and code information selected by an advertiser and uploaded advertisement data are stored such that they interwork.

Further, the broadcast output terminals 102a~102n receive advertisement data including a broadcast content code (broadcast exposure condition information) designated by the advertiser from the advertisement data transmission server 106 and store the same, receive broadcast data including content code of the corresponding broadcast data from the broadcast data transmission server 104, extract advertisement data matching with the content code from an internal data storage unit 124 (See FIG. 17), and output the advertisement data to the screen. Thus, an advertisement storage area 103 for storing advertisement data including a broadcast content code designated by the advertiser is provided in the broadcast output terminals 102a~102n.

Figure 21:
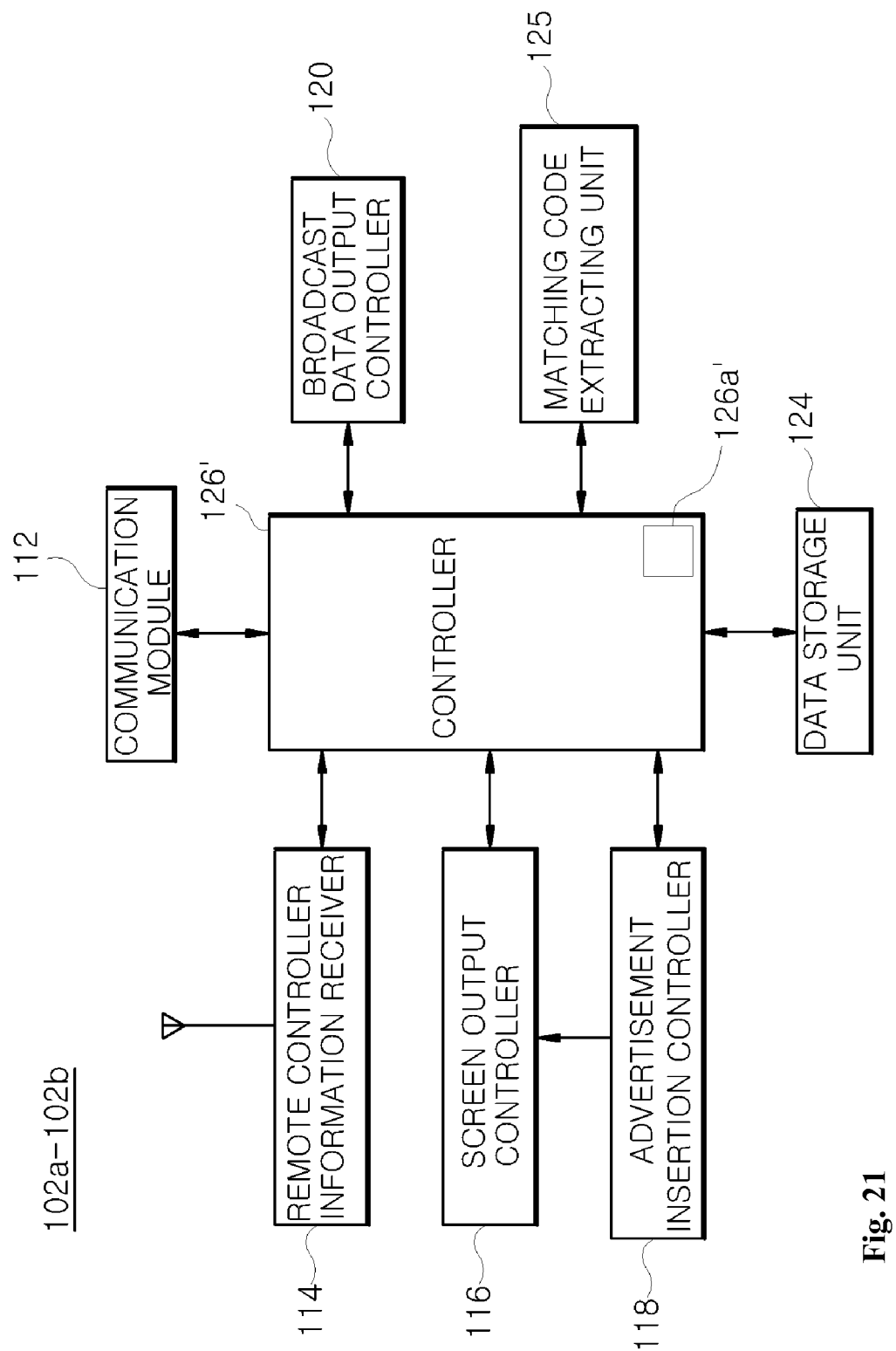
FIG. 21 is a block diagram showing the configuration of a broadcast output terminal provided in the system for controlling automatic exposure of broadcast advertisement data according to the sixth exemplary embodiment of the present invention.

FIG. 21 is a block diagram showing the configuration of the broadcast output terminal provided in the system for controlling automatic exposure of broadcast advertisement data according to the sixth exemplary embodiment of the present invention.

With reference to FIG. 21, the broadcast output terminals 102a~102n provided in the system for controlling automatic exposure of broadcast advertisement data according to the sixth embodiment each include a communication module, a remote controller information receiver, a screen output controller, an advertisement insertion controller, a broadcast data output controller, a matching code extracting unit, a data storage unit, a controller, and a timer.

Reference numeral 112 denotes a communication module connected to a broadcast access network or the Internet network for performing a data transmission and reception with the broadcast data transmission server 104 and the advertisement data transmission server 106, and performing protocol matching and filtering.

Reference numeral 114 denotes a remote controller information receiver for receiving remote control signals with respect to an advertisement data output mode setting signal of a viewer, a screen ratio adjustment signal of advertisement data, and a detailed information check signal of advertisement data.

Reference numeral 116 denotes a screen output controller for controlling outputting of broadcast data and advertisement data through the broadcast output terminals 102a~102n, and adjusting a screen ratio of the broadcast data and advertisement data, and reference numeral 18 denotes an advertisement insertion controller for controlling inserting of advertisement data transmitted from the advertisement data transmission server 106 into a screen area and outputting the same by interworking with the screen output controller 116.

Reference numeral 120 denotes a known broadcast data output controller for controlling receiving of digital broadcast data from the broadcast data transmission server 104 and outputting the received digital broadcast data through the broadcast output terminals 102a~102n. The broadcast data output controller 120 refers to the configuration of hardware and software mounted in a general STB (not shown). In general, digital broadcast data is compressed into an MPEG version and decompressed by a decoder (not shown) included in the STB. The broadcast data output controller 120 is one of general elements of the IPTV, which performs a conventional broadcast output function through hardware and OS, so a detailed description thereof will be omitted.

Reference numeral 125 denotes a matching code extracting unit for extracting a matching code, i.e., a content code, included in broadcast data transmitted from the broadcast data transmission server 104 through the communication module 112.

Reference numeral 124 denotes a data storage unit for storing advertisement data transmitted from the advertisement data transmission server 106 and output condition information (content code information) designated by an advertiser, storing terminal unique number information, and receiving an advertisement data output mode setup signal of the viewer and a screen ratio adjustment signal of the advertisement data and storing the set information associated with them.

Reference numeral 126' denotes a controller for controlling outputting of advertisement data to the screen, receiving broadcast data including the corresponding broadcast content code from the broadcast data transmission server 104 and outputting a broadcast, and selectively extracting advertisement data matching with the content code and inserting it into the same screen to which the corresponding broadcast data is output, in a state that a mode selection signal of a viewer with respect to an advertisement data screen output is received through the remote controller information receiver 114 and the advertisement data and a desired broadcast content code are received from the advertisement data transmission server 106 and stored.

In addition, preferably, the advertisement data output through the screen of the broadcast output terminals 102a~102n is classified by content codes and stored, automatically given a certain sequential number based on the storage order when the plurality of advertisement data are stored, and the advertisement data classified as a code group matching with the broadcast data is extracted and output to the screen based on the sequential number.

Preferably, the broadcast output terminals 102a~102n further includes a key input unit (not shown) for setting an advertisement data output by a viewer, and also a key input unit or a remote controller for adjusting the size ratio of the advertisement output area 300.

The function and operation of the system for controlling automatic exposure of broadcast advertisement data configured as described above according to the sixth exemplary embodiment of the present invention will now be described in detail with reference to the accompanying drawings.

Figure 22:
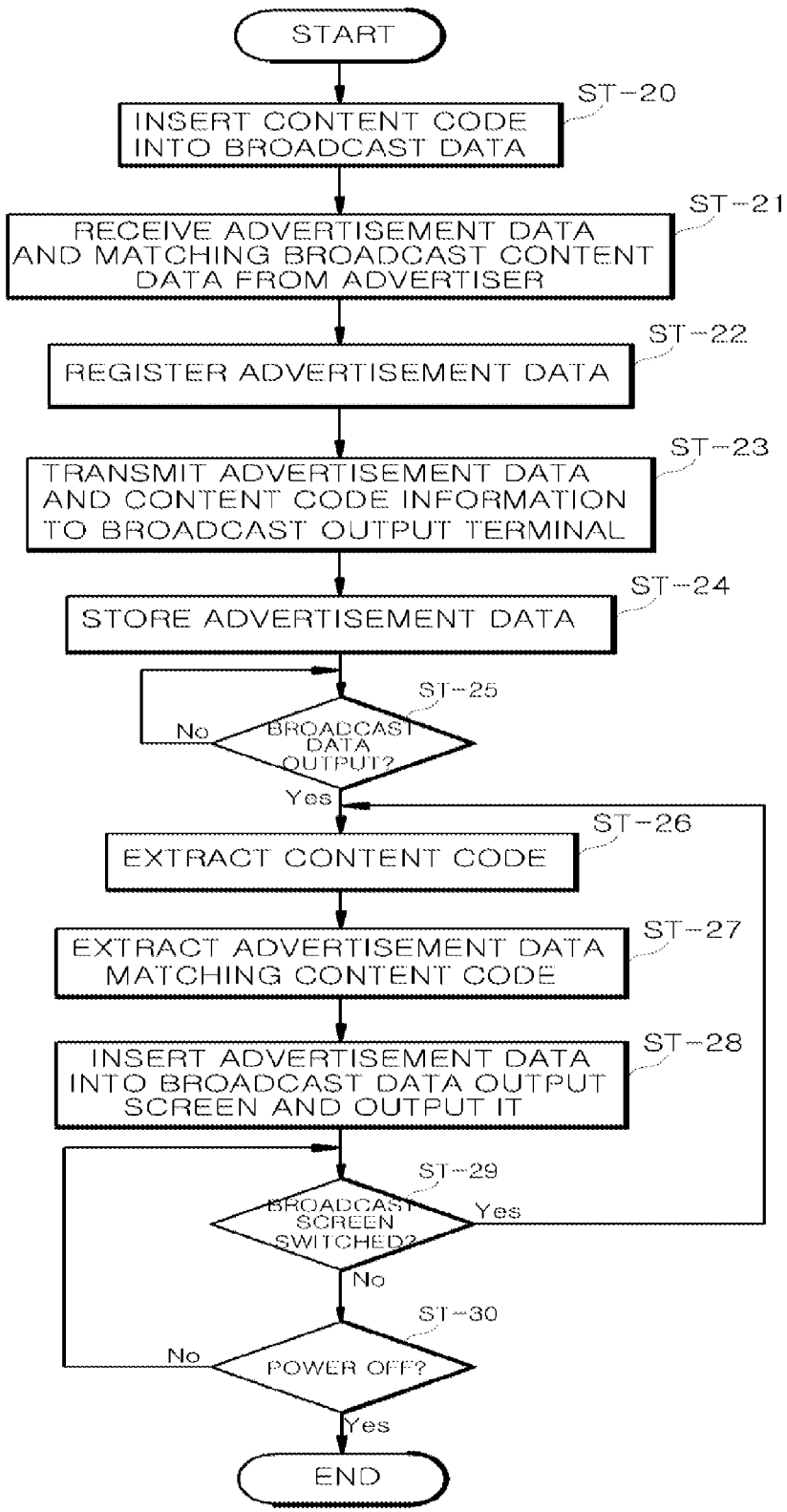
FIG. 22 is a flowchart illustrating a signal flow of the system for controlling automatic exposure of broadcast advertisement data according to the sixth exemplary embodiment of the present invention.

FIG. 22 is a flowchart illustrating a signal flow of the system for controlling automatic exposure of broadcast advertisement data according to the sixth exemplary embodiment of the present invention.

First, through the system for controlling automatic exposure of broadcast advertisement data according to the sixth embodiment, the broadcast data transmission server 104 inserts a content code or a code of lines of a broadcast scenario (hereinafter, referred to as "speech code") of each broadcast scene into broadcast data before transmitting the broadcast data (ST-20).

In this state, the content code or speech code of each scene managed by the broadcast data transmission server 104 is shared by the advertisement data transmission server 106, so the advertiser is connected to the advertisement data transmission server 106 to update advertisement data and selects a content code or a speech code desired to be output with the corresponding advertisement data, so that the advertisement data transmission server 106 can receive the corresponding information.

Namely, the advertisement data transmission server 106 shares the codes of the respective broadcast scenes with the broadcast data transmission server 104. For example, content codes and speech codes, such as the lover appearance scene:

CD-0001, a fight scene: CD-0002, love expression lines: CD-0100, angry lines: CD-0101, cynical lines: CD-0102 . . . , etc. of the respective broadcast scenes are managed by the advertisement data transmission server 106, and the advertiser can read corresponding information and previously set a broadcast scene desired to be output with the uploaded advertisement data by selecting a content code and speech code (ST-21).

Then, the advertisement data transmission server 106 stores the corresponding advertisement data and code information of each broadcast scene desired to be output together with the advertisement data (ST-22).

And then, the advertisement data transmission server 106 transmits the corresponding advertisement data and code information of each broadcast scene desired to be output together with the advertisement data to the broadcast output terminals 102*a*~102*n* provided in each home (ST-23).

Then, the broadcast output terminals 102*a*~102*n* store the corresponding information. In this case, preferably, the broadcast output terminals 102*a*~102*n* classifies the plurality of advertisement data according to the content codes of the respective broadcast scenes and stores the same (ST-24).

In this state, the broadcast output terminals 102*a*~102*n* are in a turned-on state, and determine whether or not a signal for outputting broadcast data to the screen is applied. Namely, because the IPTV may output broadcast data to the screen or output Internet information of a particular URL to the screen, the broadcast output terminals 102*a*~102*n* determine whether or not a broadcast data output signal is applied.

When a broadcast data output signal has been applied, the broadcast output terminals 102*a*~102*n* output broadcast data of a terrestrial wave, a satellite broadcast, a cable broadcast through the screen (ST-25).

And then, the broadcast output terminals 102*a*~102*n* extract content code from the broadcast data which is output upon receiving from the broadcast data transmission server 104 (ST-26).

The broadcast output terminals 102*a*~102*n* extract certain advertisement data previously stored in a code group matching with the corresponding content code and output the extracted advertisement data to a certain portion of a lower side of the broadcast data output to the screen (ST-27, ST-28).

Preferably, the advertisement data is extracted by the broadcast output terminals 2*a*~2*n* according to the given sequential order given when the advertisement data was stored.

In this state, the broadcast output terminals 102*a*~102*n* determine whether or not a broadcast screen change signal, namely, a channel switch signal, is applied through the remote controller information receiver 14 (See FIG. 21) (ST-29).

When the channel switch signal is applied, the broadcast output terminals 102*a*~102*n* return to step ST-26 in order to extract a content code included in broadcast data of a newly switched channel.

When the channel switch signal is not applied, the broadcast output terminals 102*a*~102*n* determine whether or not a power OFF signal is applied. When the power OFF signal is not applied, the broadcast output terminals 2*a*~2*n* return to step ST-26 in order to extract a content code included in each scene of broadcast data. Meanwhile, when the power OFF signal is applied, the process is terminated (ST-30).

Namely, because the content of the broadcast data output through the screen of the broadcast output terminals 102*a*~102*n* may be continuously changed by scenes or may not, the broadcast output terminals 102*a*~102*n* extract advertisement data matching with a corresponding content code from the data storage unit 124 and output it, while monitoring whether or not a content code is included in the broadcast data output to their screen in real time.

When the content code is not changed, namely, even when a scene of the same content continues (for example, when lovers continue to appear), a plurality of advertisement data are stored in the same content code. Thus, when one advertisement data is entirely output, the broadcast output terminals 102*a*~102*n* process to extract another advertisement data stored in the next sequential order and output it to the screen.

Now, a seventh exemplary embodiment of the present invention will be described in detail with reference to the accompanying drawings.

A system for controlling automatic exposure of broadcast advertisement data according to the seventh exemplary embodiment of the present invention is devised such that a viewer stores advertisement data exposed to the screen in a PVR, so that the advertisement data can be output to the screen later.

The broadcast output terminals 102*a*~102*n* included in the system for controlling automatic exposure of broadcast advertisement data according to the first to seventh exemplary embodiments of the present invention include a PVR (not shown) for recording broadcast data and also the data storage unit 24 (see FIG. 21) for temporarily storing various data.

The broadcast output terminals 102*a*~102*n* included in the system for controlling automatic exposure of broadcast advertisement data according to the seventh exemplary embodiment of the present invention may be able to store advertisement data output to the screen in the data storage unit 124 separately according to a remote controller signal of the viewer and output the advertisement data later. In this case, as the storage method, preferably, the advertisement data itself may be copied or a list number or storage sequential number of the corresponding advertisement data may be stored.

Thus, in the system for controlling automatic exposure of broadcast advertisement data according to the seventh embodiment, the viewer can read the advertisement data stored in the data storage unit 124 later through the broadcast output terminals 102*a*~102*n*.

The function and operation of the system for controlling automatic exposure of broadcast advertisement data configured as described above according to the seventh exemplary embodiment of the present invention will now be described in detail with reference to the accompanying drawings.

Figure 23:
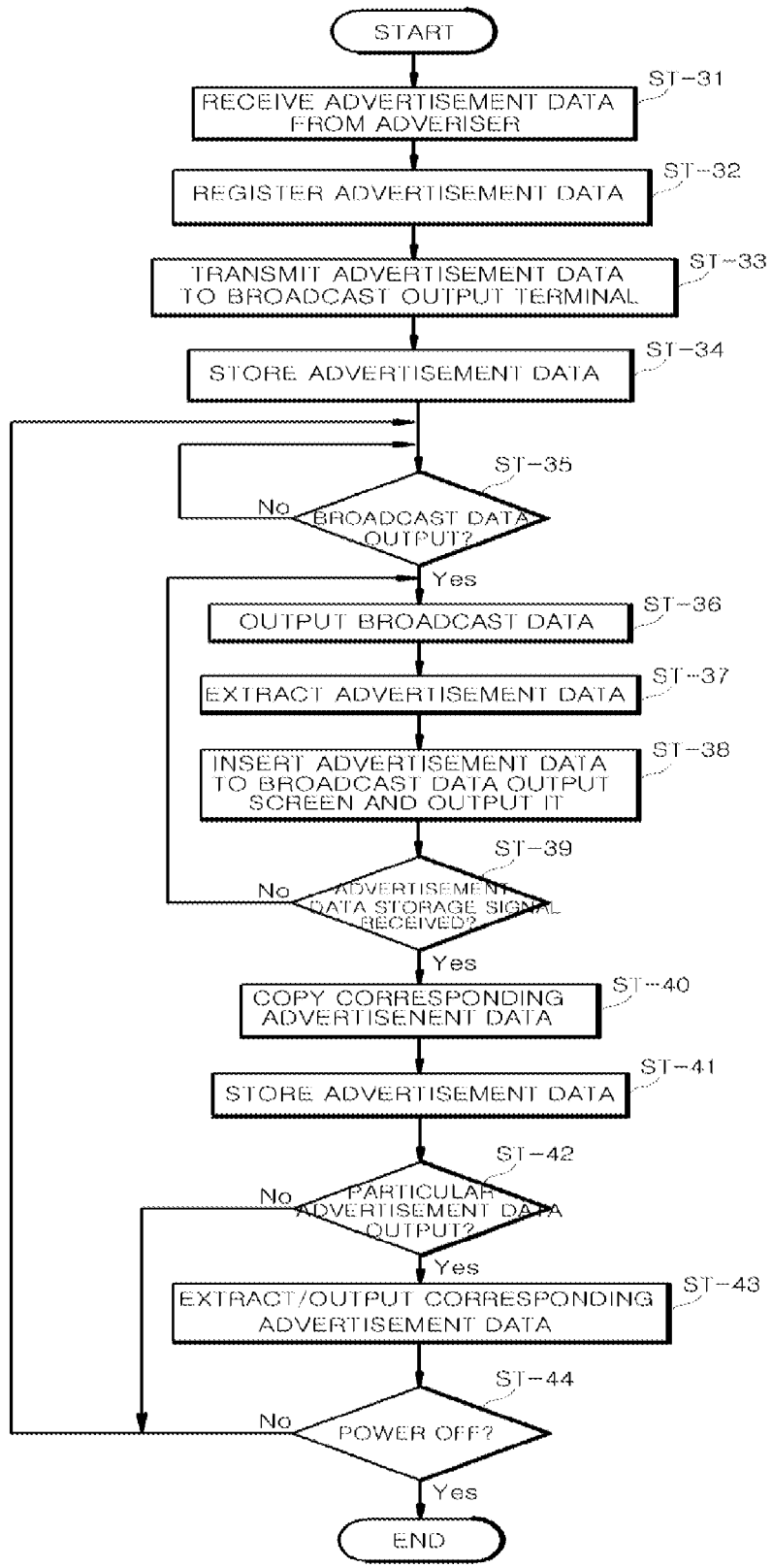
FIG. 23 is a flowchart illustrating a signal flow of a system for controlling automatic exposure of broadcast advertisement data according to a seventh exemplary embodiment of the present invention.

FIG. 23 is a flowchart illustrating a signal flow of a system for controlling automatic exposure of broadcast advertisement data according to the seventh exemplary embodiment of the present invention.

First, the advertisement data transmission server 106 included in the system for controlling automatic exposure of broadcast advertisement data according to the seventh embodiment receives advertisement data from the plurality of advertiser terminals 110*a*~110*n*, registers the advertisement data by the advertisers, and generates advertisement data including company event information or lottery information (ST-31, ST-32).

The advertisement data transmission server 106 transmits the advertisement data to the plurality of broadcast output terminals 2*a*~2*n* connected over the wired/wireless Internet network (ST-33).

In this case, the advertisement data transmission server 106 may transmit updated advertisement data to the broadcast output terminals 102*a*~102*n* at certain time intervals so that the updated advertisement data can be stored in the broadcast output terminals 102*a*~102*n*, or may transmit corresponding advertisement data to the broadcast output terminals 102a~102n in real time as soon as it is received from an advertiser.

In addition, the advertisement data transmission server 106 may selectively transmit, to the broadcast output terminals 102a~102n, only advertisement data matching information of a code of an area in which the broadcast output terminals 102a~102n are located (ST-34).

In this state, the broadcast output terminals 102a~102n are in a turned-on state, and determine whether or not a signal for outputting broadcast data to the screen is applied. Namely, because the IPTV may output broadcast data to the screen or output Internet information of a particular URL to the screen, the broadcast output terminals 102a~102n determine whether or not a broadcast data output signal is applied (ST-35).

When a broadcast data output signal has been applied, the broadcast output terminals 102a~102n output broadcast data of a terrestrial wave, a satellite broadcast, a cable broadcast through the screen (ST-36).

And then, the broadcast output terminals 102a~102n extract advertisement data previously stored therein and outputs the extracted advertisement data to a certain portion of the lower side of the broadcast data output to the screen (ST-37, ST-38).

With the advertisement data is output, the broadcast output terminals 102a~102n determine whether or not an advertisement data storage signal is received. When the advertisement data storage signal is not received, the process is returned to step ST-36. When the advertisement data storage signal is received, the corresponding advertisement data is copied and stored in the data storage unit 124. Namely, because a corresponding advertisement product cannot be stored in real time, the advertisement data is selectively stored and then output later to enhance user convenience.

Preferably, the broadcast output terminals 102a~102n may copy the advertisement data itself or store a list number or storage sequential number of the corresponding advertisement data so that the advertisement data can be output later (ST-39, ST-40, ST-41).

Also, the broadcast output terminals 102a~102n determine whether or not an output signal of particular stored advertisement data is received. When the output signal of particular stored advertisement data is received, the broadcast output terminals 102a~102n extract the corresponding advertisement data from the data storage unit 124 and output the same (ST-42, ST-43).

The broadcast output terminals 102a~102n determine whether or not a power OFF signal is applied. When the power OFF signal is not applied, the process is returned to step ST-35, and when the power OFF signal is applied, the broadcast output terminals 102a~102n are terminated to close the flow (ST-44).

Now, an eighth exemplary embodiment of the present invention will be described in detail with reference to the accompanying drawings.

Figure 24:
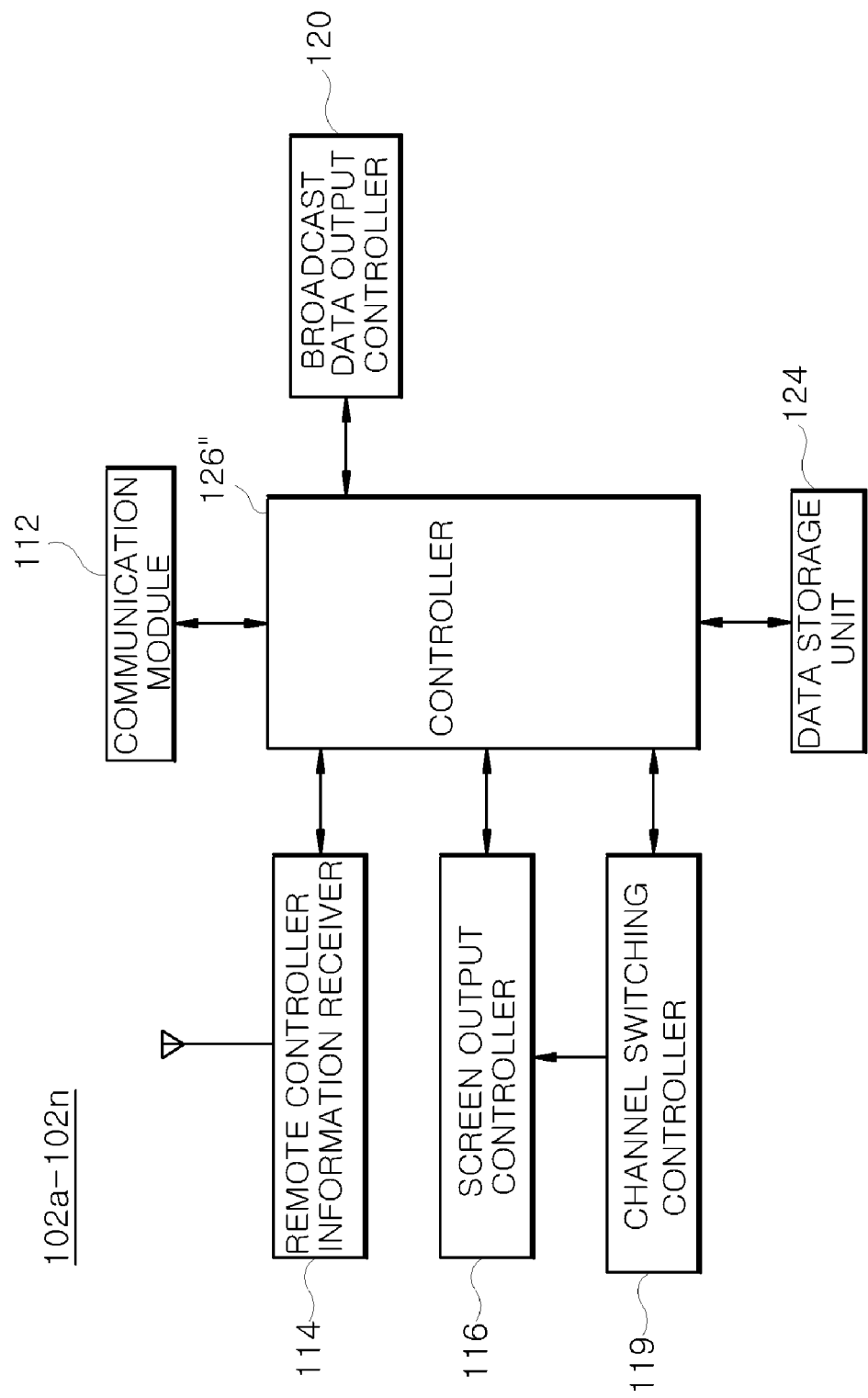
FIG. 24 is a block diagram showing the configuration of a broadcast output terminal provided in a system for controlling automatic exposure of broadcast advertisement data according to an eighth exemplary embodiment of the present invention.

FIG. 24 is a block diagram showing the configuration of a broadcast output terminal provided in a system for controlling automatic exposure of broadcast advertisement data according to an eighth exemplary embodiment of the present invention.

With reference to FIG. 24, the system for controlling automatic exposure of broadcast advertisement data according to the eighth embodiment is devised such that when an advertisement is output as content of a main broadcast program, it is automatically recognized and automatically switched to a predetermined advertisement dedicated channel, and when an initiation signal of the main broadcast program is extracted, the advertisement dedicated cannel is returned to the previous channel, thereby allowing a viewer to have a return for viewing an advertisement.

Namely, in the system for controlling automatic exposure of broadcast advertisement data according to the eighth embodiment, in a state that a particular advertisement dedicated channel is secured like a cable broadcast, when advertisement data is transmitted while a main broadcast program of a terrestrial wave (KBS, MBC, SBS in Korea) or a cable broadcast channel is being aired, it is detected and a channel is automatically switched to a particular advertisement dedicated channel at a corresponding time point, and when a main broadcast program such as soap opera, news, and the like, is initiated, the current channel is returned to the original channel.

To this end, the system for controlling automatic exposure of broadcast advertisement data according to the eighth embodiment must be able to detect a time point at which advertisement data starts to be output during a broadcast program and a time point at which a main broadcast program such as soap opera, news, movie, and the like, starts to be output. Thus, automatic switching is performed by using time information of an electronic program guide (EPG) of each broadcast channel or a Que-tone signal or a signal indicating a start and end of each program.

Namely, the currently viewed broadcast channel is automatically switched to the preset advertisement dedicated channel at a time point when an advertisement broadcast is output to the currently viewed broadcast channel, thus allowing the viewer to have a return for viewing the advertisement.

Thus, a particular advertisement channel number for automatic channel switching is set for the broadcast output terminals 102a~102n included in the system for controlling automatic exposure of broadcast advertisement data according to the eighth exemplary embodiment of the present invention, so automatic switching to a particular advertisement channel is made at a time point when particular conditions (e.g., at a time point when an advertisement is output from the original broadcast program channel or at a time point when power is turned on or off) are met through program time information included in the EPG, Que-tone signal information, or program start and end signal information transmitted from the broadcast data transmission server 104, and the original broadcast channel is returned at a time point when a broadcast program (program content such as soap opera, movie, news, etc., not an advertisement) starts.

To this end, the broadcast output terminals 102a~102n included in the system for controlling automatic exposure of broadcast advertisement data according to the eighth embodiment include a communication module, a remote controller information receiver, a screen output controller, a channel switching controller, a broadcast data output controller, a data storage unit, a controller, and a timer.

Reference numeral 112 denotes a communication module connected to a broadcast access network or the Internet network for performing a data transmission and reception with the broadcast data transmission server 104 and the advertisement data transmission server 106, and performing protocol matching and filtering.

Reference numeral 114 denotes a remote controller information receiver for receiving remote control signals with respect to an advertisement data output mode setting signal of a viewer.

Reference numeral 116 denotes a screen output controller for controlling outputting of broadcast data and advertisement data through the broadcast output terminals 102a~102n, and reference numeral 119 denotes a channel switching controller for automatically switching a broadcast channel being viewed to a preset particular advertisement dedicated channel by interworking with the screen output controller 116.

Reference numeral 120 denotes a known broadcast data output controller for controlling receiving of digital broadcast data from the broadcast data transmission server 104 and outputting the received digital broadcast data through the broadcast output terminals 102a~102n. The broadcast data output controller 120 refers to the configuration of hardware and software mounted in a general STB (not shown). In general, digital broadcast data is compressed into an MPEG version and decompressed by a decoder (not shown) included in the STB. The broadcast data output controller 120 is one of general elements of the IPTV, which performs a conventional broadcast output function through hardware and OS, so a detailed description thereof will be omitted.

Reference numeral 124 denotes a data storage unit for storing a channel number of a particular advertisement dedicated channel established by using a plurality of advertisement data transmitted from an advertiser through the advertisement data transmission server 106, storing automatic switching condition information (EPG time information, a Que-tone information value, a start and end signal value of broadcast program, etc.), and storing terminal unique number information and an advertisement data output mode setting signal of an viewer.

Reference numeral 126 denotes a controller for receiving a mode selection signal of a viewer for automatic switching to an advertisement channel through the remote controller information receiver 114 and setting a particular advertisement dedicated channel number, and in this state, receiving broadcast data including signal information regarding a start and end of the corresponding broadcast program from the broadcast data transmission server 104 to output it to be broadcast, automatically switching to a preset advertisement dedicated channel at a time when the advertisement data is output through the corresponding channel, and when a broadcast program start signal of the main broadcast channel is received, performing automatic channel switching so that it is returned to the original broadcast channel.

The function and operation of the system for controlling automatic exposure of broadcast advertisement data according to the eighth exemplary embodiment of the present invention will now be described in detail with reference to the accompanying drawings.

Figure 25:
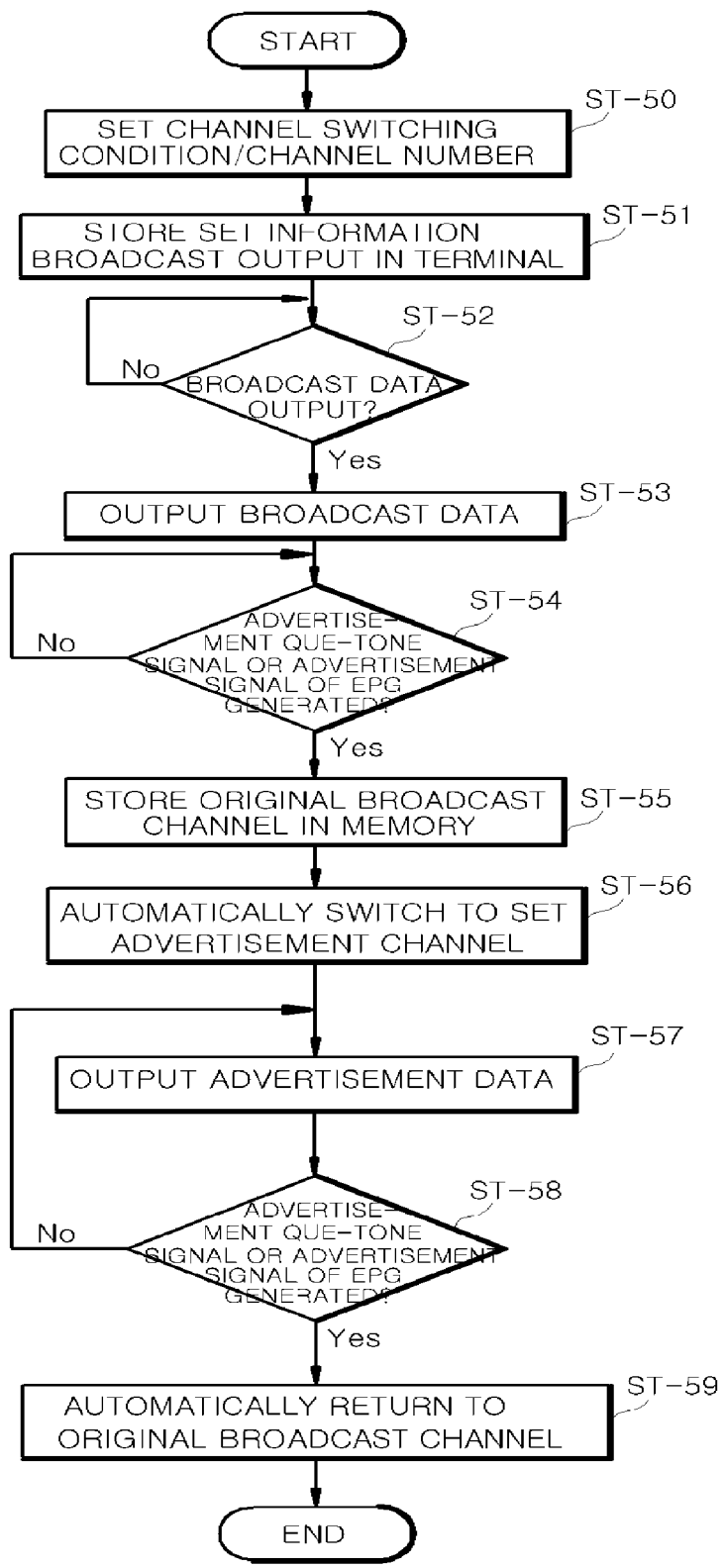
FIGS. 25 and 26 are flowcharts illustrating a signal flow of the system for controlling automatic exposure of broadcast advertisement data according to the eighth exemplary embodiment of the present invention.
Figure 26:
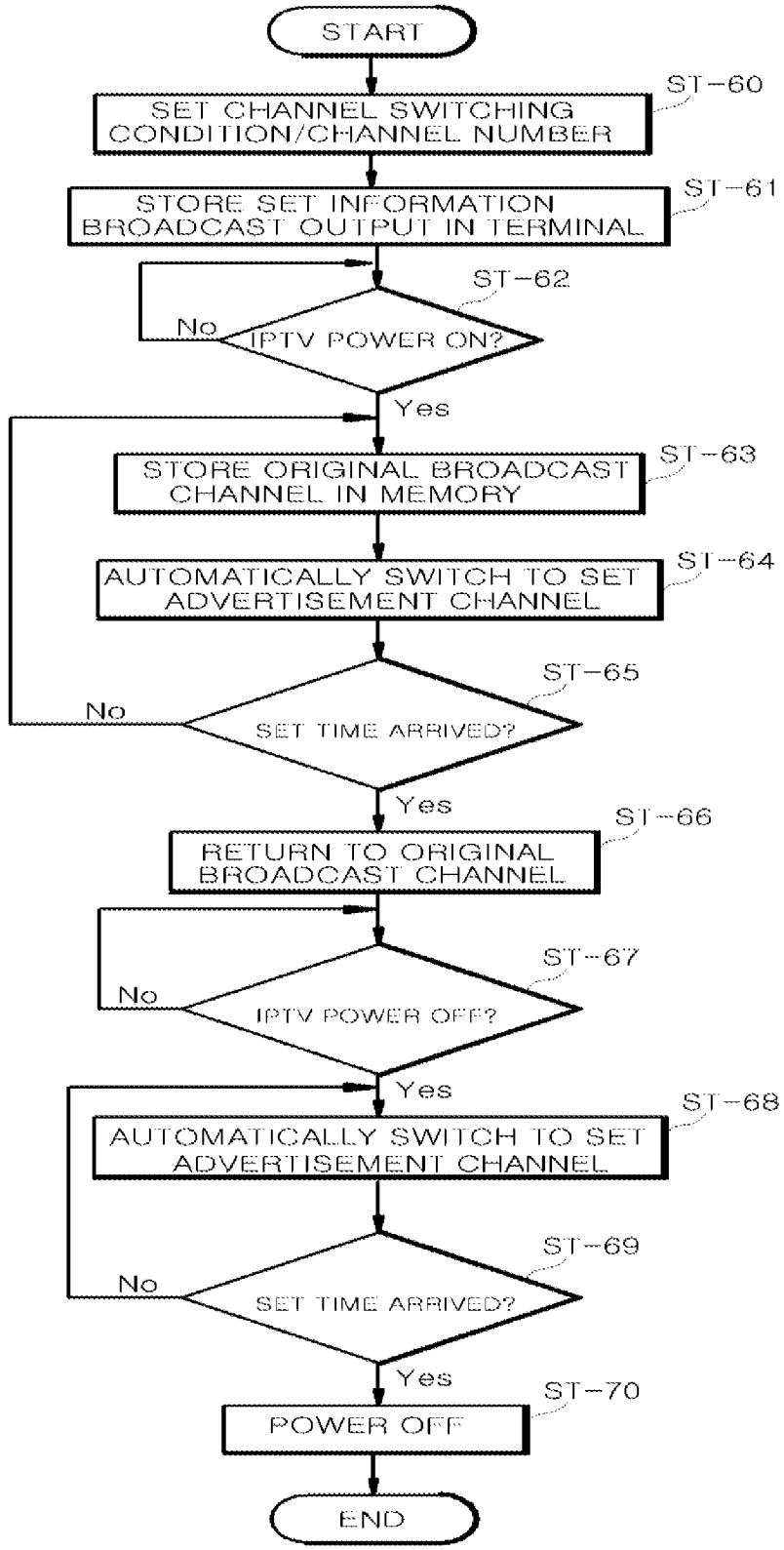

FIGS. 25 and 26 are flowcharts illustrating a signal flow of the system for controlling automatic exposure of broadcast advertisement data according to the eighth exemplary embodiment of the present invention.

First, with reference to FIG. 25, when an automatic switching mode setting signal of a viewer is applied through the broadcast output terminals 102a~102n included in the system for controlling automatic exposure of broadcast advertisement data according to the eighth exemplary embodiment of the present invention, channel switching conditions and a particular channel number to which automatic switching is to be made are set for the broadcast output terminals 102a~102n, and the set information is stored.

Namely, the broadcast output terminals 102a~102n include channel switching conditions and advertisement dedicated channel number in advance when they are manufactured, and the set state of the broadcast output terminals 102a~102n is activated according to a viewer's mode selection (ST-50, ST-51).

In this case, channel automatic switching conditions are a time point at which an advertisement broadcast is output to a currently viewed broadcast channel through EPG time information, a Que-tone information value, a broadcast program start and end signal value. Namely, the currently viewed broadcast channel is automatically switched to the preset advertisement dedicated channel at a time point when an advertisement broadcast is output to the currently viewed broadcast channel, thus allowing the viewer to have a return for viewing the advertisement.

This is because, the current broadcast channel cannot provide a return for the viewer's viewing an advertisement although an advertisement broadcast is output to the current broadcast channel, so the system of this embodiment secures a channel for dedicatedly outputting advertisement data provided from an advertiser and automatically performs switching to the advertisement dedicated channel when particular switching conditions are met, thereby providing an advertisement cost of the advertiser to the viewer.

Thus, the broadcast output terminals 102a~102n are in a turned-on state, and determine whether or not a signal for outputting broadcast data to the screen is applied. Namely, because the IPTV may output broadcast data to the screen or output Internet information of a particular URL to the screen, the broadcast output terminals 102a~102n determine whether or not a broadcast data output signal is applied (ST-52).

When a broadcast data output signal has been applied, the broadcast output terminals 102a~102n output broadcast data of a terrestrial wave, a satellite broadcast, a cable broadcast through the screen (ST-53).

In this state, the broadcast output terminals 102a~102n determine whether or not an advertisement broadcast output time point has arrived in the corresponding broadcast channel through an advertisement Que-tone signal or EPG. When the advertisement broadcast output time point has arrived, the broadcast output terminals 2a~2n automatically store the original broadcast channel number (ST-54, ST-55).

And then, the broadcast output terminals 102a~102n automatically switch the screen to a preset advertisement dedicated channel to output an advertisement dedicated broadcast to the screen (ST-56, ST-57).

Next, the broadcast output terminals 102a~102n determine whether or not a broadcast program start time point has arrived in the corresponding broadcast channel through an advertisement Que-tone signal or the EPG. When the broadcast program start time point has arrived, the broadcast output terminals 102a~102n control to automatically return to the previously stored original broadcast channel (ST-58, ST-59).

Meanwhile, preferably, the broadcast output terminals 102a~102n transmit advertisement channel view time information of each viewer, who has viewed the advertisement channel until the broadcast output terminals 102a~102n were returned to the original broadcast channel, to the remote advertisement data transmission server 106, so that a return for viewing the advertisement can be paid. For example, the return for viewing the advertisement may be a benefit as a prize winner through automatic entry for various events or prize money.

With reference to FIG. 26, when an automatic switching mode setting signal of a viewer is applied through the broadcast output terminals 102a~102n included in the system for controlling automatic exposure of broadcast advertisement data according to the eighth exemplary embodiment of the present invention, channel switching conditions and a particular channel number to which automatic switching is to be made are set for the broadcast output terminals 102a~102n, and the set information is stored.

Namely, the broadcast output terminals 102a~102n include channel switching conditions and advertisement dedicated channel number in advance when they are manufactured, and the set state of the broadcast output terminals 102a~102n is activated according to a viewer's mode selection (ST-60, ST-61).

In this case, the channel automatic switching conditions illustrated in FIG. 26 are whether or not a power turn-on or turn-off time point of the broadcast output terminals 102a~102n is detected. Namely, the broadcast output terminals 102a~102n are automatically switched to the preset advertisement dedicated channel for a certain time period at a time point when power of the broadcast output terminals 102a~102n is turned on or turned off, thereby allowing the viewer to have a return for viewing an advertisement.

Thus, the broadcast output terminals 102a~102n determine whether or not power is turned on, and when the power is turned on, the broadcast output terminals 2a~2n store a channel number output to the screen at the corresponding time point (ST-62, ST-63).

And then, the broadcast output terminals 102a~102n automatically switch the screen to the preset advertisement dedicated channel to output an advertisement dedicated broadcast to the screen (ST-64).

Thereafter, the broadcast output terminals 102a~102n determine whether or not a preset output limit time has arrived. When the output limit time has arrived, the broadcast output terminals 102a~102n are controlled to be automatically returned to the prestored original broadcast channel (ST-65, ST-66).

Also, the broadcast output terminals 102a~102n determine whether or not a power turn-off signal has been applied. When the power turn-off signal has been applied, the broadcast output terminals 2a~2n automatically switch the screen to a preset advertisement dedicated channel at the corresponding time point to output an advertisement dedicated broadcast to the screen (ST-67, ST-68).

And then, the broadcast output terminals 102a~102n determine whether or not a preset output limit time has arrived. When the output limit time has arrived, the broadcast output terminals 102a~102n automatically turn off power (ST-69, ST-70).

Now, a ninth exemplary embodiment of the present invention will be described in detail with reference to the accompanying drawings.

Figure 27:
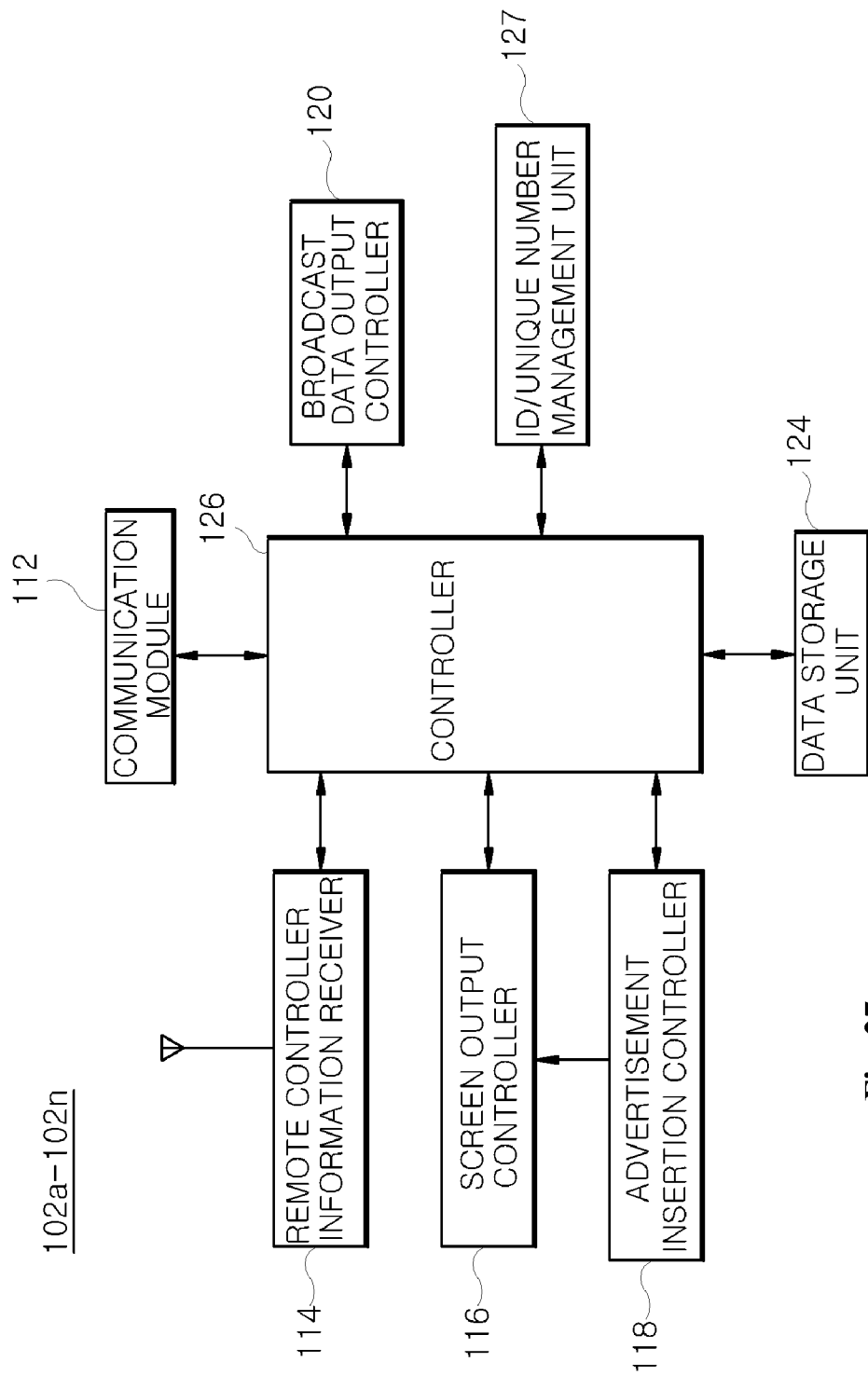
FIG. 27 is a block diagram showing the configuration of a broadcast output terminal provided in a system for controlling automatic exposure of broadcast advertisement data according to a ninth exemplary embodiment of the present invention.

FIG. 27 is a block diagram showing the configuration of a broadcast output terminal provided in a system for controlling automatic exposure of broadcast advertisement data according to a ninth exemplary embodiment of the present invention.

With reference to FIG. 27, the system for controlling automatic exposure of broadcast advertisement data according to the ninth exemplary embodiment of the present invention is devised such that a viewer logs in to an IPTV in a remote different home (place) he or she is visiting, so that the viewer can have a return for viewing an advertisement by using the ID of the corresponding viewer.

To this end, the system for controlling automatic exposure of broadcast advertisement data according to the ninth embodiment includes the broadcast output terminals 102a~102n for outputting broadcast data and advertisement data by inputting a user ID, the advertisement data transmission server 106 for previously receiving advertisement data from the plurality of advertiser terminals 110a~110n and storing them, transmitting advertisement data to the broadcast output terminals 102a~102n, receiving a viewer ID and advertisement view time information from the broadcast output terminals 102a~102n and accumulating an advertisement view time according to each ID in order to provide a differentiated return according to an advertisement view time, and the broadcast data transmission server 104 for transmitting broadcast data to the broadcast output terminals 102a~102n.

In this case, preferably, although the same ID is repeatedly detected with respect to a terminal unique number by the advertisement data transmission server 106, the advertisement data transmission server 106 adds up an advertisement view time based on the corresponding ID to accumulatively calculate it.

Meanwhile, the broadcast output terminals 102a~102n included in the system for controlling automatic exposure of broadcast advertisement data according to the ninth exemplary embodiment of the present invention include a communication module, a remote controller information receiver, a screen output controller, an advertisement insertion controller, a broadcast data output controller, an ID/unique number management unit, a data storage unit, a controller, and a timer.

Reference numeral 112 denotes a communication module connected to a broadcast access network or the Internet network for performing a data transmission and reception with the broadcast data transmission server 104 and the advertisement data transmission server 106, and performing protocol matching and filtering.

Reference numeral 114 denotes a remote controller information receiver for receiving remote control signals with respect to an advertisement data output mode setting signal of a viewer, a screen ratio adjustment signal of advertisement data, and a viewer ID information input signal.

Reference numeral 116 denotes a screen output controller for controlling outputting of broadcast data and advertisement data through the broadcast output terminals 102a~102n, and adjusting a screen ratio of the broadcast data and advertisement data, and reference numeral 118 denotes an advertisement insertion controller for controlling inserting of advertisement data transmitted from the advertisement data transmission server 106 into a screen area and outputting the same by interworking with the screen output controller 116.

Reference numeral 120 denotes a known broadcast data output controller for controlling receiving of digital broadcast data from the broadcast data transmission server 104 and outputting the received digital broadcast data through the broadcast output terminals 102a~102n. The broadcast data output controller 120 refers to the configuration of hardware and software mounted in a general STB (not shown). In general, digital broadcast data is compressed into an MPEG version and decompressed by a decoder (not shown) included in the STB. The broadcast data output controller 120 is one of general elements of the IPTV, which performs a conventional broadcast output function through hardware and OS, so a detailed description thereof will be omitted.

Reference numeral 127 denotes an ID/unique number management unit for receiving and managing viewer ID information through the remote controller information receiver 14, and managing a terminal unique number, wherein the viewer ID input to the ID/unique number management unit 127 remains unchanged until it is re-changed, and although the same ID is repeatedly detected in a different terminal unique number by the advertisement data transmission server 108, the advertisement data transmission server 108 adds up the advertisement view time based on the corresponding ID to accumulatively calculate it.

Reference numeral 124 denotes a data storage unit for storing advertisement data transmitted from the advertisement data transmission server 106, storing terminal unique number information and ID information set by a viewer, receiving an advertisement data output mode setup signal of the viewer and a screen ratio adjustment signal of the advertisement data, and storing the set information associated with them.

Reference numeral 126 denotes a controller for receiving broadcast data from the broadcast data transmission server 104 to output it to be broadcast, outputting the broadcast data to the same screen, and transmitting the advertisement view time information together with the terminal unique information to the advertise data transmission server 106 at certain time intervals, in a state that a viewer's mode selection signal and viewer ID information with respect to an advertisement data screen output are received through the remote controller information receiver 14 and set in the corresponding terminal and the advertisement data is received from the advertisement data transmission server 106 and stored.

Preferably, the broadcast output terminals 102*a*~102*n* further include a key input unit (not shown) for setting an advertisement data output mode and viewer ID to the corresponding terminal, and also a key input unit or remote controller for adjusting the size ratio of the advertisement output area 300.

Figure 28:
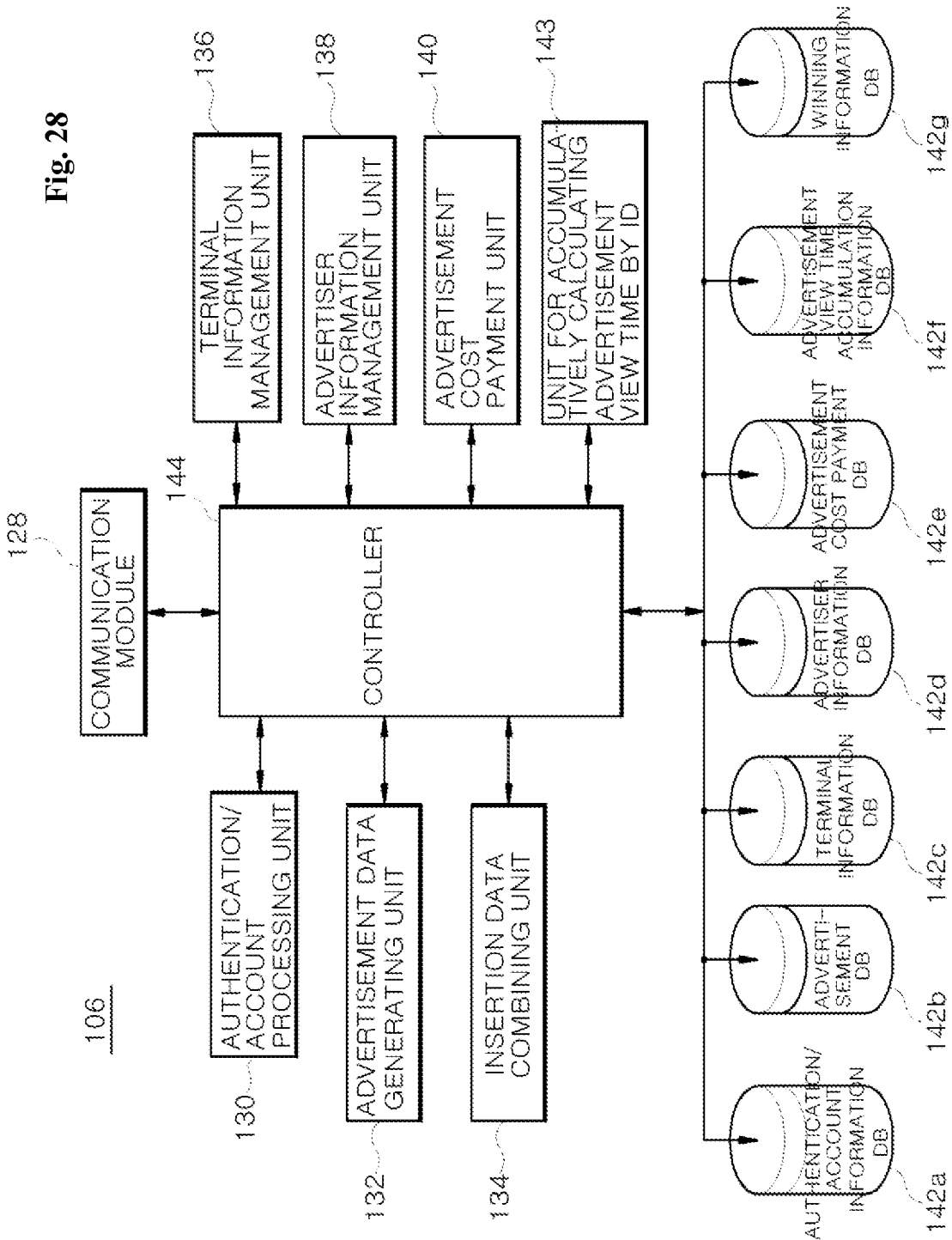
FIG. 28 is a block diagram showing the configuration of an advertisement data transmission server provided in the system for controlling automatic exposure of broadcast advertisement data according to the ninth exemplary embodiment of the present invention.

FIG. 28 is a block diagram showing the configuration of the advertisement data transmission server provided in the system for controlling automatic exposure of broadcast advertisement data according to the ninth exemplary embodiment of the present invention.

With reference to FIG. 28, the advertisement data transmission server 106 provided in the system for controlling automatic exposure of broadcast advertisement data according to the fifth embodiment includes a communication module, an authentication/account processing unit, an advertisement data generating unit, an insertion data combining unit, a terminal information management unit, an advertiser information management unit, an advertisement cost payment unit, an advertisement view time accumulation calculation unit according to each ID, an authentication/account information DB, an advertisement DB, a terminal information DB, an advertiser information DB, an advertisement cost payment DB, an advertisement view time accumulation information DB according to each ID, a winning information DB, and a controller.

Reference numeral 128 denotes a communication module for performing data communication with the broadcast output terminals 102*a*~102*n* and the advertiser terminals 110*a*~110*n* to upload or download various data, and performing protocol matching or data filtering.

Reference numeral 130 denotes an authentication/account processing unit for performing account or authentication on an ID of a viewer who wants to perform data transmission through the broadcast output terminals 102*a*~102*n* and the advertiser terminals 110*a*~110*n*.

Reference numeral 132 denotes an advertisement data generating unit for receiving advertisement data from the advertiser terminals 110*a*~110*n* and storing the same, and generating advertisement data including company image, advertisement product image and various image information, and transmitting the generated advertisement data to the broadcast output terminals 102*a*~102*n*.

Reference numeral 134 denotes an insertion data combining unit for inserting the company event information and image information into the advertisement data by interworking with the advertisement data generating unit 132. Reference numeral 136 denotes a terminal information management unit for managing terminal unique code information of the broadcast output terminals 102*a*~102*n* and the advertiser terminals 110*a*~110*n* and viewer ID information to classify received data by unique codes or viewer IDs. Reference numeral 138 denotes an advertiser information management unit for managing information regarding an advertisement cost transferred by an advertiser and personal information of the advertiser including area information.

Reference numeral 140 denotes an advertisement cost payment unit for calculating an advertisement cost to be charged to an advertiser in proportion to an output time of advertisement data output through the broadcast output terminals 102*a*~102*n*, and paying the advertisement cost. Reference numeral 143 denotes an advertisement view time accumulation calculation unit according to each ID for receiving ID information and advertisement view time information transmitted from the broadcast output terminals 102*a*~102*n* to accumulatively calculate it by IDs.

Reference numeral 142*a* denotes an authentication information DB for storing viewer ID account and authentication information, and reference numeral 142*b* denotes an advertisement DB for storing advertisement data transmitted from the advertiser terminals 10*a*~10*n*. Reference numeral 142*c* denotes a terminal information DB for storing terminal unique code information of the broadcast output terminals 102*a*~102*n* and the advertiser terminals 110*a*~110*n*, ID information, and area information matching with the unique code information.

Reference numeral 142*d* denotes an advertiser information DB for storing information regarding an advertisement cost previously transferred by an advertiser and personal information of the advertiser including area information, and reference numeral 142*e* denotes an advertisement cost payment DB for storing advertisement output cost payment information of the advertiser.

Reference numeral 142*f* denotes an advertisement view time accumulation information DB according to each ID for accumulatively calculating advertisement view time information by IDs and storing integrated information by terminals, and reference numeral 142*g* denotes a winning information DB for storing information on cost which is offered by an advertiser in proportion to the integrated advertisement view time and provided to a prize winner by a lottery or game.

Reference numeral 144 denotes a controller for receiving advertisement data from the advertiser terminals 110*a*~110*n* and storing the same, receiving an advertisement output mode signal from the broadcast output terminals 102*a*~102*n*, corresponding terminal information and viewer ID information and registering the same, generating advertisement data including company event information and image information, transmitting the generated advertisement data to the broadcast output terminals 102*a*~102*n* at certain time intervals, receiving viewer ID information and advertisement view time information from the broadcast output terminals 102*a*~102*n* and accumulatively calculating the same, selecting a prize winner by a lottery or game and paying the advertisement cost as a prize money.

The function and operation of the system for controlling automatic exposure of broadcast advertisement data configured as described above according to the ninth exemplary embodiment of the present invention will now be described in detail with reference to the accompanying drawings.

Figure 29:
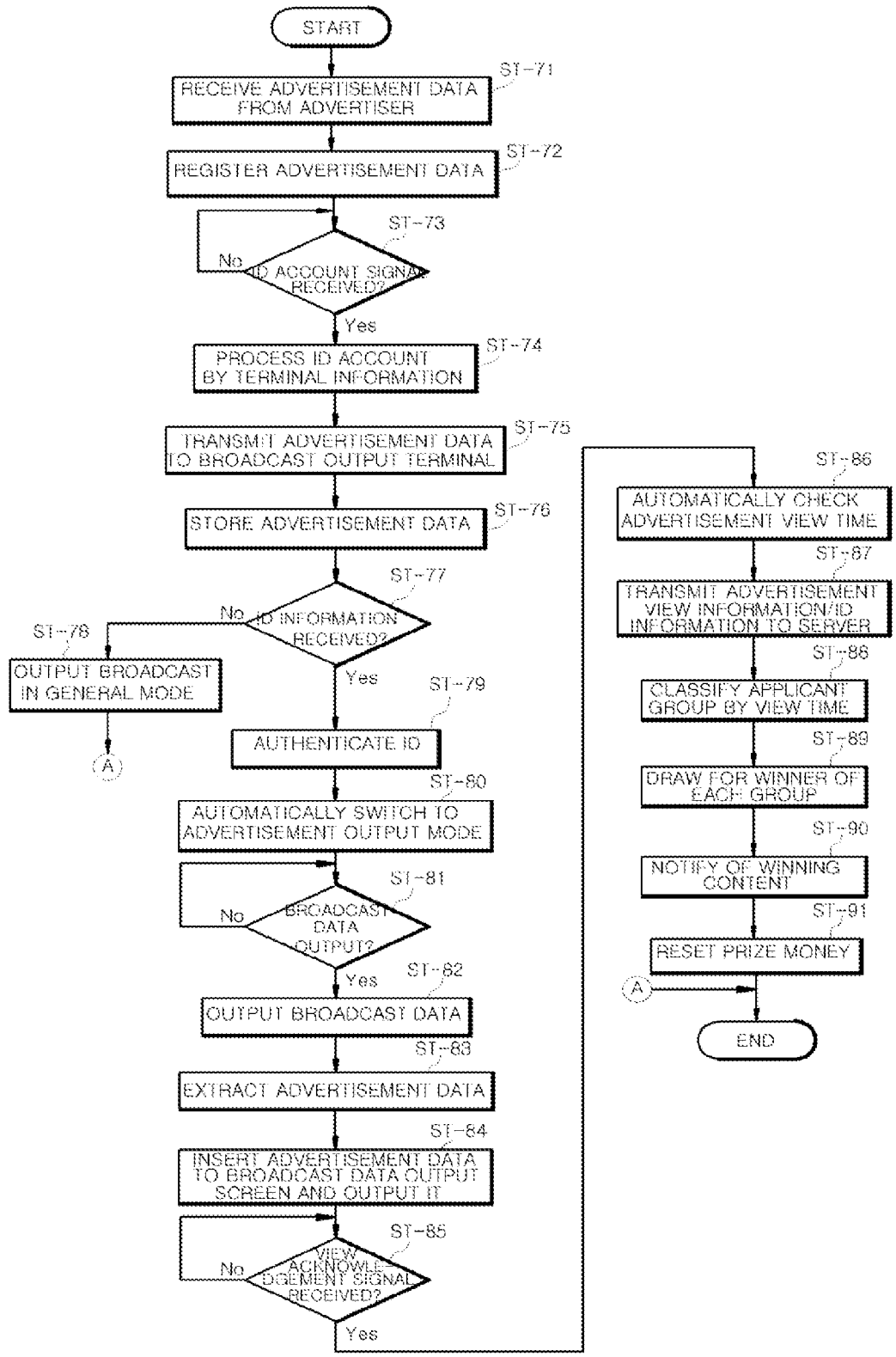
FIG. 29 is a flowchart illustrating a signal flow of the system for controlling automatic exposure of broadcast advertisement data according to the ninth exemplary embodiment of the present invention.

FIG. 29 is a flowchart illustrating a signal flow of the system for controlling automatic exposure of broadcast advertisement data according to the ninth exemplary embodiment of the present invention.

First, the advertisement data transmission server 106 included in the system for controlling automatic exposure of broadcast advertisement data according to the ninth exemplary embodiment of the present invention receives advertisement data from the plurality of advertiser terminals 110*a*~110*n*, registers the advertisement data by the advertisers, and generates advertisement data including company event information or lottery information (ST-71, ST-72).

In this state, the advertisement data transmission server 106 determines whether or not an ID account signal is received from one of the broadcast output terminals 102a~102n. When an ID account signal is received, the advertisement data transmission server 6 receives personal information of a corresponding viewer and processes the ID account (ST-73, ST-74).

Next, the advertisement data transmission server 106 transmits prestored advertisement data to the corresponding broadcast output terminals 102a~102n (ST-75).

In this state, the advertisement data transmission server 106 determines whether or not ID information is received from one of the broadcast output terminals 102a~102n. When ID information is not received, the corresponding broadcast output terminals 102a~102n output it to be broadcast in a general mode (ST-77, ST-78).

Meanwhile, when ID information is received from one of the broadcast output terminals 102a~102n, the advertisement data transmission server 106 authenticates a corresponding viewer ID and controls the corresponding broadcast output terminals 102a~102n to be automatically switched to an advertisement output mode (ST-79, ST-80).

In this state, the broadcast output terminals 102a~102n are in a turned-on state, and determine whether or not a signal for outputting broadcast data to the screen is applied. Namely, because the IPTV may output broadcast data to the screen or output Internet information of a particular URL to the screen, the broadcast output terminals 102a~102n determine whether or not a broadcast data output signal is applied (ST-81).

When a broadcast data output signal has been applied, the broadcast output terminals 102a~102n output broadcast data of a terrestrial wave, a satellite broadcast, a cable broadcast through the screen (ST-82).

Next, the broadcast output terminals 102a~102n extracts the advertisement data prestored therein and outputs the advertisement data to a certain portion of a lower side of the broadcast data output to the screen (ST-84).

Meanwhile, the broadcast output terminals 102a~102n drive the timer 26a starting from a time point when each advertisement data starts to be output to calculate an advertisement output time. In this case, when an advertisement view acknowledgement signal generated by a viewer is received, the broadcast output terminals 102a~102n transmit the corresponding advertisement view time information along with a terminal unique code and viewer ID information to the advertisement data transmission server 106 (ST-85, ST-86, ST-87).

Then, the advertisement data transmission server 106 receives the advertisement view time information and the terminal unique code from the broadcast output terminals 102a~102n and classifies an applicant group by advertisement view time (ST-88).

When a lottery time arrives, the advertisement data transmission server 106 draws for a winner of each applicant group, and when the corresponding winner is determined, the advertisement data transmission server 106 notifies the broadcast output terminals 102a~102n of the prize winning content. And then, the advertisement data transmission server 106 resets the prize money of each applicant group (ST-89, ST-90, ST-91).

Now, a tenth exemplary embodiment of the present invention will be described in detail with reference to the accompanying drawings.

The system for controlling automatic exposure of broadcast advertisement data according to the tenth exemplary embodiment of the present invention is devised such that a viewer transfers an event participation or lottery participation opportunity (or chance) with respect to his or her viewing of an advertisement to someone else, in order to increase a winning probability of the transferred person.

Namely, the system for controlling automatic exposure of broadcast advertisement data according to the tenth exemplary embodiment of the present invention is devised to transfer an advertisement view time accumulated by IDs to a different person according to a user's request, under the control of the advertisement data transmission server 106 that manages advertisement view time information according to an ID of each viewer, classifies applicant groups according to advertisement view time, and draws for a lottery to confirm a prize winner. Thus, when an advertisement view time of a plurality of viewers is transferred to one viewer, like a reserve, the viewer can be classified into an applicant group for which more prize money is offered and drawn for a lottery, and as the transferred viewer can have a higher winning probability by making an application by dividing the advertisement view time into a plurality of parts.

Thus, the system for controlling automatic exposure of broadcast advertisement data according to the tenth exemplary embodiment of the present invention includes the broadcast output terminals 102a~102n for inputting a user ID and outputting broadcast data and advertisement data, the advertisement data transmission server 106 for previously receiving advertisement data from the plurality of advertiser terminals 110a~110n and storing them, transmitting advertisement data to the broadcast output terminals 102a~102n, receiving a viewer ID and advertisement view time information from the broadcast output terminals 102a~102n, accumulating an advertisement view time according to each ID in order to provide a differentiated return according to an advertisement view time, and controlling to transfer an advertisement view time of each ID to a different person, and the broadcast data transmission server 104 for transmitting broadcast data to the broadcast output terminals 102a~102n.

Figure 30:
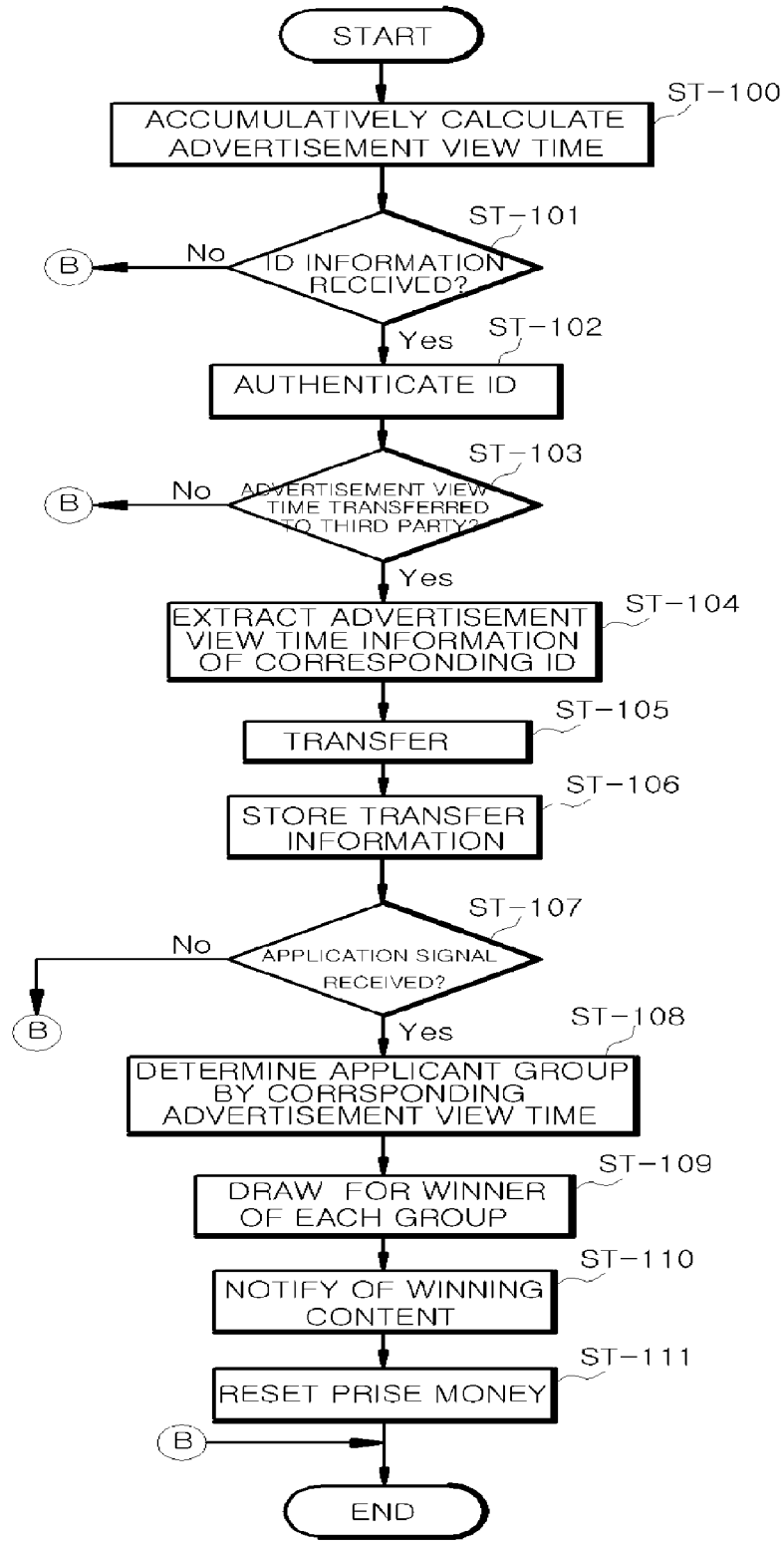
FIG. 30 is a flowchart illustrating a signal flow of a system for controlling automatic exposure of broadcast advertisement data according to a tenth exemplary embodiment of the present invention.

FIG. 30 is a flowchart illustrating a signal flow of the system for controlling automatic exposure of broadcast advertisement data according to the tenth exemplary embodiment of the present invention.

First, the advertisement data transmission server 106 included in the system for controlling automatic exposure of broadcast advertisement data according to the present exemplary embodiment receives advertisement view time information of each ID through the broadcast output terminals 102a~102n and accumulates the same (ST-100).

In this state, the advertisement data transmission server 106 determines whether or not ID information is received from the broadcast output terminals 102a~102n. When ID information is received, the broadcast output terminals 102a~102n authenticate the corresponding ID (ST-101, ST-102).

And then, the advertisement data transmission server 106 determines whether or not ID information of a transferee and an advertisement view time transfer signal are applied from the broadcast output terminals 102a~102n. When the transfer signal is applied, the advertisement data transmission server 106 extracts an advertisement view time stored to interwork with the ID of a corresponding transferer, and transfers it. And then, the advertisement data transmission server 106 stores the corresponding transfer information (ST-103, ST-104, ST-105, ST-106).

In this state, the advertisement data transmission server 106 determines whether or not an application signal is received from the broadcast output terminals 102a~102n.

When an application signal is received, the advertisement data transmission server 106 draws for a winner of each applicant group classified by corresponding advertisement view time (ST-107, ST-108, ST-109).

And then, the advertisement data transmission server 106 provides winning information to the broadcast output terminals 102a~102n of the corresponding prize winner, and resets prize money of the corresponding applicant group having the determined prize winner (ST-110, ST-111).

The preferred embodiments of the present invention have been described with reference to the accompanying drawings, and it will be apparent to those skilled in the art that various modifications and variations can be made in the present invention without departing from the scope of the invention.

What is claimed is:

1. A system for inserting advertisement data into broadcast data, the system comprising:

broadcast output terminals for outputting broadcast data to a broadcast data output area of a screen output area, and dividedly generating an advertisement data output area at a lower end portion of the screen output area to output advertisement data for a certain time period when advertisement output conditions are met; a broadcast data transmission server for transmitting broadcast data to t3he broadcast output terminals through a relay station or a relay satellite; and advertiser terminals for transmitting advertisement data and advertisement information to an advertisement data transmission server configured for receiving advertisement data from the advertiser terminals and storing the advertisement data, and transmitting the advertisement data to the broadcast output terminals, wherein the broadcast output terminals include: a communication module, connected to a broadcast access network or Internet network, for performing a data transmission and reception with the broadcast data transmission server and the advertisement data transmission server and performing protocol matching and filtering; a remote controller information receiver for receiving remote control signals with respect to an advertisement data output setting signal of a viewer, a screen ratio adjustment signal of advertisement data, a detailed information check signal of advertisement data, a channel switch signal, and a power ON/OFF signal; a screen output controller for controlling outputting of broadcast data and advertisement data through the broadcast output terminals; an advertisement insertion controller for controlling inserting of advertisement data transmitted from the advertisement data transmission server into a screen area and outputting the same by interworking with the screen output controller; a broadcast data output controller for controlling receiving of digital broadcast data from the broadcast data transmission server and outputting the received digital broadcast data through the broadcast output terminals; a broadcast data recording controller for receiving the digital broadcast data from the broadcast data transmission server, and recording and storing the digital broadcast data; a data storage unit for storing advertisement data transmitted from the advertisement data transmission server, storing terminal unique number information, and receiving an advertisement data output setup signal of the viewer and a screen ratio adjustment signal of the advertisement data and storing the set information associated with them; and a controller for controlling outputting of advertisement data to the screen for a certain time period when an advertisement output condition signal is received from the remote controller information receiver, in a state that a setup signal with respect to an advertisement data screen output is received through the remote controller information receiver and the advertisement data is received from the advertisement data transmission server and stored; and a timer installed in the controller for calculating an advertisement output time.

2. The system of claim 1, wherein the advertisement output conditions of the broadcast output terminals refer to when power of the broadcast output terminals is turned on and off, and when a signal for performing channel switching by a viewer through the broadcast output terminals is applied.

3. The system of claim 1, wherein the broadcast output terminals are set to check an advertisement view time or the frequency of advertisement output and transmit the check result to the advertisement data transmission server.

4. The system of claim 1, wherein the broadcast output terminals are set to output prestored advertisement data only for a certain time period when a channel switch signal is received during the outputting of broadcast data, remove the advertisement data after a certain time period has lapsed, and return to the original broadcast data.

5. The system of claim 1, wherein the controller has a control routine set to generate a control signal to the screen output controller to adjust an output size of the advertisement data when a signal for adjusting the ratio of the advertisement data output from the remote controller information receiver is applied.

6. The system of claim 1, wherein the controller is set to accumulatively calculate the advertisement output time by interworking with the timer and transmit the corresponding advertisement output time information to the advertisement data transmission server at every certain time interval.

7. The system of claim 1, wherein the broadcast output terminals further include a key input unit for setting an advertisement data output mode by the viewer, and adjusting the size ratio of the advertisement output area.

8. The system of claim 1, wherein the advertisement data transmission server is set to provide a return, which is proportionate to an output time of an advertisement, to a viewer who has output the advertisement upon receiving the advertisement output time information previously output through the corresponding broadcast output terminals, at certain time intervals or when power of the broadcast output terminals is turned off.

9. A method for inserting advertisement data into broadcast data, the method comprising:

receiving, by an advertisement data transmission server, advertisement data from a plurality of advertiser terminals, and registering the advertisement data by the advertisers; transmitting, by the advertisement data transmission server, the advertisement data to a plurality of broadcast output terminals; storing, by the broadcast output terminals, the advertisement data transmitted from the advertisement data transmission server; outputting, by the broadcast output terminals, broadcast data of a terrestrial wave, a satellite broadcast, and a cable broadcast through their screen; determining, by the broadcast output terminals, whether or not advertisement output conditions are met; when the advertisement output conditions are met, extracting prestored advertisement data and outputting the extracted advertisement data to the screen; driving, by the broadcast output terminals, a timer starting from a time point when the output of the advertisement data is initiated, and determining whether or not a preset certain time has arrived; and when the preset time has arrived, removing, by the broadcast output terminals, the advertisement data output to the screen and returning to the screen where an original broadcast advertisement data is output, wherein the broadcast output terminals include: a communication module, connected to a broadcast access network or Internet network, for performing a data transmission and reception with the broadcast data transmission server and the advertisement data transmission server and performing protocol matching and filtering; a remote controller information receiver for receiving remote control signals with respect to an advertisement data output setting signal of a viewer, a screen ratio adjustment signal of advertisement data, a detailed information check signal of advertisement data, a channel switch signal, and a power ON/OFF signal; a screen output controller for controlling outputting of broadcast data and advertisement data through the broadcast output terminals; an advertisement insertion controller for controlling inserting of advertisement data transmitted from the advertisement data transmission server into a screen area and outputting the same by interworking with the screen output controller; a broadcast data output controller for controlling receiving of digital broadcast data from the broadcast data transmission server and outputting the received digital broadcast data through the broadcast output terminals; a broadcast data recording controller for receiving the digital broadcast data from the broadcast data transmission server, and recording and storing the digital broadcast data; a data storage unit for storing advertisement data transmitted from the advertisement data transmission server, storing terminal unique number information, and receiving an advertisement data output setup signal of the viewer and a screen ratio adjustment signal of the advertisement data and storing the set information associated with them; and a controller for controlling outputting of advertisement data to the screen for a certain time period when an advertisement output condition signal is received from the remote controller information receiver, in a state that a setup signal with respect to an advertisement data screen output is received through the remote controller information receiver and the advertisement data is received from the advertisement data transmission server and stored; and a timer installed in the controller for calculating an advertisement output time.

10. The method of claim 9, wherein said determining whether or not advertisement output conditions are met determines whether a channel switch signal or a power ON/OFF signal is received.

11. The method of claim 9, wherein said extracting pre-stored advertisement data reduces broadcast data output to the screen output area at a certain ratio, and outputs the extracted advertisement data to a remaining portion of the screen.

12. The method of claim 9, further comprising, after said removing the advertisement data: determining whether a channel switch signal is applied at a time point when the preset time has not arrived; and when the channel switch signal is applied, returning to said outputting the extracted advertisement data for outputting new advertisement data to the screen.

13. A system for inserting advertisement data into broadcast data, the system comprising:
broadcast output terminals for outputting broadcast data to a broadcast data output area of a screen output area, and dividedly generating an advertisement data output area at a lower end portion of the screen output area to output advertisement data for a certain time period when advertisement output conditions are met; a broadcast data transmission server for transmitting broadcast data to the broadcast output terminals through a relay station or a relay satellite; and advertiser terminals for transmitting advertisement data and advertisement information to an advertisement data transmission server configured for receiving advertisement data from the advertiser terminals and storing the advertisement data, and transmitting the advertisement data to the broadcast output terminals, wherein the broadcast output terminals are configured such that the advertisement output area further includes an image output area, and an event information output area including lottery information or prize money information, and discount information, and wherein the broadcast output terminals include: a communication module, connected to a broadcast access network or Internet network, for performing a data transmission and reception with the broadcast data transmission server and the advertisement data transmission server and performing protocol matching and filtering; a remote controller information receiver for receiving remote control signals with respect to an advertisement data output setting signal of a viewer, a screen ratio adjustment signal of advertisement data, a detailed information check signal of advertisement data, a channel switch signal, and a power ON/OFF signal; a screen output controller for controlling outputting of broadcast data and advertisement data through the broadcast output terminals; an advertisement insertion controller for controlling inserting of advertisement data transmitted from the advertisement data transmission server into a screen area and outputting the same by interworking with the screen output controller; a broadcast data output controller for controlling receiving of digital broadcast data from the broadcast data transmission server and outputting the received digital broadcast data through the broadcast output terminals; a broadcast data recording controller for receiving the digital broadcast data from the broadcast data transmission server, and recording and storing the digital broadcast data; a data storage unit for storing advertisement data transmitted from the advertisement data transmission server, storing terminal unique number information, and receiving an advertisement data output setup signal of the viewer and a screen ratio adjustment signal of the advertisement data and storing the set information associated with them; and a controller for controlling outputting of advertisement data to the screen for a certain time period when an advertisement output condition signal is received from the remote controller information receiver, in a state that a setup signal with respect to an advertisement data screen output is received through the remote controller information receiver and the advertisement data is received from the advertisement data transmission server and stored; and a timer installed in the controller for calculating an advertisement output time.

* * * * *